United States Patent
Kono et al.

(10) Patent No.: US 12,194,684 B2
(45) Date of Patent: Jan. 14, 2025

(54) POST-CURING METHOD AFTER OPTICAL SHAPING OF 3D PRINTER

(71) Applicant: KABUSHIKI KAISHA SHOFU, Kyoto (JP)

(72) Inventors: Kenji Kono, Kyoto (JP); Hidefumi Fujimura, Kyoto (JP); Toshiyuki Tanaka, Kaizuka (JP); Yuushin Okimoto, Kyoto (JP); Sayaka Ishida, Kyoto (JP); Toshio Kitamura, Kyoto (JP)

(73) Assignee: KABUSHIKI KAISHA SHOFU, Kyoto (JP)

( * ) Notice: Subject to any disclaimer, the term of this patent is extended or adjusted under 35 U.S.C. 154(b) by 269 days.

(21) Appl. No.: 17/761,339

(22) PCT Filed: Sep. 17, 2020

(86) PCT No.: PCT/JP2020/035304
§ 371 (c)(1),
(2) Date: Mar. 17, 2022

(87) PCT Pub. No.: WO2021/054400
PCT Pub. Date: Mar. 25, 2021

(65) Prior Publication Data
US 2022/0347927 A1   Nov. 3, 2022

(30) Foreign Application Priority Data

Sep. 20, 2019 (JP) .................................. 2019-171072
Jan. 30, 2020 (JP) .................................. 2020-013835

(51) Int. Cl.
*B29C 64/386* (2017.01)
*A61C 13/01* (2006.01)
(Continued)

(52) U.S. Cl.
CPC ............ *B29C 64/386* (2017.08); *A61C 13/04* (2013.01); *A61C 13/102* (2013.01); *A61C 13/34* (2013.01);
(Continued)

(58) Field of Classification Search
None
See application file for complete search history.

(56) References Cited

U.S. PATENT DOCUMENTS 6,126,774 A * 10/2000 Takayama ............. B29C 70/086
156/295
6,705,866 B1 * 3/2004 Okamoto ................ A61C 13/04
433/200.1

(Continued)

FOREIGN PATENT DOCUMENTS

JP   61-125340   6/1986
JP   6047618   12/2016

(Continued)

OTHER PUBLICATIONS

Extended European Search Report issued Aug. 21, 2023 in corresponding European Patent Application No. 20865180.2.

(Continued)

*Primary Examiner* — Yung-Sheng M Tsui
*Assistant Examiner* — Melody Tsui
(74) *Attorney, Agent, or Firm* — Wenderoth, Lind & Ponack, L.L.P.

(57) ABSTRACT

A manufacturing method for a prosthetic apparatus for dental purpose according to one aspect of the present invention includes: acquiring scan data of a model that is a reproduction of at least a part of an inside of an oral cavity of a patient; creating shape data of a shaped body for dental purpose on a basis of the scan data; producing a shaped body on a basis of the shape data; covering at least a part of the (Continued)

shaped body and at least a part of a model with film, the shaped body attached to the model; releasing air in a part covered with the film to deform the film and bring the shaped body into close contact with the model; and curing the shaped body in a state where the shaped body is in close contact with the model.

20 Claims, 30 Drawing Sheets

(51) Int. Cl.
*A61C 13/10* (2006.01)
*A61C 13/34* (2006.01)
*B29C 64/124* (2017.01)
*B29C 64/264* (2017.01)
*B33Y 10/00* (2015.01)
*B33Y 30/00* (2015.01)
*B33Y 40/20* (2020.01)
*B33Y 50/00* (2015.01)
*B33Y 80/00* (2015.01)

(52) U.S. Cl.
CPC .......... *B29C 64/124* (2017.08); *B29C 64/264* (2017.08); *B33Y 10/00* (2014.12); *B33Y 30/00* (2014.12); *B33Y 40/20* (2020.01); *B33Y 50/00* (2014.12); *B33Y 80/00* (2014.12)

(56) References Cited

U.S. PATENT DOCUMENTS

| | | | | |
|---|---|---|---|---|
| 11,780,163 | B2* | 10/2023 | Houser | B29C 70/38 |
| | | | | 264/308 |
| 2010/0068464 | A1* | 3/2010 | Meyer | B29C 65/564 |
| | | | | 428/161 |
| 2010/0247934 | A1* | 9/2010 | Meyer | B33Y 80/00 |
| | | | | 428/688 |
| 2014/0023812 | A1* | 1/2014 | Hammer | F16L 9/128 |
| | | | | 428/36.9 |
| 2015/0165649 | A1* | 6/2015 | Broeska | B29C 41/42 |
| | | | | 156/281 |
| 2017/0028590 | A1* | 2/2017 | Nesbit | B29C 31/08 |
| 2017/0100894 | A1* | 4/2017 | Burns | B29C 64/386 |
| 2017/0210063 | A1* | 7/2017 | Andres | B29C 65/4825 |
| 2017/0333167 | A1 | 11/2017 | Hagiwara et al. | |
| 2018/0072841 | A1 | 3/2018 | Okamoto et al. | |
| 2018/0141243 | A1* | 5/2018 | Mochizuki | B33Y 40/20 |
| 2019/0030605 | A1* | 1/2019 | TenHouten | B22F 3/002 |
| 2019/0358880 | A1* | 11/2019 | Strange | B65B 63/02 |
| 2020/0074973 | A1* | 3/2020 | McKinley | B32B 3/12 |
| 2021/0038353 | A1 | 2/2021 | Sakamaki | |
| 2021/0122087 | A1* | 4/2021 | Cooper | B29C 33/485 |
| 2021/0138746 | A1* | 5/2021 | Padovano | B25J 15/0052 |
| 2021/0331432 | A1* | 10/2021 | Tobin | B29C 70/386 |

FOREIGN PATENT DOCUMENTS

| | | |
|---|---|---|
| JP | 2018-83300 | 5/2018 |
| JP | 6423960 | 11/2018 |
| WO | 2013/035961 | 3/2013 |
| WO | 2018/181832 | 10/2018 |

OTHER PUBLICATIONS

International Preliminary Report on Patentability issued Mar. 15, 2022 in corresponding International (PCT) Patent Application No. PCT/JP2020/035304.
Office Action issued Apr. 22, 2023 in corresponding Chinese Patent Application No. 202080065758.7, with English language translation.
The Second Office Action issued Oct. 31, 2023 in corresponding Chinese Patent Application No. 202080065758.7, with English language translation.
International Search Report issued Nov. 24, 2020 in International (PCT) Application No. PCT/JP2020/035304.
Singapore Office Action issued Jul. 4, 2023 in corresponding Singaporean Patent Application No. 11202202794W.

* cited by examiner

32

33

32

34

POST-CURING METHOD AFTER OPTICAL SHAPING OF 3D PRINTER

TECHNICAL FIELD

The present invention relates to a post-curing method after optical shaping of a 3D printer. Specifically, the present invention relates to a manufacturing method for a prosthetic apparatus, a manufacturing apparatus for the prosthetic apparatus, the prosthetic apparatus, and a covering apparatus.

BACKGROUND ART

In recent years, development of digital technologies by 3D printers has been remarkable, novel technologies have been applied in a field of dentistry, and various digital systems for dental techniques capable of improving efficiency of dental technical work have been developed. As 3D printers, there are known several methods, such as an optical shaping method, a powder method, a fused deposition modeling method, and an ink-jet method.

The optical shaping method is mainly used for dentistry. The optical shaping method is a method for emitting light (ultraviolet light or the like) on liquid photo-curable resin composition to cure the resin little by little, thereby producing a shaped body. The optical shaping method includes a stereolithography (SLA) method and a digital light processing (DLP) method. Some shaped bodies produced by the optical shaping method are in a state of not being sufficiently cured (hereinafter, may be referred to as a "semi-cured state") before being photopolymerized by a post-curing apparatus. Post-curing may be performed on such a shaped body in a semi-cured state. The post-curing is a method for emitting light (ultraviolet light or the like) on a shaped body in a semi-cured state to obtain a shaped body in a final cured state. A shaped body subjected to post-cure treatment is a shaped body in a final cured state.

Japanese Patent Application Laid-Open No. 2018-83300 (hereinafter, "the JP '300 reference") discloses a method for performing post-curing (secondary curing) treatment on a shaped body in a semi-cured state. In a method described in the JP '300 reference, the shaped body in a semi-cured state is fitted to a model, and then irradiated with light in a state of being fixed by a fixing member, so that the shaped body in a semi-cured state is secondarily cured.

However, in the method described in the JP '300 reference, there is still room for improvement in terms of improvement of conformity of a prosthetic apparatus.

SUMMARY OF THE INVENTION

Therefore, an object of the present invention is to provide a manufacturing method for a prosthetic apparatus, a manufacturing apparatus for the prosthetic apparatus, the prosthetic apparatus, and a vacuum packaging apparatus that are capable of improving conformity of the prosthetic apparatus.

A manufacturing method for a prosthetic apparatus for dental purpose according to one aspect of the present invention includes
acquiring scan data of a model that is a reproduction of at least a part of an inside of an oral cavity of a patient,
creating shape data of a shaped body for dental purpose on a basis of the scan data,
producing a shaped body on a basis of the shape data,
covering at least a part of the shaped body and at least a part of a model with film, the shaped body attached to the model,
releasing air in a part covered with the film to deform the film and bring the shaped body into close contact with the model, and
curing the shaped body in a state where the shaped body is in close contact with the model.

A covering apparatus used for manufacturing a prosthetic apparatus according to one aspect of the present invention includes:
an air releaser that releases air in film covering at least a part of a shaped body and at least a part of a model,
wherein the air releaser releases air in a part covered with the film to deform the film and bring the shaped body into close contact with the model.

A manufacturing apparatus for a prosthetic apparatus according to one aspect of the present invention is
an apparatus that manufactures a prosthetic apparatus for dental purpose by bringing a shaped body produced on the basis of scan data of a model that is a reproduction of an inside of an oral cavity of a patient, and a model into close contact with each other, and by curing the shaped body and the model, the manufacturing apparatus including the covering apparatus in the above-described aspect.

A prosthetic apparatus according to one aspect of the present invention
is produced with a shaped body obtained by bringing a shaped body into close contact with a model by, in a state where at least a part of the shaped body and at least a part of the model are covered with film, releasing air in a part covered with the film, and curing the shaped body in a state where the shaped body is in close contact with the model.

Effects of the Invention

According to the present invention, conformity of the prosthetic apparatus can be improved.

Figure 1:
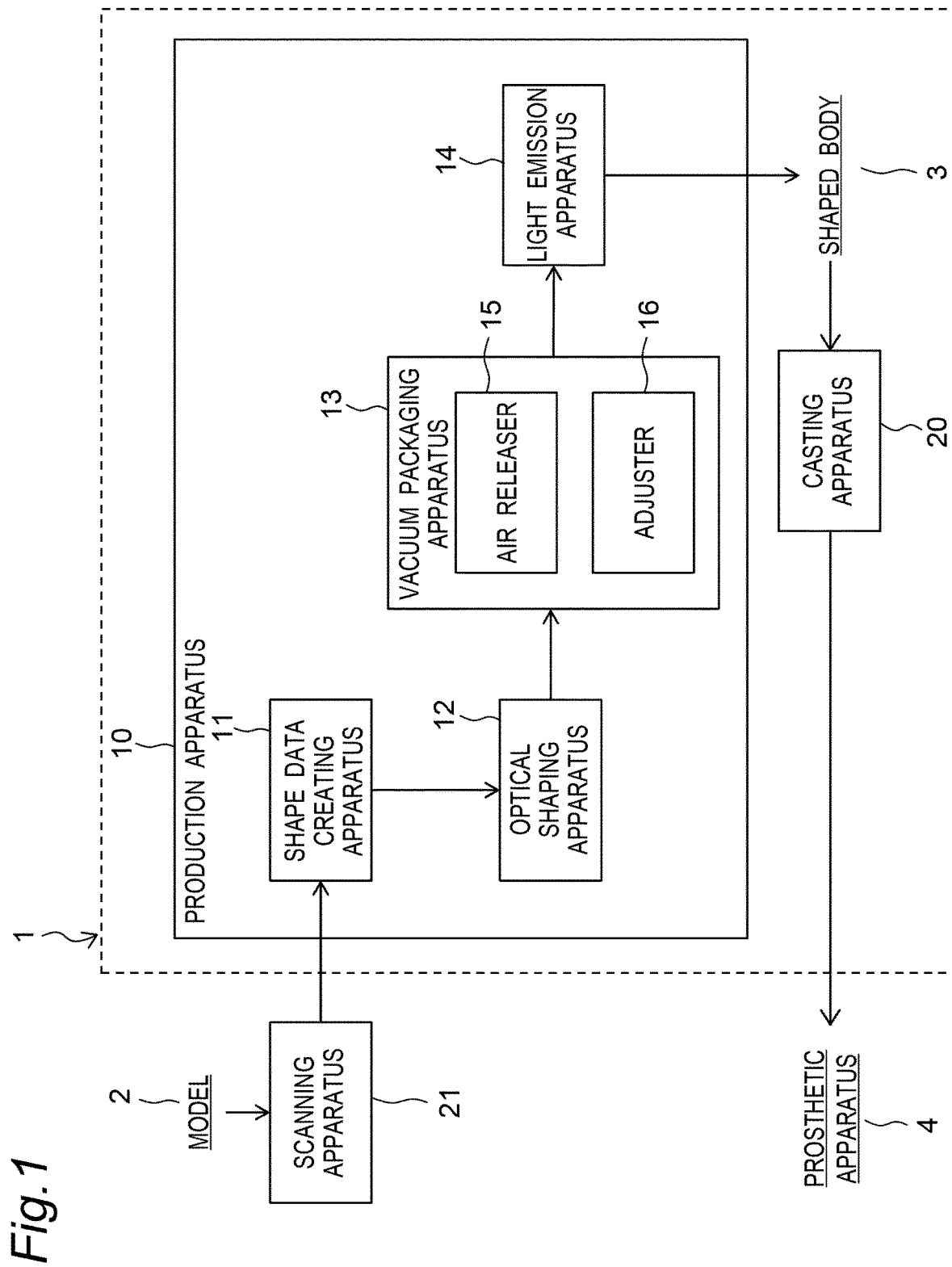
FIG. 1 is a block diagram illustrating an example of a manufacturing apparatus for a prosthetic apparatus of a first embodiment according to the present invention.

DETAILED DESCRIPTION OF THE INVENTION (Circumstances Leading to Present Invention)

A shaped body produced by a 3D printer may be in a state of not being sufficiently cured, that is, in a "semi-cured state", before being photopolymerized by a post-curing apparatus. In this case, post-curing is performed by, for example, a post-curing apparatus that emits light (ultraviolet light or the like) on the shaped body in the semi-cured state in a wavelength range of 350 nm to 500 nm. Because the shaped body in the semi-cured state deposited at this time is unpolymerized, linear shrinkage of about 1% to 5% occurs. There is a problem that polymerization shrinkage occurs at this time, and a shaped body in a final cured state is easily deformed.

In the post-curing method described in the JP '300 reference, the shaped body in the semi-cured state is fitted to a model, and then irradiated with light while the shaped body is fixed by a fixing member, so that the shaped body in the semi-cured state is secondarily cured. However, the method described in the JP '300 reference has a problem that a part other than a part fixed by the fixing member is easily deformed, and a shaped body in a clinically satisfactory final cured state cannot be obtained. For example, a part not fixed by the fixing member may be deformed by post-curing to be in a state of being partially separated from the model, and may not conform.

Therefore, the present inventors have earnestly studied and found that a shaped body in a semi-cured state is brought into close contact with a model by covering the shaped body in the semi-cured state and the model with film, and releasing air from a part covered with the film. Thus, post-cure treatment can be performed by emitting light on the shaped body in the semi-cured state while the shaped body is in close contact with the model.

Hereinafter, the present invention will be described.

A manufacturing method for a prosthetic apparatus for dental purpose according to one aspect of the present invention includes:

acquiring scan data of a model that is a reproduction of at least a part of an inside of an oral cavity of a patient, creating shape data of a shaped body for dental purpose on a basis of the scan data, producing a shaped body on a basis of the shape data, covering at least a part of the shaped body and at least a part of a model with film, the shaped body attached to the model, releasing air in a part covered with the film to deform the film and bring the shaped body into close contact with the model, and curing the shaped body in a state where the shaped body is in close contact with the model.

With such a configuration, conformity of the prosthetic apparatus can be improved.

In the manufacturing method for a prosthetic apparatus, the curing the shaped body may include at least either of emitting light on the shaped body in a state where the shaped body is in close contact with the model, or heating the shaped body in a state where the shaped body is in close contact with the model.

With such a configuration, conformity of the prosthetic apparatus can be further improved.

In the manufacturing method for a prosthetic apparatus, the producing the shaped body may include producing a shaped body in a first curing state on the basis of the shape data, and producing a shaped body in a second curing state cured more than in the first curing state by emitting light on the shaped body in the first curing state, and the curing the shaped body includes heating the shaped body in the second curing state in a state where the shaped body is in close contact with the model.

With such a configuration, conformity of the prosthetic apparatus can be further improved.

In the manufacturing method for a prosthetic apparatus, heating temperature in the heating the shaped body may be 50° C. or more and 130° C. or less.

With such a configuration, conformity of the prosthetic apparatus can be further improved.

In the manufacturing method for a prosthetic apparatus, the releasing the air may include adjusting a vacuum degree of a part covered with the film to 40% or more and 99.9% or less.

With such a configuration, conformity of the prosthetic apparatus can be further improved.

In the manufacturing method for the prosthetic apparatus, the polymerization rate of the shaped body produced in the producing the shaped body may be 50% or more and 98% or less.

With such a configuration, conformity of the prosthetic apparatus can be further improved.

In the manufacturing method for a prosthetic apparatus, an elongation percentage of the film may be 50% or more and 500% or less, and the film may transmit light having a wavelength of 100 nm or more and 780 nm or less.

With such a configuration, conformity of the prosthetic apparatus can be further improved. In addition, light for curing the shaped body is easily transmitted through the film.

In the manufacturing method for the prosthetic apparatus, the producing the shaped body may produce the shape body with an optical shaping apparatus of a digital light processing method.

With such a configuration, a highly conformable prosthetic apparatus can be produced in a short time.

In the manufacturing method for a prosthetic apparatus, the shaped body may include any one of a crown, a bridge, a resin base, a resin base denture, or an orthodontic splint.

With such a configuration, a prosthetic apparatus corresponding to various case histories can be manufactured.

The manufacturing method for a prosthetic apparatus may further include producing a mold for prosthetic apparatus manufacturing, by using the cured shaped body as a casting pattern, introducing molten metal into the mold, breaking the mold and removing a cast metal, and finishing the cast metal into a prosthetic apparatus by adjusting the cast metal with an abrasive material and a polishing material.

With such a configuration, it is possible to improve conformity of a prosthetic apparatus of a metal cast denture base, the prosthetic apparatus being produced by using a shaped body.

The manufacturing method for a prosthetic apparatus may further include bonding an artificial tooth to the shaped body.

With such a configuration, a prosthetic apparatus of a denture with improved conformity can be manufactured.

A covering apparatus used for manufacturing a prosthetic apparatus according to one aspect of the present invention includes an air releaser that releases air in film covering at least a part of a shaped body and at least a part of a model, the air releaser releases air in a part covered with the film to deform the film and bring the shaped body into close contact with the model.

With such a configuration, conformity of the prosthetic apparatus can be improved.

The covering apparatus may further include an adjuster that adjusts a vacuum degree of the part covered with the film to 40% or more and 99.9% or less.

With such a configuration, conformity of the prosthetic apparatus can be further improved.

A manufacturing apparatus for a prosthetic apparatus according to one aspect of the present invention is an apparatus that manufactures a prosthetic apparatus for dental purpose by bringing a shaped body produced on the basis of scan data of a model that is a reproduction of an inside of an oral cavity of a patient, and a model into close contact with each other, and by curing the shaped body and the model, the manufacturing apparatus including the covering apparatus in the above-described aspect.

With such a configuration, conformity of the prosthetic apparatus can be improved.

The manufacturing apparatus for a prosthetic apparatus may further include a shape data creating apparatus that acquires scan data of a model that is a reproduction of an inside of an oral cavity of a patient, and creates shape data of a shaped body for dental purpose on the basis of the scan data, an optical shaping apparatus that produces a shaped body on the basis of the shape data, and a curing apparatus that cures the shaped body in a state where the shaped body is in close contact with the model.

With such a configuration, conformity of the prosthetic apparatus can be further improved.

In the manufacturing apparatus for a prosthetic apparatus, the curing apparatus may include at least either of a light emission apparatus that emits light on the shaped body in a state where the shaped body is in close contact with the model, or a heating apparatus that heats the shaped body in a state where the shaped body is in close contact with the model.

With such a configuration, conformity of the prosthetic apparatus can be further improved.

In the manufacturing apparatus for a prosthetic apparatus, the optical shaping apparatus may produce a shaped body in a first curing state on the basis of the shape data,
the manufacturing apparatus may include a light emission apparatus that produces a shaped body in a second curing state cured more than in the first curing state by further emitting light on the shaped body in the first curing state, and
the curing apparatus may include a heating apparatus that heats the shaped body in the second curing state in a state where the shaped body is in close contact with the model.

With such a configuration, conformity of the prosthetic apparatus can be further improved.

In the manufacturing apparatus for a prosthetic apparatus, heating temperature of the heating apparatus may be 50° C. or more and 130° C. or less.

With such a configuration, conformity of the prosthetic apparatus can be further improved.

A prosthetic apparatus according to one aspect of the present invention is produced with a shaped body obtained by bringing a shaped body into close contact with a model by, in a state where at least a part of the shaped body and at least a part of the model are covered with film, releasing air in a part covered with the film, and curing the shaped body in a state where the shaped body is in close contact with the model.

With such a configuration, conformity of the prosthetic apparatus can be improved.

A manufacturing method for a prosthetic apparatus for dental purpose according to one aspect of the present invention includes
producing a shaped body for dental purpose,
covering at least a part of the shaped body and at least a part of a model with film, the model that is a reproduction of at least a part of an inside of an oral cavity of a patient and the shaped body attached to the model,
releasing air in a part covered with the film to deform the film and bring the shaped body into close contact with the model, and
curing the shaped body in a state where the shaped body is in close contact with the model.

With such a configuration, conformity of the prosthetic apparatus can be improved.

Hereinafter, an embodiment of the present invention will be described with reference to the accompanying drawings. Note that the following detailed description is merely exemplary in nature and is not intended to limit the present disclosure or the application and uses of the present disclosure. Furthermore, the drawings are merely schematic representations, and ratios of dimensions therein or the like do not necessarily match the actual ones.

First Embodiment

In a first embodiment, an example of producing a shaped body including a metal cast denture base pattern, and manufacturing, by using the shaped body, a prosthetic apparatus of a metal cast denture base will be described. Note that a manufacturing apparatus for and manufacturing method for a prosthetic apparatus according to the present invention are not limited thereto.
[Manufacturing Apparatus for Prosthetic Apparatus]
FIG. 1 is a block diagram illustrating an example of a manufacturing apparatus 1 for a prosthetic apparatus of the first embodiment according to the present invention. As illustrated in FIG. 1, the manufacturing apparatus 1 for a prosthetic apparatus includes a production apparatus 10 that produces, on the basis of a model 2, a shaped body 3 including a metal cast denture base pattern, and a casting apparatus 20 that produces a prosthetic apparatus 4 of a metal cast denture base by using the shaped body 3. Note that FIG. 1 illustrates a scanning apparatus 21 in addition to the manufacturing apparatus 1.
<Production Apparatus>
As illustrated in FIG. 1, the production apparatus 10 includes a shape data creating apparatus 11, an optical shaping apparatus 12, a vacuum packaging apparatus 13, and a light emission apparatus 14. In the first embodiment, the vacuum packaging apparatus 13 will be described as an example of a covering apparatus. In addition, the light emission apparatus 14 will be described as an example of a curing apparatus.
<Shape Data Creating Apparatus>
The shape data creating apparatus 11 acquires scan data of the model 2 that is a reproduction of the inside of the oral cavity of the patient, and creates shape data of the shaped body 3 for dental purpose on the basis of the scan data.

Figure 2:
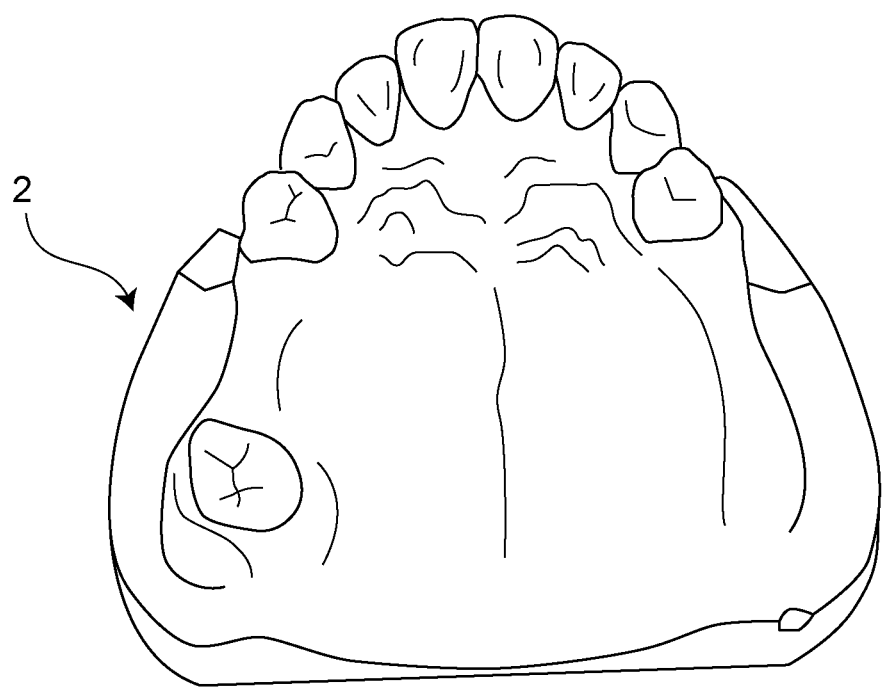
FIG. 2 is a schematic diagram illustrating an example of a model.

FIG. 2 is a schematic diagram illustrating an example of the model 2. As illustrated in FIG. 2, the model 2 is a model that is a reproduction of the inside of the oral cavity of the patient. The model 2 is an imitation of a shape of an oral cavity of an upper jaw of the patient. The model 2 is produced by taking impression of the inside of the oral cavity of the patient with an impression material and flowing plaster in the impression material.

The scan data of the model 2 is acquired by the scanning apparatus 21. The scanning apparatus 21 is, for example, a 3D scanner, and scans a three-dimensional shape of the model 2. The scan data of the model 2 acquired by the scanning apparatus 21 is transmitted to the shape data creating apparatus 11.

The shape data creating apparatus 11 receives the scan data of the model 2 from the scanning apparatus 21. The shape data creating apparatus 11 creates shape data of the shaped body 3 for dental purpose on the basis of the scan data of the model 2. For example, on the model 2, the shape data creating apparatus 11 creates shape data of the shaped body 3 for dental purpose. The shape data includes three-dimensional shaped data of the shaped body 3 for dental purpose. Thus, shape data of the shaped body 3 having a shape and size conforming to the model 2 is created. The shape data is created by using, for example, dental CAD. The shape data creating apparatus 11 transmits the created shape data to the optical shaping apparatus 12. In the first embodiment, the shape data of the shaped body 3 for dental purpose is shape data of a casting pattern for producing the prosthetic apparatus 4 of a metal cast denture base.
<Optical Shaping Apparatus>
The optical shaping apparatus 12 produces a shaped body in a semi-cured state on the basis of the shape data. The optical shaping apparatus 12 is, for example, a 3D printer. Here, the shaped body in the semi-cured state is produced on the basis of shaped body data, and means a shaped body in a state of not being sufficiently cured before being photopolymerized by the light emission apparatus 14, which is a post-curing apparatus.

A 3D printer of the stereolithography (SLA) method or the digital light processing (DLP) method can be suitably used for the optical shaping apparatus 12. In the first embodiment, the optical shaping apparatus 12 is of a DLP method. The DLP method has a high deposition rate, and enables shaping of a shaped body in a semi-cured state in a short time. A shaping condition such as light intensity or exposure time of the optical shaping apparatus 12 can be adjusted as appropriate according to a shape and required dimensions of the shaped body in the semi-cured state.

Figure 3:
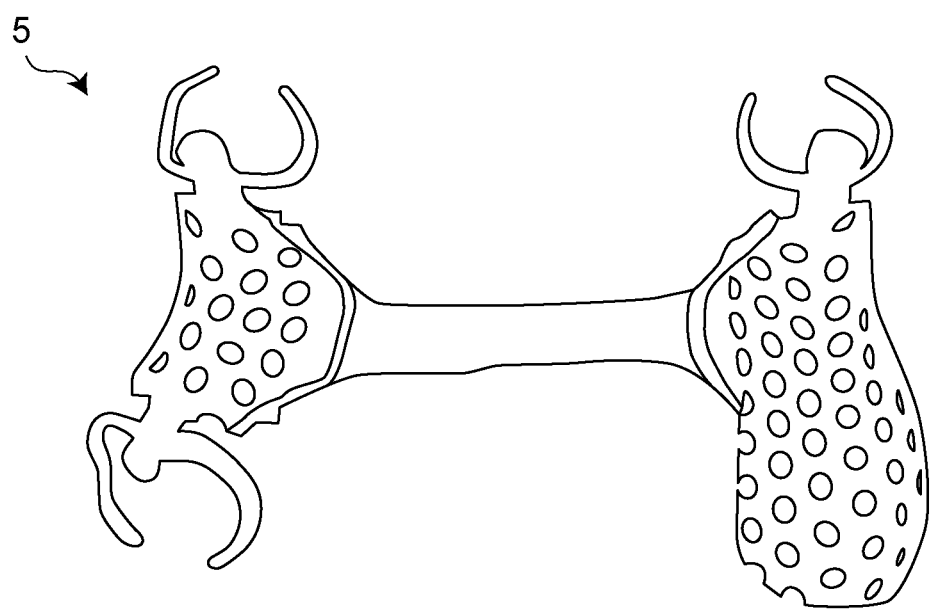
FIG. 3 is a schematic diagram illustrating an example of a shaped body in a semi-cured state.

The optical shaping apparatus 12 receives shape data from the shape data creating apparatus 11. The optical shaping apparatus 12 produces the shaped body in the semi-cured state on the basis of the received shape data. FIG. 3 is a schematic diagram illustrating an example of a shaped body 5 in a semi-cured state. The shaped body 5 in a semi-cured state illustrated in FIG. 3 is an example, and not limited thereto.

Figure 4:
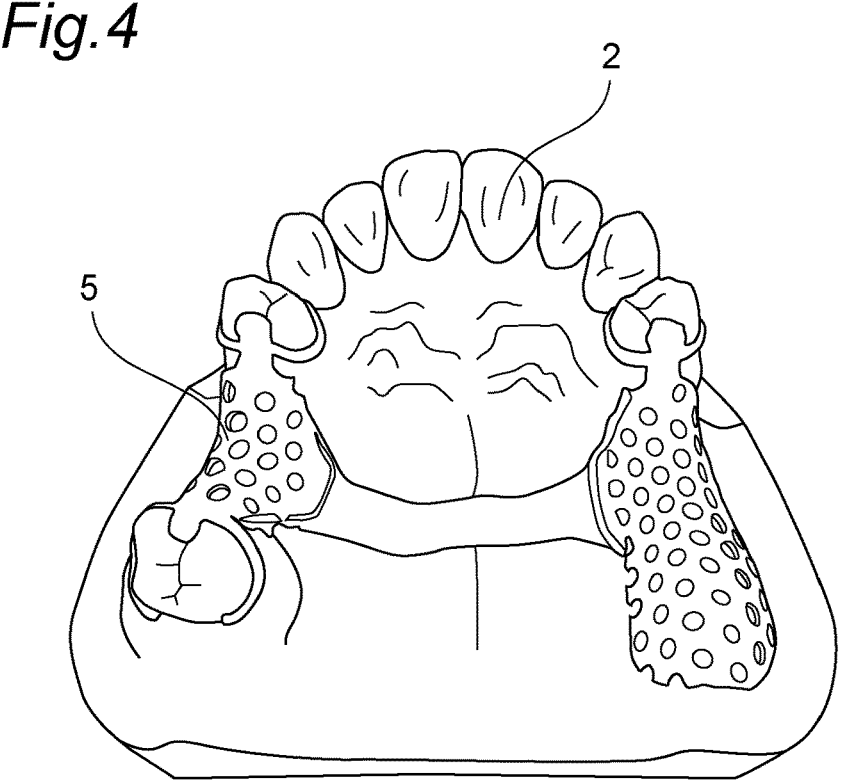
FIG. 4 is a schematic diagram illustrating an example of a state where the shaped body in the semi-cured state is attached to the model.

FIG. 4 is a schematic diagram illustrating an example of a state where the shaped body 5 in the semi-cured state is attached to the model 2. As illustrated in FIG. 4, the shaped body 5 in the semi-cured state shaped by the optical shaping apparatus 12 is attached to the model 2.

<Vacuum Packaging Apparatus>

In a state where at least a part of the shaped body 5 in the semi-cured state and at least a part of the model 2 are covered with film, the vacuum packaging apparatus 13 releases air in the film. Thus, the shaped body 5 in the semi-cured state can be brought into close contact with the model 2. The vacuum packaging apparatus 13 is a covering apparatus that covers at least a part of the shaped body 5 and at least a part of the model 2 with film 6, and releases air in the part covered with the film 6, thereby deforming the film 6 and bringing the shaped body 5 into close contact with the model 2.

Specifically, the vacuum packaging apparatus 13 covers the shaped body 5 in the semi-cured state and the model 2 with film, and releases air in the parts covered with the film. Thus, the film is deformed by an inside thereof being subjected to negative pressure. As a result, the shaped body 5 in the semi-cured state is brought into a state of being pressed against the model 2. In this manner, a state where the shaped body 5 in the semi-cured state fits the model 2 is maintained.

Figure 5:
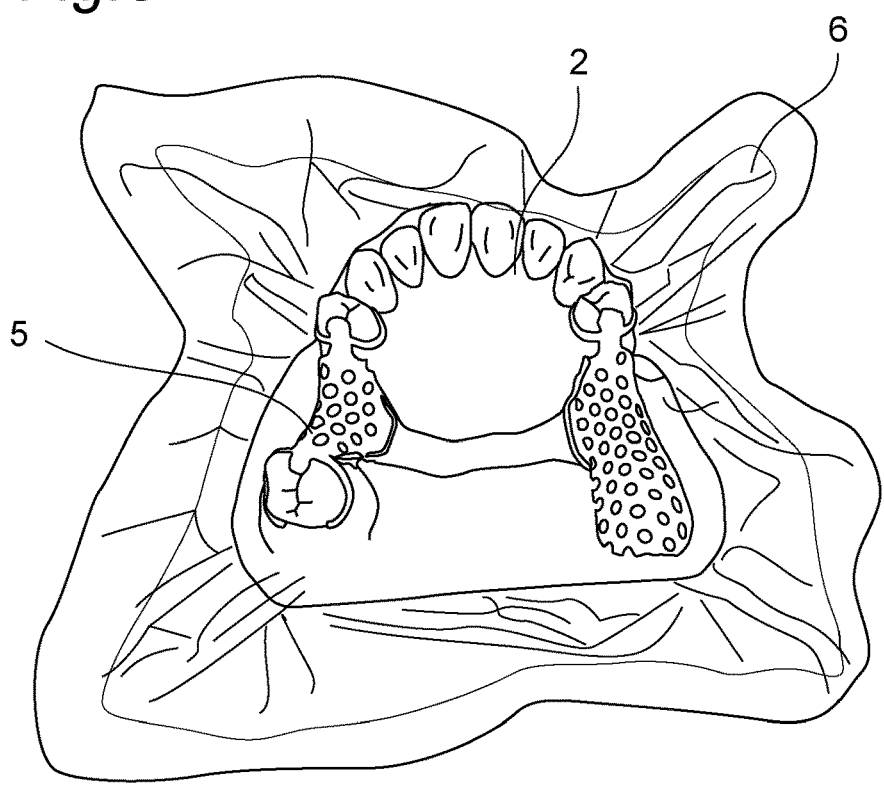
FIG. 5 is a schematic diagram illustrating an example of a state where the shaped body in the semi-cured state and the model are covered with film and deflated.

FIG. 5 is a schematic diagram illustrating an example of a state where the shaped body 5 in the semi-cured state and the model 2 are covered with film 6 and deflated. In the example illustrated in FIG. 5, the shaped body 5 in the semi-cured state and the model 2 are placed in the film 6 in a shape of a bag, and air in the film 6 is released. As illustrated in FIG. 5, by an inside of the film 6 being subjected to negative pressure, the film 6 is deformed, and the shaped body 5 in a semi-cured state is pressed against the model 2. Thus, the shaped body 5 in the semi-cured state is in close contact with the model 2.

The film 6 is translucent flexible film. For example, the film 6 is film capable of transmitting light emitted by the light emission apparatus 14. In addition, the film 6 has flexibility to be brought into close contact with the shaped body 5 in the semi-cured state and the model 2. The film 6 preferably has, for example, a total light transmittance of 60% or more and an elongation percentage of 50% or more and 500% or less. A material that forms the film 6 is not particularly limited, and for example, nylon or polyethylene can be suitably used.

The elongation percentage is calculated by the following mathematical formula.

$$\text{Elongation percentage (\%)} = 100 \times (L-Lo)/Lo$$

Lo represents film length before a test, and L represents the film length at break.

In a case where the elongation percentage of the film 6 is less than 50%, flexibility of the film 6 decreases, and in a case of a deep palate, the shaped body 5 in the semi-cured state cannot be sufficiently pressed against the model 2, and a shaped body 3 in a final cured state may not conform. In a case where the elongation percentage is more than 500%, force of pressing the shaped body 5 in the semi-cured state against the model 2 increases, by which unintended deformation may occur in the shaped body 5 in the semi-cured state, and the shaped body 3 in the final cured state may not conform.

The film 6 transmits light having a wavelength of 100 nm or more and 780 nm or less. Preferably, the film 6 transmits light having a wavelength of 300 nm or more and 600 nm or less. More preferably, the film 6 transmits light having a wavelength of 350 nm or more and 500 nm or less.

The film 6 may be embossed. In other words, the film 6 may be provided with irregularities. By providing irregularities on the film 6, air is easily released from the inside of the film 6. For example, the film 6 may be in a form of a bag. The film 6 in a form of a bag may include an irregular surface provided with irregularities. When the model 2 to which the shaped body 5 in the semi-cured state is attached is placed in the film 6 in a form of a bag, a bottom surface of the model 2 may be disposed so as to be in contact with the irregular surface of the film 6, and a surface not provided with irregularities may be disposed so as to be in contact with a shaped body 5A in a semi-cured state. Thus, air can be easily released on a side close to the bottom surface of the model 2, and a side close to the shaped body 5 in the semi-cured state is easily brought into close contact with the model 2. Note that, in the inside of the film 6, a continuous groove may be formed from another end that is opposite to an opening of the film 6 toward an air release pipe of an air releaser 15 to be described later. Thus, the continuous groove functions as an air guide, and the air inside the film 6 is easily released to the air release pipe. In addition, the continuous groove may be deformed and closed as the air in the film 6 is released. Thus, a vacuum degree of the film 6 can be improved.

The vacuum packaging apparatus 13 includes the air releaser 15 and an adjuster 16.

The air releaser 15 releases air in the film 6 that covers at least a part of the shaped body 5 in the semi-cured state and at least a part of the model 2. The air releaser 15 includes, for example, a vacuum pump and the air release pipe connected to the vacuum pump. One end of the air release pipe is connected to the vacuum pump, and another end of the air release pipe is attached to the film 6. That is, in the air releaser 15, the film 6 covering the shaped body 5 in the semi-cured state and the model 2 is attached to the another end of the air release pipe. Specifically, the another end of the air release pipe is disposed in the film 6. Connection between the film 6 and the air release pipe is sealed by a sealing material or the like. With the vacuum pump, the air releaser 15 can release air in the film 6 through the air release pipe.

The adjuster 16 adjusts a vacuum degree of the part covered with film 6. The adjuster 16 includes, for example, a valve and an adjustment pipe connected to the valve. One end of the adjustment pipe is opened to outside air, and another end of the adjustment pipe is disposed inside the film 6. Connection between the film 6 and the adjustment pipe is sealed by a sealing material or the like. A valve is connected to the adjustment pipe, and the valve is opened in order to supply air from the adjustment pipe to the inside of the film 6, and the valve is closed to stop supply of air from the adjustment pipe to the inside of the film 6. The adjuster 16 can adjust a vacuum degree in the film 6 by opening or closing the valve.

Note that the adjuster 16 may include a vacuum pressure sensor that measures a vacuum degree of the part covered with the film 6. The adjuster 16 may control opening and closing of the valve on the basis of a vacuum degree measured by the vacuum pressure sensor to adjust a vacuum degree in the film 6.

The adjuster 16 adjusts a vacuum degree of the part covered with film 6 to 40% or more and 95% or less. Preferably, the adjuster 16 adjusts a vacuum degree of the part covered with film 6 to 50% or more and 90% or less. More preferably, the adjuster 16 adjusts a vacuum degree of the part covered with film 6 to 60% or more and 70% or less. As described above, by adjusting a vacuum degree of the part covered with the film 6, conformity between the shaped body 3 cured by light emission to be described later, and the model 2 can be improved. Specifically, in a case where a vacuum degree is lower than 40%, the model 2 is not sufficiently sucked, and it is difficult to obtain the shaped body 3 in the final cured state with good conformity to the model 2. In addition, in a case where a vacuum degree is higher than 95%, suck between the model 2 and the shaped body 3 in the final cured state is significant, and the shaped body 3 in the final cured state may be difficult to be removed from the model 2. Therefore, the adjuster 16 adjusts a vacuum degree in the film 6 to an above-described numerical range, thereby facilitating the removal while improving the conformity between the shaped body 3 and the model 2.

In addition, when a vacuum degree in the film 6 increases, force of pressing the shaped body 5 in the semi-cured state against the model 2 increases, by which unintended deformation may occur in the shaped body 5 in the semi-cured state. Due to this deformation, the shaped body 3 in the final cured state may lose shape. By the adjuster 16 adjusting a vacuum degree in the film 6 to an above-described numerical range, chances of occurrence of unintended deform in the shaped body 5 in the semi-cured state can be reduced.

The vacuum packaging apparatus 13 includes a sealing device (not illustrated) that seals the film 6 after releasing the air in the film 6. The inside of the film 6 can be tightly closed by sealing the film 6 with the sealing device after air is released. Thus, the shaped body 5 in the semi-cured state can remain in close contact with the model 2.

<Light Emission Apparatus>

The light emission apparatus 14 emits light on the shaped body 5 in the semi-cured state, in a state where the shaped body 5 is in close contact with the model 2. Thus, the shaped body 5 in the semi-cured state is cured, and the shaped body 3 in the final cured state is completed. The light emission apparatus 14 is a curing apparatus that cures the shaped body 5 by emitting light on the shaped body 5. The light emission apparatus 14 applies post-cure treatment to the shaped body 5 in the semi-cured state. Note that a part of a shaped body in a final cured state may not be cured. The shaped body in the final cured state preferably includes an unpolymerized monomer occupying 0.1 weight % to 20 weight % of the shaped body as a whole, for example.

The light emission apparatus 14 emits, for example, ultraviolet light or visible light. The light emission apparatus 14 may be an apparatus that can emit light capable of curing the shaped body 5 in the semi-cured state. Light intensity and exposure time in the light emission apparatus 14 can be adjusted as appropriate according to a shape and required dimensions of the shaped body 3 in the final cured state. Wavelength of light emitted from the light emission apparatus 14 is, for example, a wavelength of 100 nm or more and 780 nm or less. Preferably, the wavelength of the light is 300 nm or more and 600 nm or less. More preferably, the wavelength of the light is 350 nm or more and 500 nm or less. In the first embodiment, preferably, the light emission apparatus 14 emits ultraviolet light, and a wavelength band of the light is 350 nm or more and 500 nm or less. Note that the light emission apparatus 14 is not limited thereto, and the shaped body 5 in the semi-cured state may be cured by being exposed to fluorescent light or sunlight.

The manufacturing apparatus 1 is controlled by, for example, a controller (not illustrated). The controller includes, for example, one or a plurality of processors and a memory.

The one or plurality of processors is, for example, a central processing unit (CPU), a microprocessor, or another processing unit capable of executing a computer-executable instruction. The processor is capable of executing an instruction stored in the memory.

The memory stores data in the controller. The memory includes, for example, a computer recording medium. The memory includes, for example a RAM, a ROM, an EEPROM, a flash memory, or another memory technology, a CD-ROM, a DVD, or another optical disk storage, a magnetic cassette, a magnetic tape, a magnetic disk storage, or another magnetic storage device, or any medium that can be used to store desired information and that can be accessed by the controller.

The manufacturing apparatus 1 may include a communicator (not illustrated). The communicator includes a circuit that communicates with an external apparatus in conformity with a predetermined communication standard (for example, LAN, Wi-Fi (registered trademark), Bluetooth (registered trademark), USB, HDMI (registered trademark), controller area network (CAN), and serial peripheral interface (SPI)).

Components of the manufacturing apparatus 1 can be implemented by an arithmetic apparatus that can be implemented with a semiconductor device or the like. These components can be configured by, for example, a microcomputer, a CPU, an MPU, a GPU, a DSP, an FPGA, or an ASIC. Functions of these components may be configured only by hardware, or may be implemented by a combination of hardware and software.

[About Material Forming Shaped Body]

A material forming the shaped body 3 may be a material that can be used in the SLA method and/or the DLP method of the optical shaping apparatus 12. Specifically, a material forming the shaped body 3 may be a material having photocurability such as (meth)acrylate resin, and is preferably a material having less polymerization shrinkage.

A polymerizable acrylic compound that may be used in a composition of a material that forms the shaped body 3 is not limited, but is selected from among compounds that include an unsaturated double bond group that provides high biological safety and that is used widely as a radically polymerizable monomer, in fields of dentistry and chemical industry.

For example, a monomer, oligomer, or polymer having one or more unsaturated double bond groups such as methyl acrylate, methyl methacrylate, methacrylic acid, ethyl acrylate, ethyl methacrylate, isopropyl methacrylate, a (meth)acryloyl group, a (meth)acrylamide group, and a vinyl group are suitably used.

The term "(meth)acrylate" means both acrylates and methacrylates. Examples thereof include, in addition to an unsaturated double bond group, compounds having one or more or a plurality of a hydrocarbon group, a phenyl group, a hydroxyl group, an acidic group, an acid amide group, an amino group, a thiol group, a disulfide group, a cyclic group, a heterocyclic group, a halogen group, a silanol group, a pyrrolidone group, an urethane bond, an ester bond, an ether bond, an alkylene glycol group, and the like. A suitable radically polymerizable monomer is a (meth)acrylic acid ester derivative having an above-described functional group or bond.

The radically polymerizable monomer is preferably a combination of a crosslinkable monomer and a diluent monomer in order to maintain moderate viscosity.

Examples of the crosslinkable monomer include urethane (meth)acrylates including mono-, di-, tri-, and tetra-ethylene glycol di(meth)acrylates.

"Urethane di-(meth)acrylate" refers to a reaction product of suitable diisocyanates and hydroxyalkyl-mono-(meth)acrylates in a molar ratio of 1:2. "Urethane tri-(meth)acrylate" is a reaction product of suitable diisocyanates, hydroxyalkyl-di-(meth)acrylates, and hydroxyalkyl-mono-(meth)acrylates in a molar ratio of 1:1:1. Urethane tetra-(meth)acrylate is a reaction product of suitable diisocyanates and hydroxyalkyl-di-(meth)acrylates in a molar ratio of 1:2.

Examples include di-[(meth)acryloxyethyl] trimethylhexamethylene diurethane, di-[(meth acryloxypropyl] trimethylhexamethylene diurethane, di-[(meth)acryloxybutyl] trimethylhexamethylene diurethane, di-[(meth)acryloxypentyl] trimethylhexamethylene diurethane, di-[(meth)acryloxyhexyl] trimethylhexamethylene diurethane, di-[(meth)acryloxydecyl] trimethylhexamethylene diurethane, di-[(meth)acryloxyethyl] isophorone diurethane, di-[(meth)acryloxypropyl] isophorone diurethane, di-[(meth)acryloxybutyl] isophorone diurethane, di-[(meth)acryloxypentyl] isophorone diurethane, di-[(meth)acryloxyhexyl] isophorone diurethane, di-[(meth)acryloxyethyl] hexamethylene diurethane, 2,2-Bis[4-(2-hydroxy-3-methacryloyloxypropoxy)phenyl] propane, 2,2-Bis[4-(2-methylacryloyloxyethoxy)-phenyl] propane, 2,2-Bis[4-methacryloyloxyphenyl] propane, and 2,2-Bis[4-(3-methacryloyloxypropoxy)phenyl] propane. Preferable are Di-[(meth)acryloxyethyl] trimethylhexamethylene diurethane, di-[(meth)acryloxypropyl] trimethylhexamethylene diurethane, di-[(meth)acryloxybutyl] trimethylhexamethylene diurethane, 2,2-Bis[4-(2-hydroxy-3-methacryloyloxypropoxy)phenyl] propane, and 2,2-Bis[4-(2-methylacryloyloxyethoxy)-phenyl] propane. Two or more of these compounds may be used together as desired.

Specific examples of a preferable diluent monomer include mono-, di-, tri-, tetra-ethylene glycol di(meth)acrylates, polyethylene glycol (meth)acrylates, 1,4-di[(meth)acryloxy] butylene, 1,6-di[(meth)acryloxy] hexamethylene, neopentyl glycol di(meth)acryloxy] hexamethylene, neopentyl glycol di(meth)acrylate, tetramethylolpropane-tetra(meth)acrylate, methyl(meth)acrylate, (meth)acrylamide, and styrene. Ethylene glycol di(meth)acrylate and triethylene glycol di(meth)acrylate are preferable. Two or more of these compounds may be used together as desired.

As a photopolymerizable catalyst and reducing agent that can be used for a material that forms the shaped body 3, camphorquinone, 2,4,6-trimethylbenzoyldiphenylphosphine oxide, or methylbenzoin; and/or a reducing agent such as tertiary amines for example, can be used.

An absorption wavelength range of a material that forms the shaped body 3 may be initiated by irradiating the composition with light energy preferably having a wavelength range of about 300 nm to 600 nm. A photoinitiator selected from among classes of acylphosphine oxides may also be used. Examples of these compounds include a monoacylphosphine oxide derivative, a bisacylphosphine oxide derivative, and a triacylphosphine derivative.

In one aspect of the embodiment, a material called "ALF" may be used in the composition, the "ALF" including camphor quinone (CQ); Butylated Hydroxytoluene (BHT); N,N-dimethylaminoneopentyl acrylate, gamma-methacryloxypropyl trimethoxysilane, and methacrylic acid.

A filler may be used to improve strength of a monomer used for a material that forms the shaped body 3. The filler is, inorganic filler, organic filler, organic-inorganic composite filler, or the like, and examples of the inorganic filler include silica, aluminum silicate, alumina, titania, zirconia, various glasses (including fluorine glass, borosilicate glass, soda glass, barium glass, barium aluminum silica glass, glass including strontium or zirconium, glass ceramics, fluoroaluminosilicate glass, synthetic glass obtained by a sol-gel method, and the like), AEROSIL (registered trademark), calcium fluoride, strontium fluoride, calcium carbonate, kaolin, clay, mica, aluminum sulfate, calcium sulfate, barium sulfate, titanium oxide, calcium phosphate, hydroxyapatite, calcium hydroxide, strontium hydroxide, and zeolite. Examples of the organic filler include polymethyl methacrylate (PMMA), polyethyl methacrylate, polypropyl methacrylate, polybutyl methacrylate, polyvinyl acetate, polyethylene glycol, polypropylene glycol, polyvinyl alcohol, and the like.

These inorganic filling materials and/or fillers may be surface-treated with a known titanate coupling agent, aluminate coupling agent, or silane coupling agent. Examples of the silane coupling agent include γ-methacryloxypropyltrimethoxysilane, γ-methacryloxypropyltriethoxysilane, and the like. Preferably, γ-methacryloxypropyltrimethoxysilane is used. Surfaces of the aggregate and filler may be treated with the same kind of coupling agent or different kind of coupling agent.

<Casting Apparatus>

The casting apparatus 20 is an apparatus that casts the prosthetic apparatus 4 of a metal cast denture base by using the shaped body 3 produced by the production apparatus 10. The casting apparatus 20 may include, for example, equipment for performing casting with a lost-wax method.

The casting apparatus 20 includes, for example, a mold production apparatus that produces a mold for prosthetic apparatus manufacturing, by using the shaped body 3, a pouring apparatus that introduces molten metal into the mold, a digging apparatus that breaks the mold to remove a cast metal, and a finishing apparatus that adjusts and finishes the cast metal into the prosthetic apparatus 4.

[Manufacturing Method for Prosthetic Apparatus]

Next, a manufacturing method for the prosthetic apparatus 4 performed by the manufacturing apparatus 1 will be described. According to the first embodiment, in the manufacturing method for the prosthetic apparatus 4, the casting apparatus 20 produces the prosthetic apparatus 4 of a metal cast denture base by using the shaped body 3 for dental purpose produced by the production apparatus 10. For this reason, as a manufacturing method for the prosthetic apparatus 4, a method for producing the shaped body 3 for dental purpose, and a method for producing the prosthetic apparatus 4 of a metal cast denture base by using the shaped body 3 will be described.

<Production Method for Shaped Body>

Figure 6:
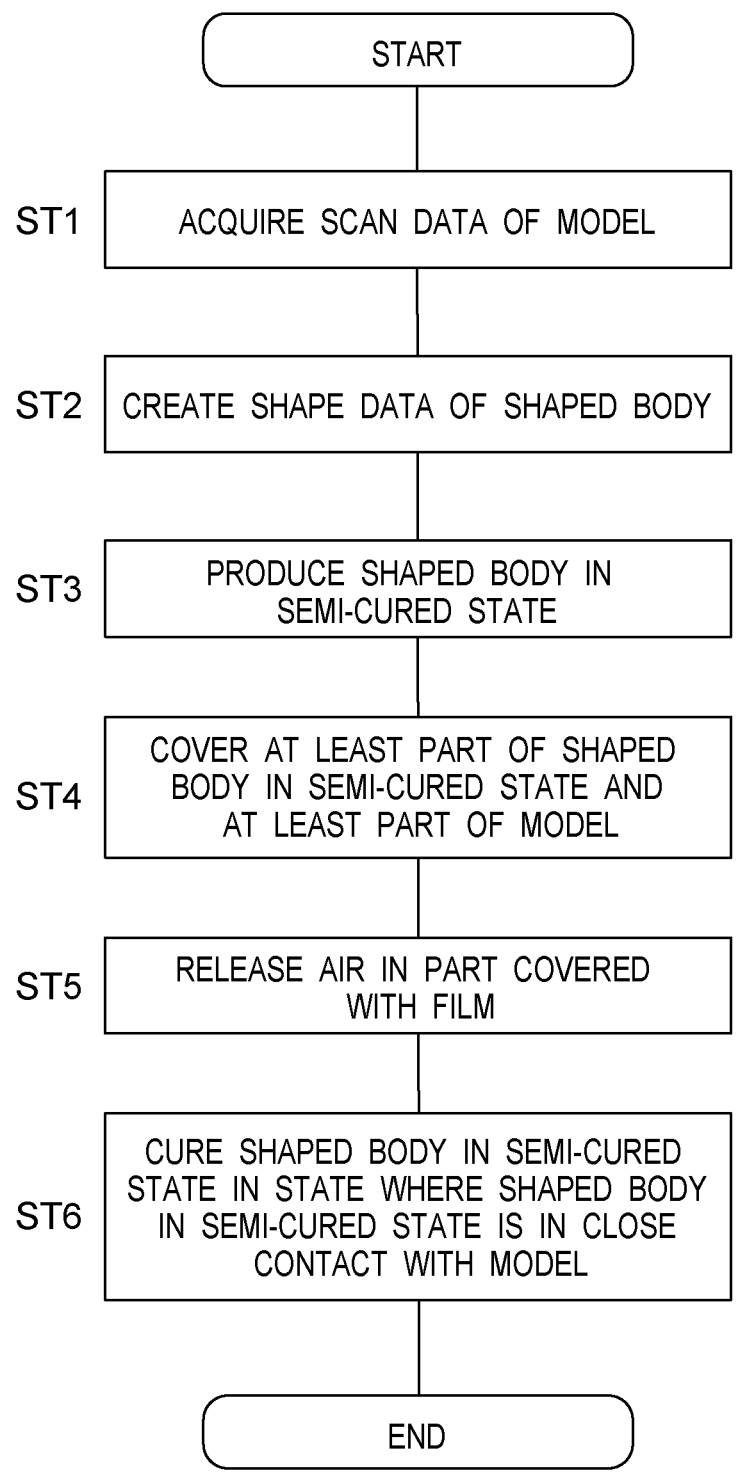
FIG. 6 is a flowchart illustrating an example of a production method for a shaped body of the first embodiment according to the present invention.

First, a production method for the shaped body 3 will be described by using FIG. 6. FIG. 6 is a flowchart illustrating an example of a production method for the shaped body 3 of the first embodiment according to the present invention.

Note that Steps ST1 to ST6 illustrated in FIG. 6 are performed by the production apparatus 10.

As illustrated in FIG. 6, Step ST1 is an acquisition process of acquiring scan data of the model 2 that is a reproduction of at least a part of an inside of an oral cavity of a patient. In Step ST1, the shape data creating apparatus 11 acquires the scan data of the model 2 from the scanning apparatus 21. Specifically, the scanning apparatus 21 scans the model 2 (refer to FIG. 2) to acquire scan data of the model 2. The shape data creating apparatus 11 acquires the scan data of the model 2 from the scanning apparatus 21.

Step ST2 is a shape data creating process of preparing shape data of the shaped body 3 for dental purpose on the basis of the scan data. In Step ST2, the shape data creating apparatus 11 creates the shape data of the shaped body 3 for dental purpose having a shape and size conforming to the model 2 on the basis of the scan data of the model 2 acquired in Step ST1.

Step ST3 is a shaped body production process of producing the shaped body 5 in the semi-cured state on the basis of the shape data. In Step ST3, the optical shaping apparatus 12 produces the shaped body 5 in the semi-cured state on the basis of the shape data created in Step ST2 (refer to FIG. 3).

A polymerization rate of the shaped body 5 in the semi-cured state produced in Step ST3 is 50% or more and 98% or less. Preferably, the polymerization rate of the shaped body 5 in the semi-cured state produced in Step ST3 is 60% or more and 95% or less. More preferably, the polymerization rate of the shaped body 5 in the semi-cured state produced in Step ST3 is 70% or more and 90% or less. By setting the polymerization rate of the shaped body 5 in the semi-cured state produced in Step ST3 within an above-described numerical range, conformity of the shaped body 3 in the final cured state can be improved.

For example, in a case where the polymerization rate of the shaped body 5 in the semi-cured state is less than 50%, polymerization shrinkage may increase in a curing process (Step ST6) to be described later, or the shaped body in the semi-cured state may be too soft, resulting in occurrence of unintended deformation of the shaped body 5 in the semi-cured state. In addition, in a case where the polymerization rate of the shaped body 5 in the semi-cured state is more than 98%, the shaped body 5 in the semi-cured state is less likely to fit the model 2 in an air release process (Step ST5) to be described later. Accordingly, by setting the polymerization rate of the shaped body 5 in the semi-cured state produced in Step ST3 within an above-described numerical range, the shaped body 5 in the semi-cured state can be suitably fitted to the model 2 in the air release process (Step ST5) to be described later. In addition, the polymerization shrinkage can be decreased in the curing process (Step ST6) to be described later, and occurrence of unintended deformation in the shaped body 5 in the semi-cured state can be reduced.

Step ST4 is a covering process of attaching the shaped body 5 in the semi-cured state to the model 2 and covering at least a part of the shaped body 5 in the semi-cured state and at least a part of the model 2 with the film 6. In Step ST4, in a state where the shaped body 5 in the semi-cured state shaped in Step ST3 is attached to the model 2 (refer to FIG. 4), the vacuum packaging apparatus 13 covers the shaped body 5 in the semi-cured state and the model 2 with the film 6 (refer to FIG. 5). In the first embodiment, entire surfaces of the shaped body 5 in the semi-cured state and the model 2 are covered with the film 6. Note that, in Step ST4, an example has been described in which the vacuum packaging apparatus 13 covers the shaped body 5 in the semi-cured state and the model 2 with the film 6, but the present invention is not limited thereto. For example, the shaped body 5 in the semi-cured state and the model 2 may be covered with the film 6 by an apparatus separate from the vacuum packaging apparatus 13. Alternatively, the shaped body 5 in the semi-cured state and the model 2 may be covered with the film 6 by any method or any apparatus.

Step ST5 is an air release process of releasing air in the part covered with the film 6 to deform the film 6 and bring the shaped body 5 in the semi-cured state into close contact with the model 2. In Step ST5, the air releaser 15 of the vacuum packaging apparatus 13 releases the air in the part covered with the film 6 in Step ST4. Thus, the inside of the film 6 is subjected to negative pressure to deform the film 6, and the shaped body 5 in the semi-cured state is pressed against the model 2 by the film 6. As a result, the shaped body 5 in the semi-cured state is in close contact with the model 2.

Step ST5 may include an adjustment process of adjusting a vacuum degree of the part covered with the film 6. For example, in the adjustment process, a vacuum degree of the part covered with the film 6 is adjusted to 40% or more and 95% or less by the adjuster 16 of the vacuum packaging apparatus 13. Preferably, in the adjustment process, a vacuum degree of the part covered with the film 6 is adjusted to 50% or more and 90% or less. More preferably, in the adjustment process, a vacuum degree of the part covered with the film 6 is adjusted to 60% or more and 70% or less.

In Step ST5, after the air in the part covered with the film 6 is released, the sealing unit of the vacuum packaging apparatus 13 seals the film 6. Thus, the shaped body 5 in the semi-cured state and the model 2 remain in close contact with each other.

Step ST6 is a curing process (light emission process) of curing the shaped body 5 in the semi-cured state by emitting light on the shaped body 5 in the semi-cured state where the shaped body 5 is in close contact with the model 2. In Step ST6, the light emission apparatus 14 emits light on the shaped body 5 in the semi-cured state, in a state where the shaped body 5 is in close contact with the model 2. Light emitted from the light emission apparatus 14 cures the shaped body 5 in the semi-cured state, and is, for example, ultraviolet light. The light emitted from the light emission apparatus 14 is transmitted through the film 6 and emitted on the shaped body 5 in the semi-cured state. Thus, the shaped body 5 in the semi-cured state is cured. As a result, the shaped body 3 in the final cured state is completed. Note that the curing process may be referred to as a light emission process.

As described above, with the production method for the shaped body 3, the shaped body 3 can be manufactured by performing Steps ST1 to ST6.

<Production Method for Prosthetic Apparatus>

Next, a method for producing the prosthetic apparatus 4 of a metal cast denture base by using the shaped body 3 will be described by using FIG. 7. Note that Steps ST11 to ST15 illustrated in FIG. 7 are performed by the casting apparatus 20.

Figure 7:
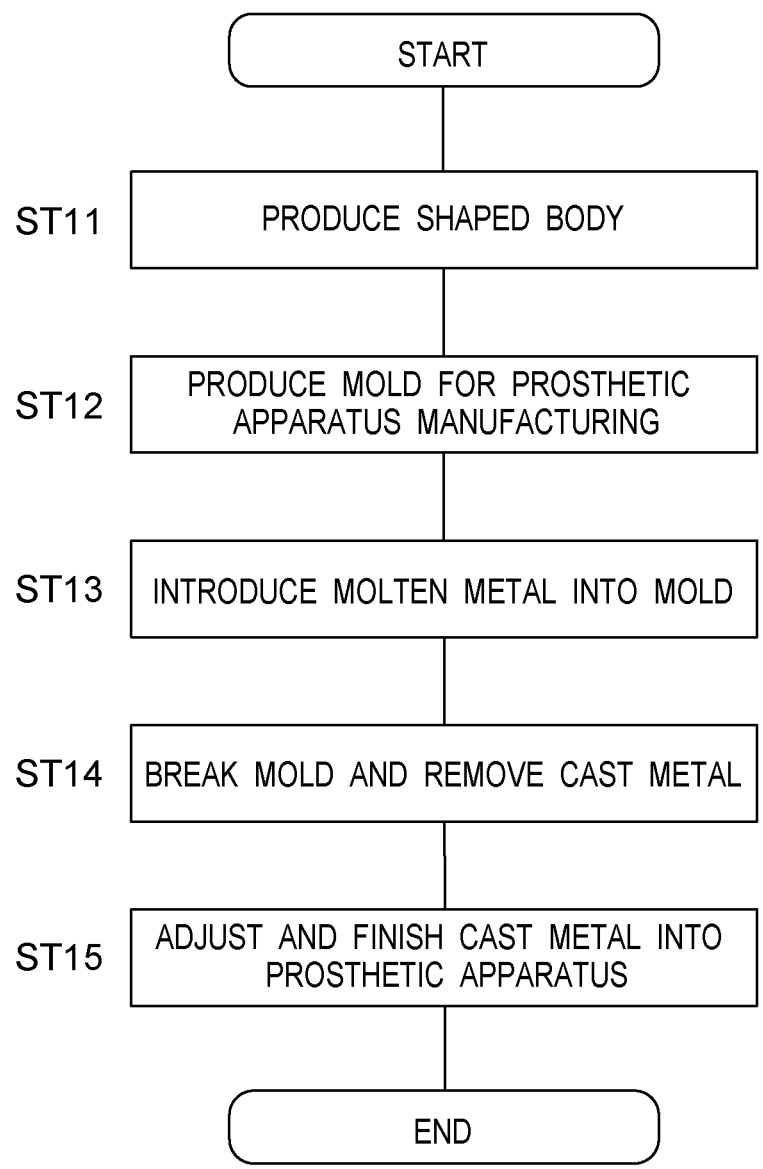
FIG. 7 is a flowchart illustrating an example of the production method for the prosthetic apparatus of the first embodiment according to the present invention.

As illustrated in FIG. 7, Step ST11 is a shaped body production process of producing the shaped body 3 with the production method for the shaped body 3 illustrated in FIG. 6. In Step ST11, the shaped body 3 is produced by the production apparatus 10 performing Steps ST1 to ST6 illustrated in FIG. 6.

Step ST12 is a mold production process of producing a mold for prosthetic apparatus manufacturing, by using the shaped body 3 as a casting pattern. Step ST12 includes a wax-up process, an investment process, and a burning process.

Figure 8A:
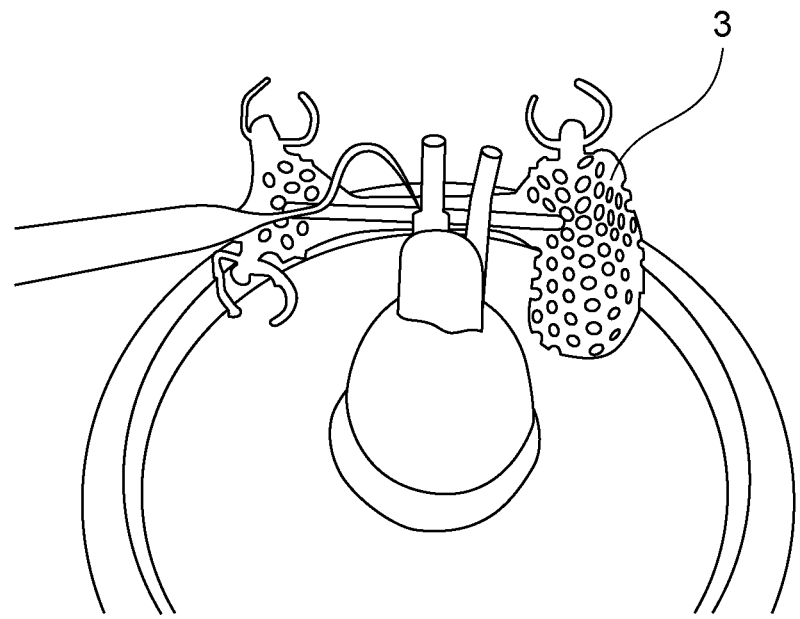
FIG. 8A is a schematic diagram illustrating an example of a wax-up process.

FIG. 8A is a schematic diagram illustrating an example of the wax-up process. As illustrated in FIG. 8A, in the wax-up process, the shaped body 3 produced in Step ST11 is waxed up on a rubber table. Specifically, when the molten metal is introduced into the mold, spruing for adjusting flow of the molten metal is performed.

Figure 8B:
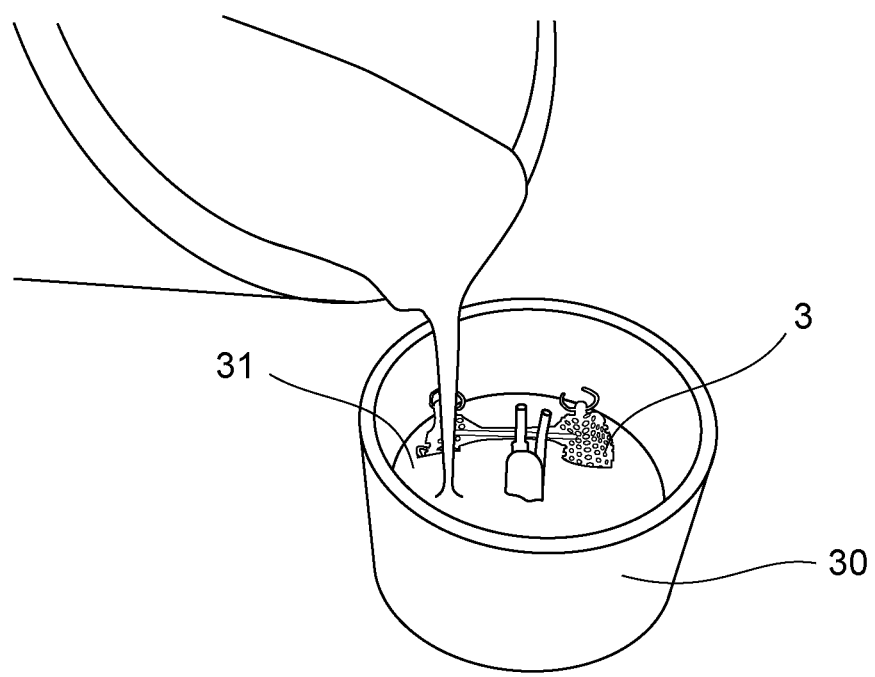
FIG. 8B is a schematic diagram illustrating an example of an investment process.

FIG. 8B is a schematic diagram illustrating an example of the investment process. As illustrated in FIG. 8B, in the investment process, the shaped body 3 after being subjected to the wax-up process is invested in an investment material 31 mixed with water and malaxated. Examples of the investment material 31 include a cristobalite investment material, a phosphate-based investment material, and the like. Specifically, the shaped body 3 after carrying performing the wax-up process is disposed in a ring 30. Then, the investment material 31 mixed with water and malaxated is injected into the ring 30, by which the shaped body 3 is invested in the investment material 31. After the shaped body 3 is invested in the investment material 31, the investment material 31 is hardened. Note that a bottom of the ring 30 may be blocked with, for example, a rubber table until the investment material 31 is hardened. After the investment material 31 is hardened, the bottom of the ring 30 may not be blocked.

Figure 8C:
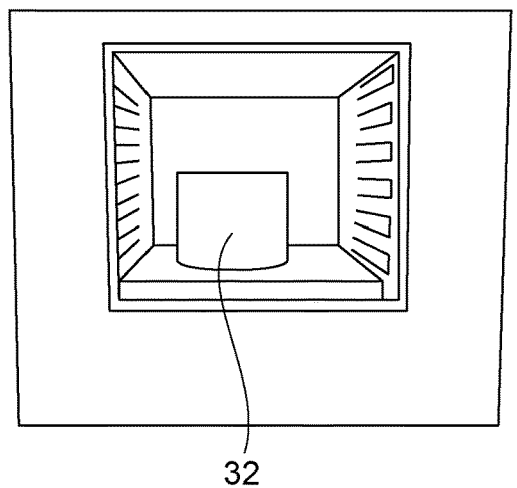
FIG. 8C is a schematic diagram illustrating an example of a burning process.

FIG. 8C is a schematic diagram illustrating an example of the burning process. As illustrated in FIG. 8C, in the burning process, after the investment process is performed, the ring 30 and the rubber table are removed, and the hardened investment material including the shaped body 3 is burned. Thus, the shaped body 3 is melted, and the shaped body 3 is removed from the hardened investment material. In addition, in the burning process, the hardened investment material remains unmelted. Thus, a hollow having a shape of the shaped body 3 is formed inside the hardened investment material. This hardened investment material is used as a mold 32 for prosthetic apparatus manufacturing.

Figure 8D:
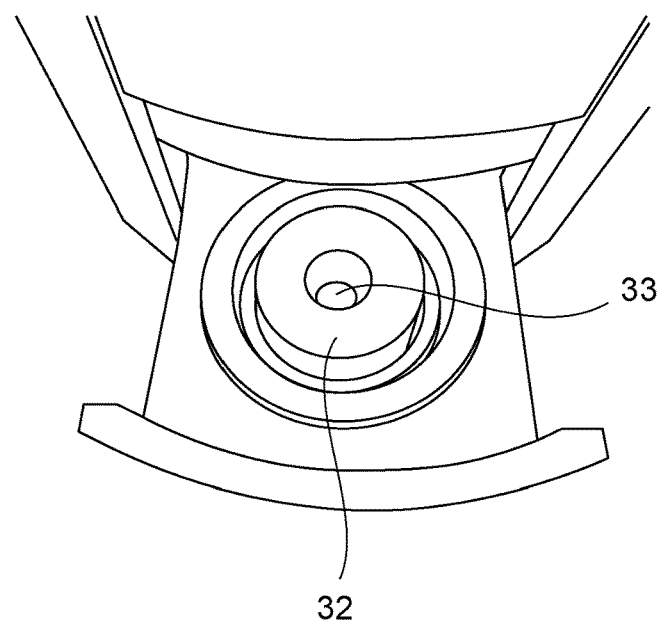
FIG. 8D is a schematic diagram illustrating an example of a casting process.

Returning to FIG. 7, Step ST13 is a pouring process of introducing molten metal 33 into the mold 32. FIG. 8D is a schematic diagram illustrating an example of the casting process. As illustrated in FIG. 8D, in the casting process, the molten metal 33 is introduced into the mold 32. After the molten metal 33 is introduced into the mold 32, the molten metal 33 is hardened.

Figure 8E:
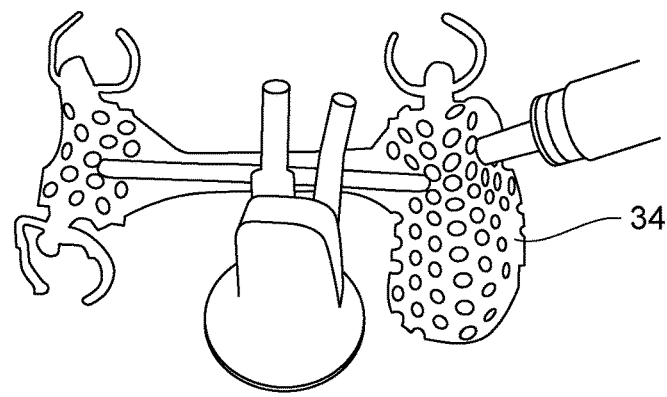
FIG. 8E is a schematic diagram illustrating an example of a digging process.

Returning to FIG. 7, Step ST14 is a digging process of breaking the mold 32 and removing a cast metal 34. In Step ST14, the mold 32 is broken, and the cast metal 34 inside the mold 32 is removed. The cast metal 34 is a metal casting product hardened in Step ST13, and is formed in a shape similar to the shape of the shaped body 3. FIG. 8E is a schematic diagram illustrating an example of the digging process. FIG. 8E illustrates the cast metal 34 removed from the mold 32.

Step ST15 is a finishing process of adjusting and finishing the cast metal 34 into the prosthetic apparatus 4. A shape of the cast metal 34 removed in Step ST14 is adjusted with an abrasive material and a polishing material to finish the cast metal 34 into the prosthetic apparatus 4.

As described above, in the production method for the prosthetic apparatus 4, the prosthetic apparatus 4 of a metal cast denture base can be produced by performing Steps ST11 to ST15.

Figure 9:
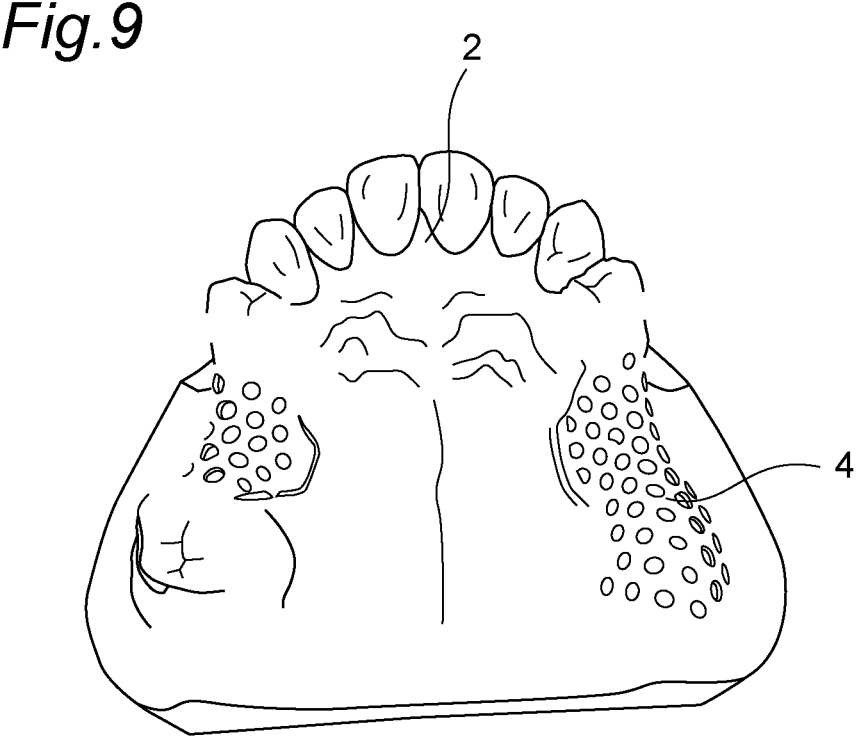
FIG. 9 is a schematic diagram illustrating an example of the prosthetic apparatus of the first embodiment according to the present invention.

FIG. 9 is a schematic diagram illustrating an example of the prosthetic apparatus 4 of the first embodiment according to the present invention. FIG. 9 illustrates an example of a state where the prosthetic apparatus 4 is attached to the model 2. Note that the prosthetic apparatus 4 illustrated in FIG. 9 is an example, and the prosthetic apparatus 4 is not limited thereto.

[Effects]

According to the first embodiment according to the present invention, the following effects can be obtained.

The manufacturing apparatus 1 for the prosthetic apparatus 4 includes the production apparatus 10 of the shaped body 3 and the casting apparatus 20 that produces the prosthetic apparatus 4 of a metal cast denture base by using the shaped body 3. The production apparatus 10 includes the shape data creating apparatus 11, the optical shaping apparatus 12, the vacuum packaging apparatus 13, and the light emission apparatus 14. The shape data creating apparatus 11 acquires scan data of the model 2 that is a reproduction of the inside of the oral cavity of the patient, and creates shape data of the shaped body 3 for dental purpose on the basis of the scan data. The optical shaping apparatus 12 produces the shaped body 5 in the semi-cured state on the basis of the shape data. In a state where at least a part of the shaped body 5 in the semi-cured state and at least a part of the model 2 are covered with film 6, the vacuum packaging apparatus 13 releases air in the film 6. Thus, the shaped body 5 in the semi-cured state is brought into close contact with the model 2. The light emission apparatus 14 cures the shaped body 5 in the semi-cured state by emitting light on the shaped body 5 in the semi-cured state, in a state where the shaped body 5 is in close contact with the model 2.

With such a configuration, the shaped body 5 in the semi-cured state produced by the optical shaping apparatus 12 is cured by light from the light emission apparatus 14 in a state where the shaped body 5 is in close contact with the model 2. When the shaped body 5 in the semi-cured state is finally cured by light from the light emission apparatus 14, warpage and deformation due to shrinkage can be reduced. Thus, conformity of the shaped body 3 in the final cured state to the model 2 can be improved. As a result, it is possible to improve conformity of the prosthetic apparatus 4 of a metal cast denture base to the inside of the oral cavity of the patient, the prosthetic apparatus 4 being produced by the casting apparatus 20 with the shaped body 3.

The manufacturing method for the prosthetic apparatus 4 includes a production method for the shaped body 3 and a production method for the prosthetic apparatus 4 of a metal cast denture base by using the shaped body 3. The production method for the shaped body 3 includes an acquisition process ST1, a shape data creating process ST2, a shaped body production process ST3, a covering process ST4, an air release process ST5, and a curing process ST6. The acquisition process ST1 acquires scan data of the model 2 that is a reproduction of at least a part of the inside of the oral cavity of the patient. The shape data creating process ST2 creates shape data of the shaped body 3 for dental purpose on the basis of the scan data. The shaped body production process ST3 produces the shaped body 5 in the semi-cured state on the basis of the shape data. The covering process ST4 attaches the shaped body 5 in the semi-cured state to the model 2 and covers at least a part of the shaped body 5 in the semi-cured state and at least a part of the model 2 with the film 6. The air release process ST5 releases air in the part covered with the film 6 to deform the film 6 and bring the shaped body 5 in the semi-cured state into close contact with the model 2. The curing process ST6 cures the shaped body 5 in the semi-cured state by emitting light on the shaped body 5 in the semi-cured state, in a state where the shaped body 5 is in close contact with the model 2.

With such a configuration, the shaped body 5 in the semi-cured state is cured in a state of being in close contact with the model 2. When the shaped body 5 in the semi-cured state is finally cured, warpage and deformation due to shrinkage can be reduced. Thus, conformity of the shaped body 3 in the final cured state to the model 2 can be improved. As a result, it is possible to improve conformity of the prosthetic apparatus 4 of a metal cast denture base to the inside of the oral cavity of the patient, the prosthetic apparatus 4 being produced by the production method for the prosthetic apparatus 4 of a metal cast denture base.

In general, the more complex a shape of a prosthetic apparatus is, the more difficult it is to improve conformity. For example, in a method described in the JP '300 reference, deformation of a part not fixed by a fixing member cannot be prevented, and therefore the more complex a shape of the shaped body is, the more easily the shaped body partially separates from the model. According to the manufacturing apparatus 1 for and the manufacturing method for the prosthetic apparatus 4, partial separation of the model 2 from the shaped body 5 and deformation of the shaped body 5 can be reduced also in a case of manufacturing the prosthetic apparatus 4 having a complex shape. For this reason, also in the case of manufacturing the prosthetic apparatus 4 having a complex shape, conformity of the prosthetic apparatus 4 can be improved.

When used as a casting pattern, the shaped body 3 produced by the manufacturing apparatus 1 and the manufacturing method is preferably for a metal cast denture base. The metal cast denture base has a complex structure having a mixture of a major connector of which design is called internal and a clasp of which design is called external. According to the manufacturing apparatus 1 and the manufacturing method, the shaped body 3 in the final cured state with good conformity to the model 2 is obtained.

The air release process ST5 includes an adjustment process of adjusting a vacuum degree of the part covered with the film 6 to 40% or more and 95% or less. Preferably, the adjustment process adjusts a vacuum degree of the part covered with film 6 to 50% or more and 90% or less. More preferably, the adjustment process adjusts a vacuum degree of the part covered with film 6 to 60% or more and 70% or less. With such a configuration, a vacuum degree can be adjusted, and the conformity of the shaped body 3 in the final cured state to the model 2 can be adjusted.

A polymerization rate of the shaped body 5 in the semi-cured state produced in the shaped body production process ST3 is 50% or more and 98% or less. Preferably, the polymerization rate of the shaped body 5 in the semi-cured state is 60% or more and 95% or less. More preferably, the polymerization rate of the shaped body 5 in the semi-cured state is 70% or more and 90% or less. With such a configuration, the conformity of the shaped body 3 in the final cured state to the model 2 can be further improved.

The shaped body production process ST3 produces the shaped body 5 in the semi-cured state with the optical shaping apparatus 12 of the digital light processing method. With such a configuration, the shaped body 3 can be produced in a shorter time.

The film 6 transmits light having a wavelength of 100 nm or more and 780 nm or less. Preferably, the film 6 transmits light having a wavelength of 300 nm or more and 600 nm or less. More preferably, the film 6 transmits light having a wavelength of 350 nm or more and 500 nm or less. With such a configuration, light for curing the shaped body 5 in the semi-cured state, for example, ultraviolet light and visible light are easily transmitted through the film 6.

In addition, the prosthetic apparatus 4 is produced with the shaped body 3 obtained by curing the shaped body 5 in the semi-cured state by (i) releasing air in a part covered with the film 6 in a state where at least a part of the shaped body 5 in the semi-cured state and at least a part of the model 2 are covered with film 6 to bring the shaped body 5 in the semi-cured state into close contact with the model 2, and (ii) emitting light on the shaped body 5 in the semi-cured state, in a state where the shaped body is in close contact with the model 2. With such a configuration, the prosthetic apparatus 4 has an effect of improving conformity to the inside of the oral cavity of the patient.

In addition, the vacuum packaging apparatus 13 is a vacuum packaging apparatus used for manufacturing a prosthetic apparatus, and includes the air releaser 15 that releases air in the film 6 that covers at least a part of the shaped body 5 in the semi-cured state and at least a part of the model 2. The air releaser 15 releases air in the part covered with the film 6 to deform the film 6 and bring the shaped body 5 in the semi-cured state into close contact with the model 2. With such a configuration, the shaped body 5 in the semi-cured state can be brought into close contact with and fixed to the model 2. Thus, it is possible to reduce chances of the shaped body 5 in the semi-cured state partially separating from the model 2.

The vacuum packaging apparatus 13 further includes the adjuster 16 that adjusts a vacuum degree of the part covered with the film 6 to 40% or more and 95% or less. Preferably, the adjuster 16 adjusts a vacuum degree of the part covered with film 6 to 50% or more and 90% or less. More preferably, the adjuster 16 adjusts a vacuum degree of the part covered with film 6 to 60% or more and 70% or less. With such a configuration, with such a configuration, a vacuum degree can be adjusted, and the conformity of the shaped body 3 in the final cured state to the model 2 can be adjusted.

Note that, in the first embodiment, an example of producing the shaped body 3 including a metal cast denture base pattern, and manufacturing, by using the shaped body 3, the prosthetic apparatus 4 of a metal cast denture base has been described, but the present invention is not limited thereto.

In the first embodiment, an example has been described in which the manufacturing apparatus 1 for the prosthetic apparatus 4 includes the production apparatus 10 of the shaped body 3 and the casting apparatus 20 that produces the prosthetic apparatus 4 of a metal cast denture base by using the shaped body 3, but the present invention is not limited thereto. In addition, an example has been described in which the manufacturing method for the prosthetic apparatus 4 includes the method for producing the shaped body 3 and the method for producing, by using the shaped body 3, the prosthetic apparatus of a metal cast denture base, but the present invention is not limited thereto.

For example, the manufacturing apparatus 1 for the prosthetic apparatus 4 may not include the casting apparatus 20 and may include the production apparatus 10. In addition, the manufacturing method for the prosthetic apparatus 4 may not include the method for producing the prosthetic apparatus 4 of a metal cast denture base by using the shaped body 3, and may include the method for producing the shaped body 3. In this case, the shaped body 3 itself produced by the production apparatus 10 and the production method for the shaped body 3 may be used as the prosthetic apparatus 4.

Figure 10:
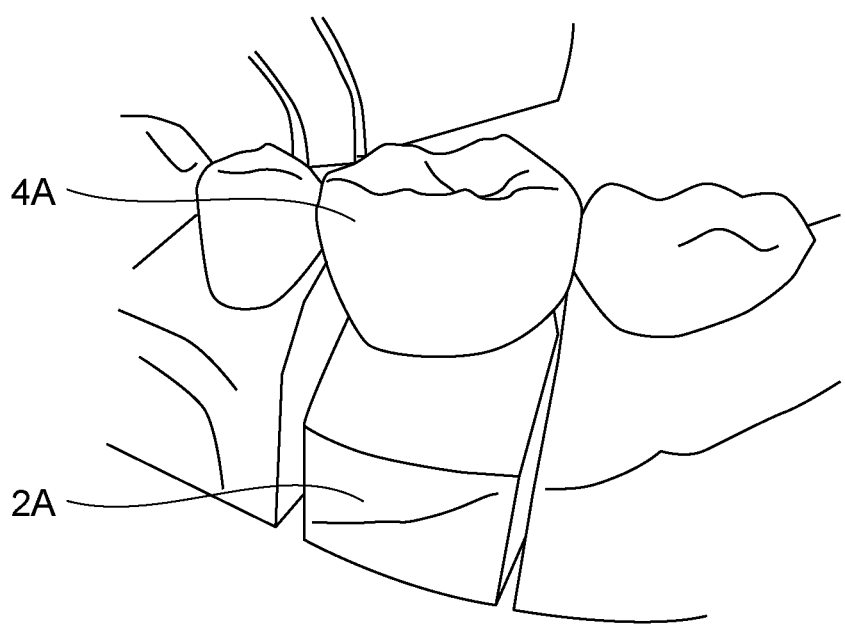
FIG. 10 is a schematic diagram illustrating another example of the prosthetic apparatus of the first embodiment according to the present invention.
Figure 11:
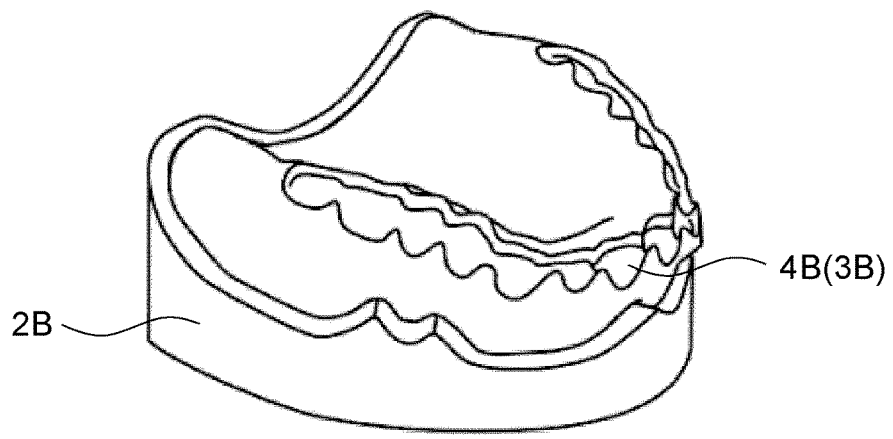
FIG. 11 is a schematic diagram illustrating another example of the prosthetic apparatus of the first embodiment according to the present invention.
Figure 12:
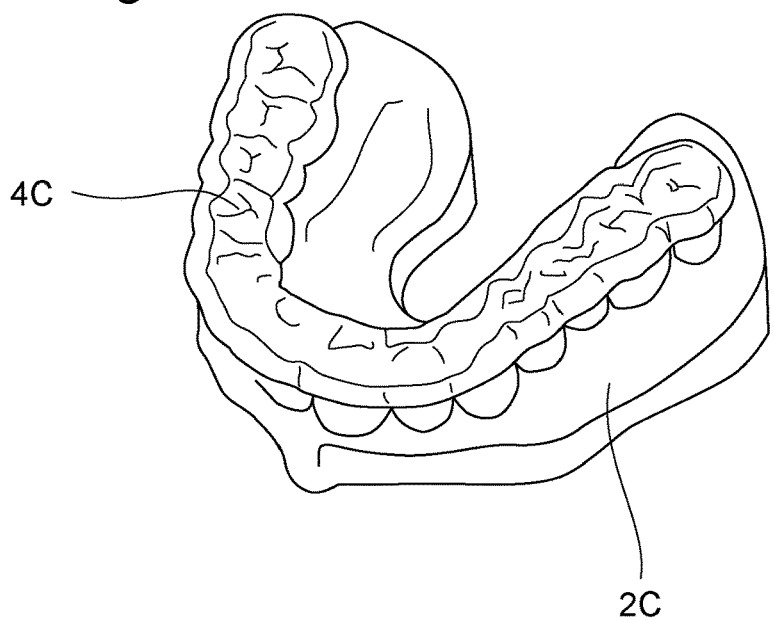
FIG. 12 is a schematic diagram illustrating another example of the prosthetic apparatus of the first embodiment according to the present invention.

FIGS. 10 to 12 are schematic diagrams illustrating the prosthetic apparatuses 4A to 4C that are other examples of the first embodiment according to the present invention. Note that the examples illustrated in FIGS. 10 to 12 illustrate states where the prosthetic apparatuses 4A to 4C are attached to the models 2A to 2C, respectively. The prosthetic apparatus 4A illustrated in FIG. 10 is a crown. The prosthetic apparatus 4B illustrated in FIG. 11 is a resin base. The prosthetic apparatus 4C illustrated in FIG. 12 is an orthodontic splint. The prosthetic apparatuses 4A to 4C illustrated in FIGS. 10 to 12, respectively, are produced by the production apparatus 10 and the production method for the shaped body 3. That is, in the prosthetic apparatuses 4A to 4C, the shaped body 3 in the final cured state produced by the production apparatus 10 and the production method for the shaped body 3 is used as is as a prosthetic apparatus.

As described above, the shaped body 3 produced by the production apparatus 10 and the production method for the shaped body 3 may be any one of a crown, a bridge, a resin base, and an orthodontic splint, and these shaped bodies 3 may be used as the prosthetic apparatuses 4A to 4C. With such configurations also, conformity of the prosthetic apparatuses 4A to 4C to the model 2 and the inside of the oral cavity of the patient can be improved.

In the first embodiment, an example has been described in which the shape data creating apparatus 11, the optical shaping apparatus 12, the vacuum packaging apparatus 13, and the light emission apparatus 14 are separate apparatuses in the production apparatus 10, but the present invention is not limited thereto. A plurality of apparatuses may be integrally formed as one apparatus. For example, the shape data creating apparatus 11 and the optical shaping apparatus 12 may be integrally formed as one apparatus. The vacuum packaging apparatus 13 and the light emission apparatus 14 may be integrally formed as one apparatus.

In the first embodiment, an example has been described in which the scanning apparatus 21 is not included in a component of the manufacturing apparatus 1, but the present invention is not limited thereto. The scanning apparatus 21 may be included in a component of the manufacturing apparatus 1. In addition, the manufacturing apparatus 1 may include a model production apparatus that takes impression of the inside of the oral cavity of the patient and produces the model 2.

In the first embodiment, an example in which the manufacturing apparatus 1 includes the vacuum packaging apparatus 13 has been described, but the present invention is not limited thereto. The manufacturing apparatus 1 may include a covering apparatus capable of bringing the shaped body 5 into close contact with the model 2, with the film 6. For example, other than a vacuum packaging apparatus, the covering apparatus may be a pressure-bonding apparatus that applies pressure to the shaped body 5 so that the shaped body 5 is brought into close contact with the model 2, or may be a sealing apparatus that seals the shaped body 5 with the film 6, in a state where the shaped body 5 is in close contact with the model 2, or the like.

In the first embodiment, an example has been described in which the vacuum packaging apparatus 13 includes the adjuster 16 that adjusts a vacuum degree, but the present invention is not limited thereto. The vacuum packaging apparatus 13 may not include the adjuster 16.

In the first embodiment, an example has been described in which the manufacturing apparatus 1 includes the light emission apparatus 14 as a curing apparatus, but the present invention is not limited thereto. That is, the curing apparatus is not limited to the light emission apparatus 14. The manufacturing apparatus 1 may include a curing apparatus that cures the shaped body 5 in a state where the shaped body 5 is in close contact with the model 2. For example, the curing apparatus may be a heating apparatus that heats the shaped body 5 in close contact with the model 2.

In the first embodiment, the examples illustrated in FIGS. 3 and 9 have been described as shapes of the shaped body 3 and prosthetic apparatus 4, but the shapes are not limited thereto. The shapes of the shaped body 3 and prosthetic apparatus 4 can be any shape according to case history of the patient and the shape inside of the oral cavity of the patient.

In the first embodiment, an example of the manufacturing method for the prosthetic apparatus 4 has been described, but the method is not limited thereto. For example, a method for preparing the shaped body 3 may be used as a post-curing method for a shaped body. The post-curing method includes at least Steps ST3 to ST6 in FIG. 6.

In the first embodiment, an example has been described in which the curing process in Step ST6 cures the shaped body 5 in the semi-cured state by emitting light on the shaped body 5 in the semi-cured state, in a state where the shaped body 5 is in close contact with the model 2, but the present invention is not limited thereto. The curing process in Step ST6 may a process of curing the shaped body 5 in the semi-cured state in a state where the shaped body 5 in the semi-cured state is in close contact with the model 2. For example, the curing process in Step ST6 may be a heating process of heating the shaped body 5 in the semi-cured state in a state where the shaped body 5 in the semi-cured state is in close contact with the model 2. Alternatively, the curing process may include one or a plurality of processes of curing the shaped body. For example, the curing process may include at least either of a first curing process (light emission process) by light emission and a second curing process (heating process) by heating.

In the first embodiment, the shaped body produced by the optical shaping apparatus 12 is referred to as the shaped body 5 in the semi-cured state, and the shaped body cured by the light emission apparatus 14 is referred to as the shaped body 3 in the final cured state, but the terms are not limited thereto. The term indicating a curing state of the shaped body may be arbitrarily determined. For example, the shaped body 5 in the semi-cured state may be referred to as the shaped body 5 in a first curing state, and the shaped body 3 in the final cured state may be referred to as the shaped body 3 in a second curing state. The second curing state means a state where a degree of curing is great as compared to the first curing state.

In the first embodiment, an example has been described in which the scanning apparatus 21 acquires scan data of the model 2 that is a reproduction of the inside of the oral cavity of the patient, but the present invention is not limited thereto. For example, the scanning apparatus 21 may directly scan the inside of the oral cavity of the patient to acquire scan data of the inside of the oral cavity. In this case, the shape data creating apparatus 11 may acquire scan data of the inside of the oral cavity of the patient, and may create shape data of the shaped body 3 for dental purpose on the basis of the scan data.

In the first embodiment, an example has been described in which the shaped body 3 is any one of a crown, a bridge, a resin base, or an orthodontic splint, but the shaped body 3 is not limited thereto. For example, the shaped body 3 may be a resin base denture. The resin base denture means a denture in which a plurality of artificial teeth is bonded to a resin base of a denture base.

In the first embodiment, an example in which the prosthetic apparatus 4 is a metal cast denture base has been described, but the prosthetic apparatus 4 is not limited to a metal cast denture base. For example, the prosthetic apparatus 4 may be a denture.

EXAMPLES

A manufacturing apparatus for and a manufacturing method for the prosthetic apparatus 4 will be further described on the basis of examples, but the present invention is not limited to the following examples. Note that, in the examples, the shaped body 3 produced by the production apparatus 10 for and a production method for the shaped body 3 have been evaluated.

Hereinafter, conditions of the examples will be described.
[Conditions of Examples]
<Optical Shaping Apparatus>

As the optical shaping apparatus 12, D30 of the DLP method (manufactured by Rapid Shape) and DIGITAL WAX 020D of the SLA method (manufactured by DWS) were used.
<Material Forming Shaped Body>

Cast (manufactured by NextDent, material: acrylate resin) and Base (manufactured by NextDent, material: acrylate resin) for the DLP method, and RF080 RESIN (manufactured by DWS, material: acrylate resin) for the SLA method were used.
<Film>

Hiryu N-5NP, which is a standard bag with magic cut (manufactured by Asahi Kasei Pax, material: nylon, polyethylene) was used.
<Light Emission Apparatus>

LC-3DPrint Box (manufactured by NextDent) was used.

Evaluation samples for examples 1 to 18 and comparative examples 1 to 4 were prepared by the following procedure.
[Production of Conformity Evaluation Samples]

By using the production apparatus 10 of the first embodiment, the shaped body 3 was produced as a conformity evaluation sample. Specifically, shape data of the shaped body 3 for dental purpose was created according to the model 2 by the shape data creating apparatus 11. On the basis of the produced shape data, the shaped body 5 in the semi-cured state was produced by the optical shaping apparatus 12 according to an instruction manual of each material or a condition initially set. After completion of the shaping, the shaped body 5 in the semi-cured state was subjected to ultrasonic cleaning in ethanol for five minutes, a support was removed, and then the shaped body 5 was attached to the model 2. Thereafter, the shaped body 5 in the semi-cured state and the model 2 were covered with the film 6, and air in the part covered with the film 6 was released by the vacuum packaging apparatus 13 to bring the shaped body 5 in the semi-cured state and the model 2 into close contact with each other. Thereafter, in a state where the shaped body 5 in the semi-cured state and the model 2 were in close contact with each other, the shaped body 5 was irradiated with light (post-cured) by the light emission apparatus 14 for 15 minutes.
[Production of Polymerization Rate Evaluation Samples]

A part of the support removed at a time of production of the conformity evaluation sample was used as a polymerization evaluation sample.
[Conformity Evaluation Method]

For conformity evaluation, the model 2 for a metal cast denture base illustrated in FIG. 2 was used to design a shaped body 3 for dental purpose. In addition, a shaped body 3A illustrated in FIG. 14 was designed by using a model 2D for a three-unit bridge illustrated in FIG. 13. In addition, a shaped body 3B illustrated in FIG. 11 was designed by using a model 2B having a resin base (complete denture base) illustrated in FIG. 15.

A comprehensive conformity evaluation will be described. With respect to the shaped body 3 for a metal base, the shaped body 3 was attached to the model 2 illustrated in FIG. 2, and gaps at a major connector, a clasp, and a rest were measured. As a measurement method, DAIFREE (manufactured by DAIKIN INDUSTRIES) was applied to the model 2, measurement points were chemically polymerized by using resin cement (ResiCem (manufactured by SHOFU INC.)), and thickness of the resin cement was measured. Note that the measurement was performed twice, and an average value thereof was used.

It is clinically acceptable if the gaps at all of the major connector, clasp, and rest are 500 μm or less, and it is clinically optimal if the gaps at all of the major connector, clasp, and rest are 100 μm or less.

Figure 13:
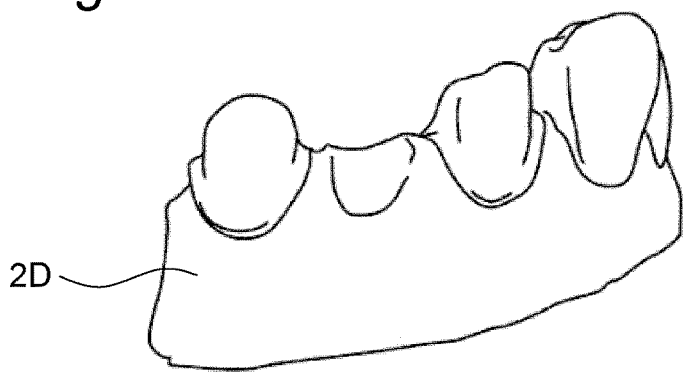
FIG. 13 is a schematic diagram illustrating an example of a model of an example.
Figure 14:
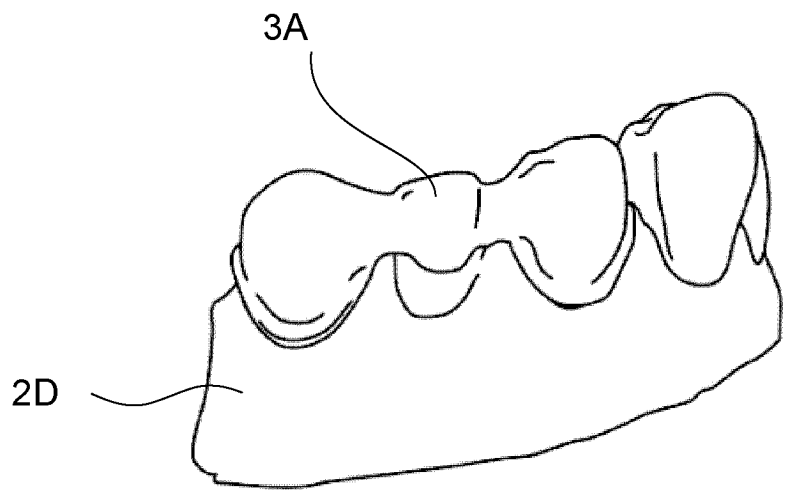
FIG. 14 is a schematic diagram illustrating an example of a prosthetic apparatus of the example.

In addition, with respect to the shaped body 3A for a three-unit bridge, when the shaped body 3A is attached to the model 2D illustrated in FIG. 13, and conformity of a margin part of the shaped body 3A is evaluated, the gap of the shaped body 3A of 100 μm or less is clinically acceptable, and the gap of the shaped body 3A of 50 μm or less is optimal.

Figure 15:
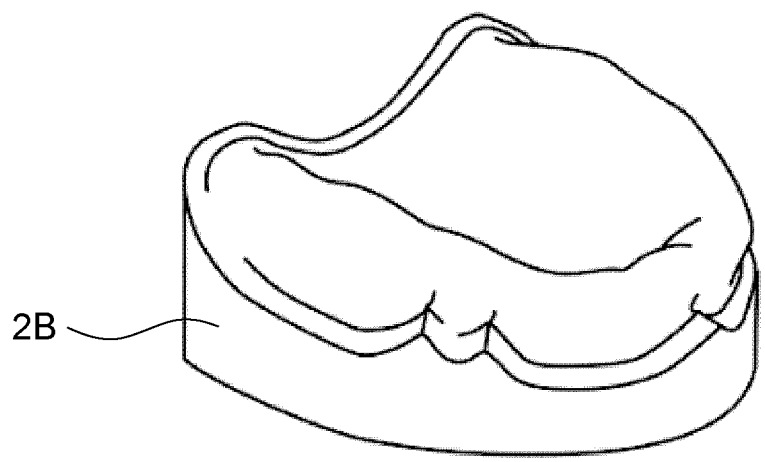
FIG. 15 is a schematic diagram illustrating an example of a model of an example.

In addition, with respect to the shaped body 3B for a resin base, the shaped body 3B was attached to the model 2B illustrated in FIG. 15, and gaps between the shaped body 3B and the model 2B were measured. FINE CHECKER (manufactured by SHOFU INC.) was used to measure the gaps of a complete denture, and a greatest value among measurement values of a central portion was measured. The gaps are clinically acceptable to be 500 μm or less, and more preferably 100 μm or less.
[Polymerization Rate Evaluation Method]

By using Fourier Transform Infrared Spectrometer FT-IR 6300 (manufactured by JASCO Corporation), peak intensity attributed to C=C at 6000 cm$^{-1}$ was measured for resin material of the shaped body 3 before shaping, a shaped body (a part of the support) in a semi-cured state, and a shaped body (a part of the support) in a final cured state. The polymerization rate was calculated from a rate of a decrease rate of the peak intensity. In this regard, a polymerization rate of the shaped body in the semi-cured state was calculated provided that the polymerization rate of the shaped body in the final cured state is 100%.

Evaluation results are illustrated in Tables 1 to 9 below.

TABLE 1

| | Example 1 | Example 2 | Example 3 | Example 4 |
|---|---|---|---|---|
| Type of optical shaping apparatus | D30 | D30 | D30 | D30 |
| Material of shaped body | Cast | Cast | Cast | Cast |
| Polymerization rate of shaped body in semi-cured state (%) | 80 | 80 | 80 | 80 |
| Use of vacuum packaging apparatus | Yes | Yes | Yes | Yes |
| Vacuum degree (%) | 35 | 40 | 50 | 60 |
| Model for conformity evaluation | Metal base | Metal base | Metal base | Metal base |
| Gap at major connector (μm) | 250 | 150 | 90 | 80 |
| Gap at clasp (μm) | 260 | 200 | 90 | 75 |
| Gap at rest (μm) | 260 | 200 | 80 | 60 |

TABLE 2

|  | Example 5 | Example 6 | Example 7 | Example 8 |
|---|---|---|---|---|
| Type of optical shaping apparatus | D30 | D30 | D30 | D30 |
| Material of shaped body | Cast | Cast | Cast | Cast |
| Polymerization rate of shaped body in semi-cured state (%) | 80 | 80 | 80 | 80 |
| Use of vacuum packaging apparatus | Yes | Yes | Yes | Yes |
| Vacuum degree (%) | 70 | 90 | 95 | 99 |
| Model for conformity evaluation | Metal base | Metal base | Metal base | Metal base |
| Gap at major connector (μm) | 70 | 150 | 300 | 450 |
| Gap at clasp (μm) | 75 | 200 | 150 | 400 |
| Gap at rest (μm) | 65 | 200 | 150 | 350 |

TABLE 3

|  | Example 9 | Example 10 | Example 11 | Example 12 |
|---|---|---|---|---|
| Type of optical shaping apparatus | D30 | D30 | D30 | D30 |
| Material of shaped body | Cast | Cast | Cast | Cast |
| Polymerization rate of shaped body in semi-cured state (%) | 40 | 50 | 60 | 70 |
| Use of vacuum packaging apparatus | Yes | Yes | Yes | Yes |
| Vacuum degree (%) | 70 | 70 | 70 | 70 |
| Model for conformity evaluation | Metal base | Metal base | Metal base | Metal base |
| Gap at major connector (μm) | 260 | 110 | 75 | 75 |
| Gap at clasp (μm) | 260 | 120 | 100 | 90 |
| Gap at rest (μm) | 250 | 140 | 80 | 80 |

TABLE 4

|  | Example 13 | Example 14 | Example 15 | Example 16 |
|---|---|---|---|---|
| Type of optical shaping apparatus | D30 | D30 | D30 | D30 |
| Material of shaped body | Cast | Cast | Cast | Cast |
| Polymerization rate of shaped body in semi-cured state (%) | 90 | 95 | 98 | 99 |
| Use of vacuum packaging apparatus | Yes | Yes | Yes | Yes |
| Vacuum degree (%) | 70 | 70 | 70 | 70 |
| Model for conformity evaluation | Metal base | Metal base | Metal base | Metal base |
| Gap at major connector (μm) | 110 | 130 | 200 | 270 |
| Gap at clasp (μm) | 90 | 110 | 150 | 250 |
| Gap at rest (μm) | 100 | 130 | 190 | 250 |

TABLE 5

|  | Example 17 | Example 18 |
|---|---|---|
| Type of optical shaping apparatus | DIGITAL WAX 020D | DIGITAL WAX 020D |
| Material of shaped body | RF080 RESIN | RF080 RESIN |
| Polymerization rate of shaped body in semi-cured state (%) | 80 | 80 |
| Use of vacuum packaging apparatus | Yes | Yes |
| Vacuum degree (%) | 70 | 40 |
| Model for conformity evaluation | Metal base | Metal base |
| Gap at major connector (μm) | 60 | 100 |
| Gap at clasp (μm) | 90 | 90 |
| Gap at rest (μm) | 55 | 85 |

TABLE 6

|  | Example 19 | Example 20 |
|---|---|---|
| Type of optical shaping apparatus | D30 | D30 |
| Material of shaped body | Cast | Cast |
| Polymerization rate of shaped body in semi-cured state (%) | 80 | 80 |
| Use of vacuum packaging apparatus | Yes | Yes |
| Vacuum degree (%) | 50 | 70 |
| Model for conformity evaluation | Three-unit bridge | Three-unit bridge |
| Gap at margin (μm) | 95 | 45 |

TABLE 7

|  | Example 21 | Example 22 |
|---|---|---|
| Type of optical shaping apparatus | D30 | D30 |
| Material of shaped body | Base | Base |
| Polymerization rate of shaped body in semi-cured state (%) | 80 | 80 |
| Use of vacuum packaging apparatus | Yes | Yes |
| Vacuum degree (%) | 50 | 70 |
| Model for conformity evaluation | Resin base | Resin base |
| Gap at central portion of palate (μm) | 150 | 90 |

TABLE 8

|  | Comparative Example 1 | Comparative Example 2 |
|---|---|---|
| Type of optical shaping apparatus | D30 | DIGITAL WAX 020D |
| Material of shaped body | Cast | RF080 RESIN |
| Polymerization rate of shaped body in semi-cured state (%) | 80 | 80 |
| Use of vacuum packaging apparatus | No | No |
| Vacuum degree (%) | — | — |
| Model for conformity evaluation | Metal base | Metal base |
| Gap at major connector (μm) | 600 | 750 |
| Gap at clasp (μm) | 750 | 800 |
| Gap at rest (μm) | 650 | 800 |

TABLE 9

|  | Comparative Example 3 | Comparative Example 4 |
|---|---|---|
| Type of optical shaping apparatus | D30 | D30 |
| Material of shaped body | Cast | Base |
| Polymerization rate of shaped body in semi-cured state (%) | 80 | 80 |
| Use of vacuum packaging apparatus | No | No |
| Vacuum degree (%) | — | — |
| Model for conformity evaluation | Three-unit bridge | Resign base |
| Gap at margin (μm) | 200 | — |
| Gap at central portion of palate (μm) | — | 600 |

First, attention is paid to the examples 1 to 18 and the comparative examples 1 to 2 that are regarding the model 2 for a metal cast denture base and the shaped body 3. Note that, in the examples 1 to 18, the vacuum packaging apparatus 13 is used to adjust a vacuum degree. Meanwhile, in the comparative examples 1 to 2, the vacuum packaging apparatus 13 is not used.

As illustrated in Tables 1 to 5 and Table 8, the gaps were 500 μm or less at any of the major connector, the clasp, and the rest in the examples 1 to 18. Meanwhile, the gaps were within a range of 600 μm or more and 800 μm or less at any of the major connector, the clasp, and the rest in the comparative examples 1 to 2. As described above, in the examples 1 to 18, the gaps are smaller than the gaps in the comparative examples 1 to 2. In addition, although the gaps in the examples 1 to 18 fall within a clinically acceptable range, the gaps in the comparative examples 1 to 2 are beyond the clinically acceptable range.

Attention is paid to the examples 1 to 8. As illustrated in Tables 1 and 2, in the examples 1 to 8, conditions are common except for a vacuum degree. In the examples 1 to 8, the gaps are small when the vacuum degree is in a range of 40% or more and 95% or less. In addition, the gaps are smaller when the vacuum degree is in a range of 50% or more and 90% or less. Then, the gaps are smallest when the vacuum degree is in a range of 60% or more and 70% or less. In the examples 6 to 8, due to a high vacuum degree, deformation occurred and the gaps increased. From these results, the vacuum degree is preferably 40% or more and 95% or less. More preferably, the vacuum degree is 50% or more and 90% or less. Even more preferably, the vacuum degree is 60% or more and 70% or less.

Attention is paid to the example 5 and the examples 9 to 16. As illustrated in Tables 2 to 4, in the example 5 and the examples 9 to 16, conditions are common except for a polymerization rate of the shaped body in the semi-cured state. In the example 5 and the examples 9 to 16, the gaps are small when the polymerization rate is in a range of 50% or more and 98% or less. In addition, the gaps are smaller when the polymerization rate is in a range of 60% or more and 95% or less. Then, the gaps are smallest when the polymerization rate is in a range of 70% or more and 90% or less. From these results, the polymerization rate of a shaped body in a semi-cured state is preferably 50% or more and 98% or less. More preferably, the polymerization rate is 60% or more and 95% or less. Even more preferably, the polymerization rate is 70% or more and 90% or less.

Attention is paid to the examples 2 and 5, and the examples 17 and 18. As illustrated in Tables 1 to 2 and 5, the examples 2 and 5 are different from the examples 17 and 18 in a type of the optical shaping apparatus 12 and material of the shaped body 3. In the examples 2 and 5, an optical shaping apparatus of the DLP method (D30) is used, and material of the shaped body 3 is Cast. Meanwhile, in the examples 17 and 18, an optical shaping apparatus of the SLA method (DIGITAL WAX 020D) is used, and material of the shaped body 3 is RF080 RESIN. In addition, the vacuum degree is 70% in the examples 5 and 17, and the vacuum degree is 40% in the examples 2 and 18. Other conditions are common in the examples 2, 5, 17, and 18. Although the DLP method is a shaping method with accuracy lower than accuracy of the SLA method, from the evaluation results in the examples 2, 5, 17, and 18, it can be seen that, with the DLP method also, the gaps can be reduced to almost the same as with the SLA method.

Next, attention is paid to examples 19 to 20 and a comparative example 3 that are regarding the model 2D for a three-unit bridge and the shaped body 3A. Note that, in the examples 19 to 20, the vacuum packaging apparatus 13 is used to adjust a vacuum degree. Meanwhile, in the comparative example 3, the vacuum packaging apparatus 13 is not used.

As illustrated in Tables 6 and 9, a gap at a margin is small in the examples 19 to 20 as compared to the comparative example 3. Although the gaps fall within a clinically acceptable range in the examples 19 to 20, the gaps are beyond the clinically acceptable range in the comparative example 3.

In addition, in comparison between the example 19 with a vacuum degree of 50% with the example 20 with a vacuum degree of 70%, a gap at a margin is smaller in the example 20. For this reason, the vacuum degree is preferably close to 70% from a viewpoint of further reducing the gap.

Next, attention is paid to examples 21 to 22 and a comparative example 4 that are regarding the model 2B for a resin base and the shaped body 3B. Note that, in the examples 21 to 22, the vacuum packaging apparatus 13 is used to adjust a vacuum degree. Meanwhile, in the comparative example 4, the vacuum packaging apparatus 13 is not used.

As illustrated in Tables 6 and 8, gaps at a central portion of a palate are small in the examples 21 to 22 as compared to the comparative example 4. Although the gaps fall within a clinically acceptable range in the examples 21 to 22, the gaps are beyond the clinically acceptable range in the comparative example 4.

In addition, in comparison between the example 21 with a vacuum degree of 50% with the example 22 with a vacuum degree of 70%, the gap at the central portion of the palate is smaller in the example 22. For this reason, the vacuum degree is preferably close to 70% from a viewpoint of further reducing the gap.

As described above, in the examples 1 to 22, the gaps between the model and the shaped body can be reduced as compared to the comparative examples 1 to 4. In addition, the evaluation results of the examples 1 to 22 fall within a clinically acceptable range, whereas the evaluation results of the comparative examples 1 to 4 are beyond the clinically acceptable range.

Second Embodiment

A manufacturing apparatus for and manufacturing method for a prosthetic apparatus of a second embodiment according to the present invention will be described.

In the second embodiment, points different from the first embodiment will be mainly described. In the second embodiment, configurations the same as or equivalent to configurations of the first embodiment will be described with the same reference characters. In addition, in the second embodiment, description overlapping with the first embodiment will be omitted.

Figure 16:
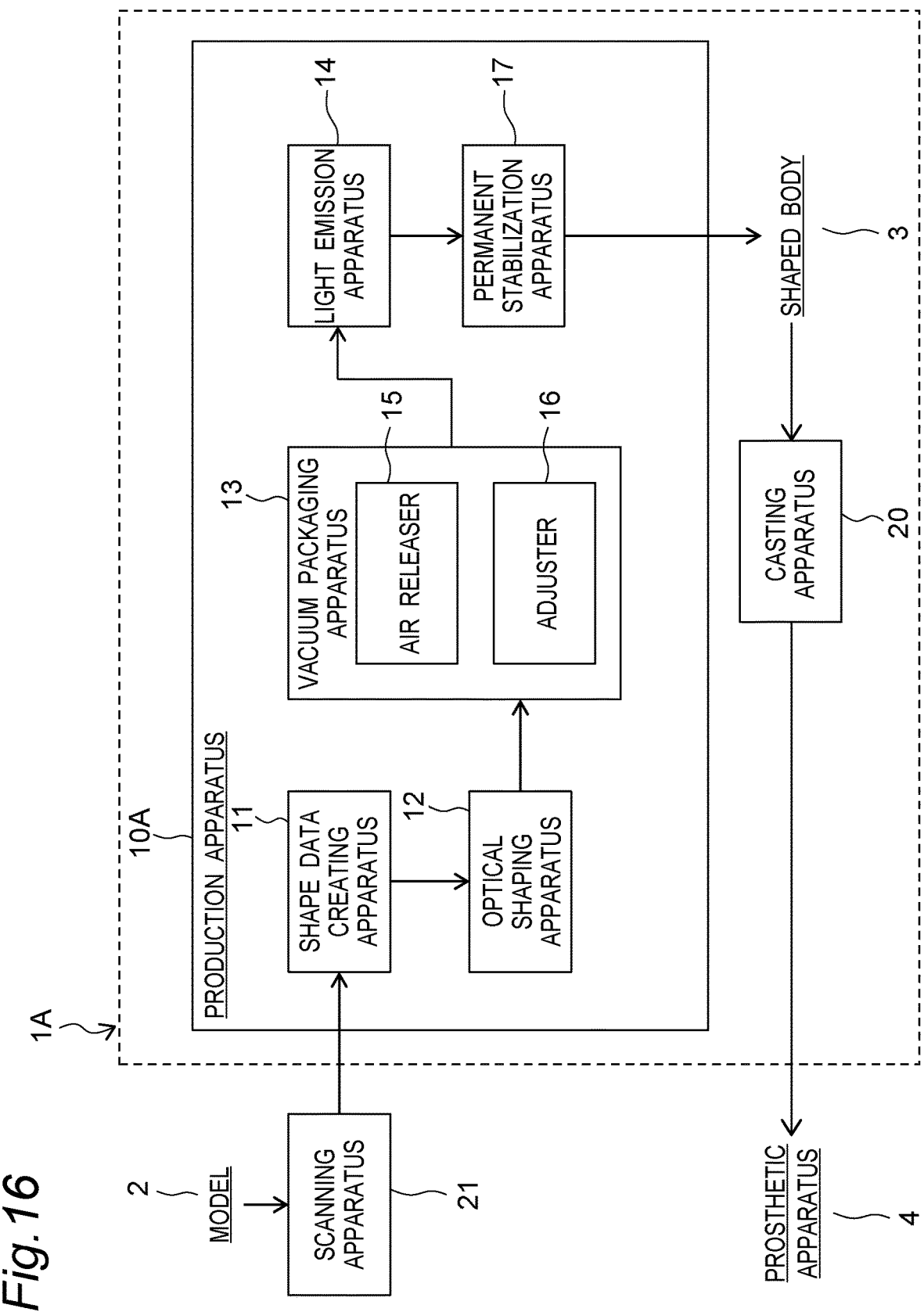
FIG. 16 is a block diagram illustrating an example of a manufacturing apparatus for a prosthetic apparatus of a second embodiment according to the present invention.

FIG. 16 is a block diagram illustrating an example of a manufacturing apparatus 1A for a prosthetic apparatus 4 of the second embodiment according to the present invention.

The second embodiment is different from the first embodiment in that a production apparatus 10A of the manufacturing apparatus 1A includes a permanent stabilization apparatus (heating apparatus) 17.

In the first embodiment, when the film 6 covering the shaped body in the final cured state and model 2 are removed after the light emission, immediately after the removal, conformity of the shaped body in a final cured state is in a state of being improved. However, the shaped body in the final cured state may deform with time after the film 6 is removed, and conformity may decrease. In a case of a casting pattern for example, a shaped body in a final cured state easily changes with time, and therefore, if a wax-up process and investment process are not performed immediately after the film is removed, the produced prosthetic apparatus may partially separate from the model and may not conform.

In the second embodiment, in order to reduce a decrease in conformity of a shaped body 3 in a final cured state, the shaped body after light emission is heated by the permanent stabilization apparatus (heating apparatus) 17. Thus, a shaped body in a permanently stable state is obtained. Hereinafter, the second embodiment will be described in detail.

In the second embodiment, the shaped body 5 in the semi-cured state produced by the optical shaping apparatus 12 is referred to as a shaped body in a first curing state, and a shaped body cured by the light emission apparatus 14 is referred to as a shaped body in a second curing state, and a shaped body heated by the permanent stabilization apparatus 17 is referred to as a shaped body in a third curing state. The second curing state means a state where a degree of curing is great as compared to the first curing state. The third curing state means a state where a degree of curing is great as compared to the second curing state.

As illustrated in FIG. 16, the production apparatus 10A of the manufacturing apparatus 1A includes the permanent stabilization apparatus 17 in addition to the configuration in the first embodiment. In the second embodiment, in the production apparatus 10A, a shape data creating apparatus 11, the optical shaping apparatus 12, a vacuum packaging apparatus 13, the light emission apparatus 14, and the permanent stabilization apparatus 17 are disposed in this order from an upstream side to a downstream side.

<Permanent Stabilization Apparatus>

The permanent stabilization apparatus 17 heats the shaped body in the second curing state cured by the light emission apparatus 14, in a state where the shaped body is in close contact with the model 2. Thus, the shaped body in the second curing state is further cured to be a shaped body 3 in the third curing state, thereby obtaining the shaped body 3 in the permanently stable state. In the second embodiment, the permanent stabilization apparatus 17 is disposed downstream of the light emission apparatus 14. The permanent stabilization apparatus 17 heats the shaped body in the second curing state produced by the light emission apparatus 14, in a state where the shaped body is in close contact with the model 2.

The permanent stabilization apparatus 17 is may be, for example, a heating apparatus that can perform heating and can adjust temperature. Hereinafter, the permanent stabilization apparatus 17 is referred to as a heating apparatus 17. Examples of the heating apparatus 17 include a heater. Heating temperature by the heating apparatus 17 is 50° C. or more and 130° C. or less. Preferably, the heating temperature is 65° C. or more and 115° C. or less. More preferably, the heating temperature is 80° C. or more and 100° C. or less. Specifically, in a case where the heating temperature is lower than 50° C., a shaped body 3 in a permanently stable state is not sufficiently stabilized, and it is difficult to obtain a shaped body 3 in a permanently stable state that changes little with time. In addition, in a case where the heating temperature is higher than 130° C., there is a risk of decomposition of resin, and therefore, it is difficult to obtain a shaped body in a permanently stable state that changes little with time, and the shaped body may not conform. Therefore, by adjusting the heating temperature of the heating apparatus 17 to fall within an above-described numerical range, a shaped body 3 in a permanently stable state that changes little with time can be obtained. During mooring time in time of heating, it is preferable to continue a heating state to such an extent that the shaped body 3 in the permanently stable state is obtained. Specifically, it is preferably 3 minutes or more and 60 minutes or less. The heating may be performed by gradually increasing temperature from room temperature, or may be performed in an environment set in an above-described numerical range. Heating temperature and heating time in the heating apparatus 17 can be adjusted as appropriate according to a shape and required dimensions of the shaped body 3 in a permanently stable state. Note that, not limited to above, the heating apparatus 17 is preferably immersed in warm water (50° C. to 100° C.)

In the second embodiment, a thermal polymerization initiator may be included as a material that forms the shaped body 3. Suitably used as the thermal polymerization initiator are, for example, an organic peroxide such as benzoyl peroxide, para-chlorobenzoyl peroxide, 2,4-dichlorobenzoyl peroxide, acetyl peroxide, lauroyl peroxide, tertiary butyl peroxide, cumene hydroperoxide, 2,5-dimethylhexane, 2,5-dihydroperoxide, methyl ethyl ketone peroxide, or tertiary butyl peroxybenzoate, and azo compounds such as azobisisobutyronitrile, methyl azobisisobutyrate, and azobiscyanovaleric acid. Among them, benzoyl peroxide, azobisisobutyronitrile, trimethylbarbituric acid, or tributylborane oxide is preferably selected and used in the present invention.

In the second embodiment, the heating apparatus 17 heats the shaped body in the second curing state and the model 2 that are covered with film 6. For this reason, the film 6 is formed by a heat-resistant material. Note that the film 6 may be formed by a material that withstands heating temperature described above. Examples of the heat-resistant material include nylon, polyethylene, polystyrene, polyimide, and fluororesin.

Figure 17:
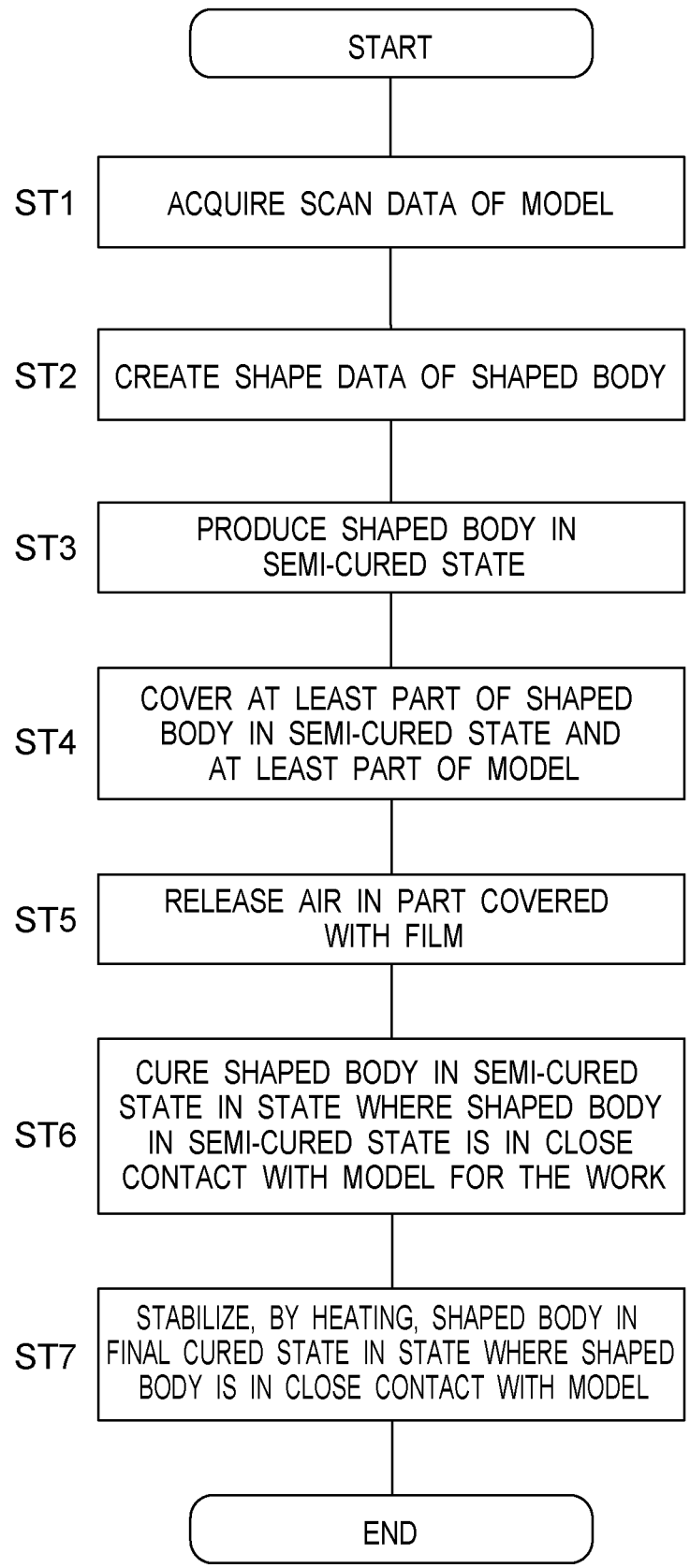
FIG. 17 is a flowchart illustrating an example of a production method for a shaped body of the second embodiment according to the present invention.

FIG. 17 is a flowchart illustrating an example of a production method for a shaped body of the second embodiment according to the present invention. Note that Steps ST1 to ST6 of the production method in the second embodiment illustrated in FIG. 17 are similar to Steps ST1 to ST6 of the production method in the first embodiment illustrated in FIG. 6, and therefore detailed description thereof is omitted.

As illustrated in FIG. 17, a shaped body in the second curing state can be obtained by performing Steps ST1 to ST6. Specifically, the shaped body 5 in the first curing state is produced by performing Steps ST1 to ST3. The shaped body in the second curing state is produced by performing Steps ST4 to ST6. The shaped body in the second curing state is in a state of being covered with the film 6 together with the model 2. For this reason, the shaped body in the second curing state is in close contact with the model 2.

Step ST7 is a permanent stabilization process (heating process) of stabilizing the shaped body in the second curing state by heating the shaped body in close contact with the model 2. In Step ST7, the heating apparatus 17 heats the shaped body in the second curing state, in a state where the shaped body is in close contact with the model 2. The heating by the heating apparatus 17 stabilizes the shaped body in the second curing state. Thus, the shaped body in the second curing state is further cured to obtain the shaped body 3 in the third curing state, which is more cured than the shaped body in the second curing state. As a result, the shaped body 3 in the permanently stable state is completed. Note that the permanent stabilization process may be referred to as a heating process.

As described above, with the production method for the shaped body 3 in the permanently stable state according to the second embodiment, the shaped body 3 in the permanently stable state can be manufactured by performing Steps ST1 to ST7 illustrated in FIG. 17.

[Effects]

According to the second embodiment according to the present invention, the following effects can be obtained.

In the manufacturing apparatus 1A of the prosthetic apparatus 4, the production apparatus 10A further includes the heating apparatus 17 that heats the shaped body in the second curing state cured by the light emission apparatus 14, in a state where the shaped body is in close contact with the model 2. With such a configuration, the shaped body in the third curing state obtained by further curing the shaped body 5 in the second curing state can be brought into the permanently stable state, and temporal change of the shaped body 3 can be reduced. As a result, because the shaped body 3 is in the permanently stable state, even if the shaped body 3 removed from the model 2 and stored for a certain period of time is used, it is possible to improve conformity of the prosthetic apparatus 4 of a metal cast denture base to an inside of an oral cavity of a patient, prosthetic apparatus 4 being produced by the casting apparatus 20.

The manufacturing method for the prosthetic apparatus 4 according to the second embodiment further includes the permanent stabilization process (heating process) ST7 of heating the shaped body in the second curing state cured in the light emission process ST6, in a state where the shaped body is in close contact with the model 2. With such a configuration, the shaped body in the second curing state can be cured to produce the shaped body 3 in the third curing state. The shaped body 3 in the third curing state is in a permanently stable state, and therefore a temporal change can be reduced. As a result, it is possible to improve conformity of the prosthetic apparatus 4 of a metal cast denture base to the inside of the oral cavity of the patient, the prosthetic apparatus 4 being produced by the production method for the prosthetic apparatus 4 of a metal cast denture base.

The prosthetic apparatus 4 according to the second embodiment is produced with the shaped body 3 in the permanently stable state obtained by further heating the shaped body in the second curing state in a state where the shaped body is in close contact with the model 2. With such a configuration, conformity to the inside of the oral cavity of the patient is improved.

Note that, in the second embodiment, an example has been described in which the shape data creating apparatus 11, the optical shaping apparatus 12, the vacuum packaging apparatus 13, the light emission apparatus 14, and the heating apparatus 17 are separate apparatuses in the production apparatus 10A, but the present invention is not limited thereto. A plurality of apparatuses may be integrally formed as one apparatus. For example, the light emission apparatus 14 and the heating apparatus 17 may be integrally formed as one apparatus.

Although Step ST7 is referred to as a permanent stabilization process or a heating process in the second embodiment, Steps ST6 and ST7 may be collectively referred to as a curing process. That is, the curing process may include a first curing process (light emission process) of emitting light on the shaped body 5 in the first curing state when the shaped body 5 is in close contact with the model 2, and a second curing process (heating process) of heating the shaped body in the second curing state when the shaped body 5 is in close contact with the model 2. Specifically, the first curing process is Step ST6, and the shaped body 5 in the first curing state is cured by light emission by the light emission apparatus 14 to obtain a shaped body in the second curing state. The second curing process is Step ST7, and a shaped body in the second curing state is cured by heating by the heating apparatus 17 to obtain a shaped body in the third curing state.

Third Embodiment

A manufacturing apparatus for and manufacturing method for a prosthetic apparatus of a third embodiment according to the present invention will be described.

In the third embodiment, points different from the second embodiment will be mainly described. In the third embodiment, configurations the same as or equivalent to configurations of the second embodiment will be described with the same reference characters. In addition, in the third embodiment, description overlapping with the second embodiment will be omitted.

Figure 18:
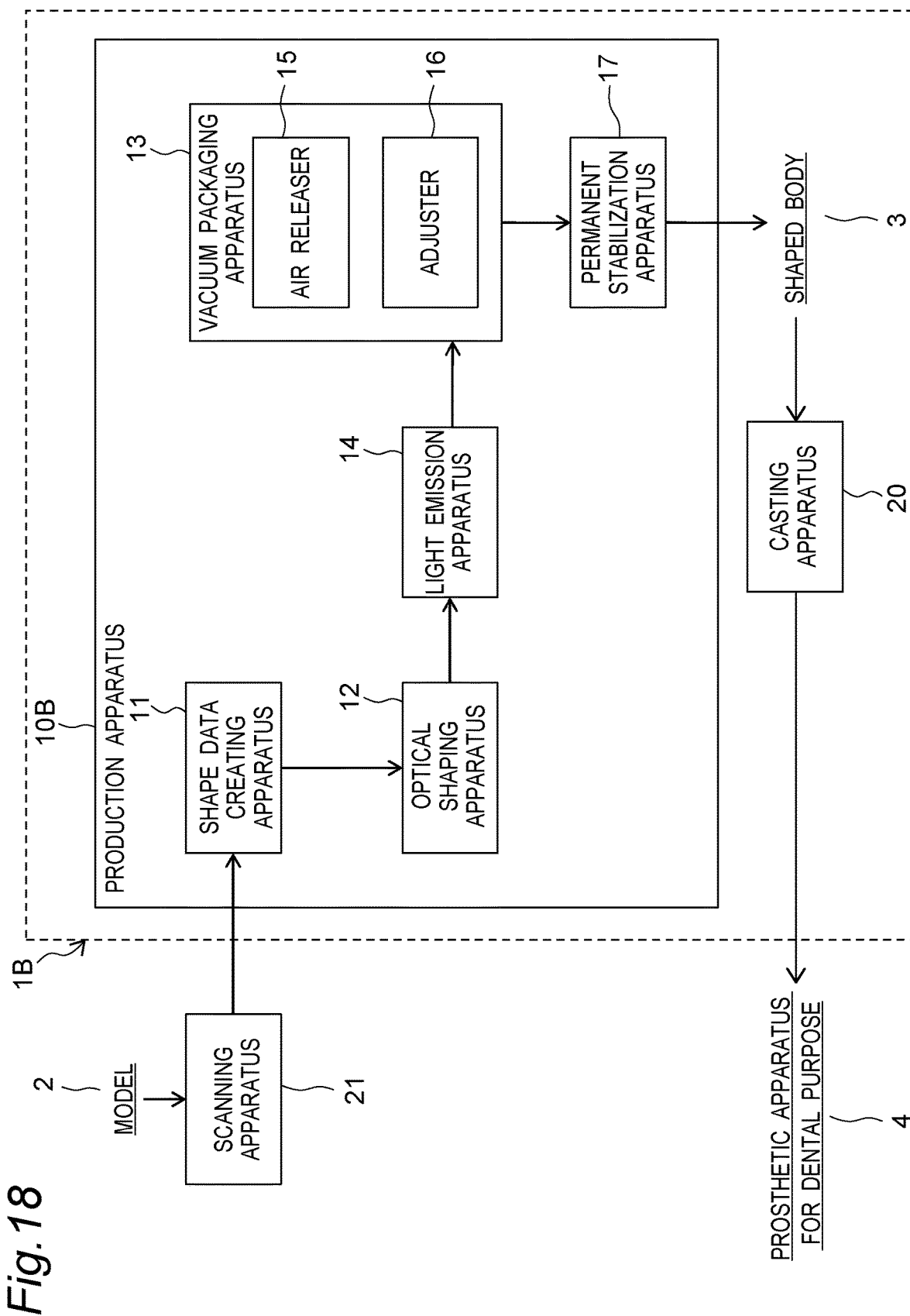
FIG. 18 is a block diagram illustrating an example of a manufacturing apparatus for a prosthetic apparatus of a third embodiment according to the present invention.

FIG. 18 is a block diagram illustrating an example of a manufacturing apparatus 1B for a prosthetic apparatus 4 of the third embodiment according to the present invention.

The third embodiment is different from the second embodiment in that a light emission apparatus 14 is disposed upstream of a vacuum packaging apparatus 13. In addition, the third embodiment is different from the second embodiment in that a shaped body 5 in a first curing state is cured by light emission without being covered with the film 6 to produce a shaped body in a second curing state, that the shaped body in the second curing state and a model 2 are covered with film 6, and that the shaped body in the cured state is brought into close contact with the model 2.

As illustrated in FIG. 18, in a production apparatus 10B of the manufacturing apparatus 1B, the light emission apparatus 14 is disposed upstream of the vacuum packaging apparatus 13. That is, in the production apparatus 10B, a shape data creating apparatus 11, an optical shaping apparatus 12, the light emission apparatus 14, the vacuum packaging apparatus 13, and a permanent stabilization apparatus 17 are disposed in this order from an upstream side to a downstream side.

In the third embodiment, the permanent stabilization apparatus 17 is referred to as a heating apparatus 17. The shaped body 5 in the semi-cured state produced by the optical shaping apparatus 12 is referred to as a shaped body in a first curing state, and a shaped body cured by the light emission apparatus 14 is referred to as a shaped body in a second curing state, and a shaped body heated by the permanent stabilization apparatus (heating apparatus) 17 is referred to as a shaped body in a third curing state. The second curing state means a state where a degree of curing is great as compared to the first curing state. The third curing state means a state where a degree of curing is great as compared to the second curing state.

The light emission apparatus 14 emits light on the shaped body 5 in the semi-cured state, that is, the shaped body 5 in the first curing state, to cure the shaped body 5 in the first curing state, thereby obtaining a shaped body in the second curing state. The light emission apparatus 14 emits light on the shaped body 5 in the first curing state that is not covered with the film 6. The second curing state is a state of being cured to such an extent as to be deformable by force applied.

The vacuum packaging apparatus 13 covers at least a part of the shaped body in the second curing state and at least a part of the model 2 with the film 6. In addition, the air releaser 15 of the vacuum packaging apparatus 13 deforms the film 6 by releasing air in the part covered with the film 6 to bring the shaped body in the second curing state into close contact with the model 2.

Figure 19:
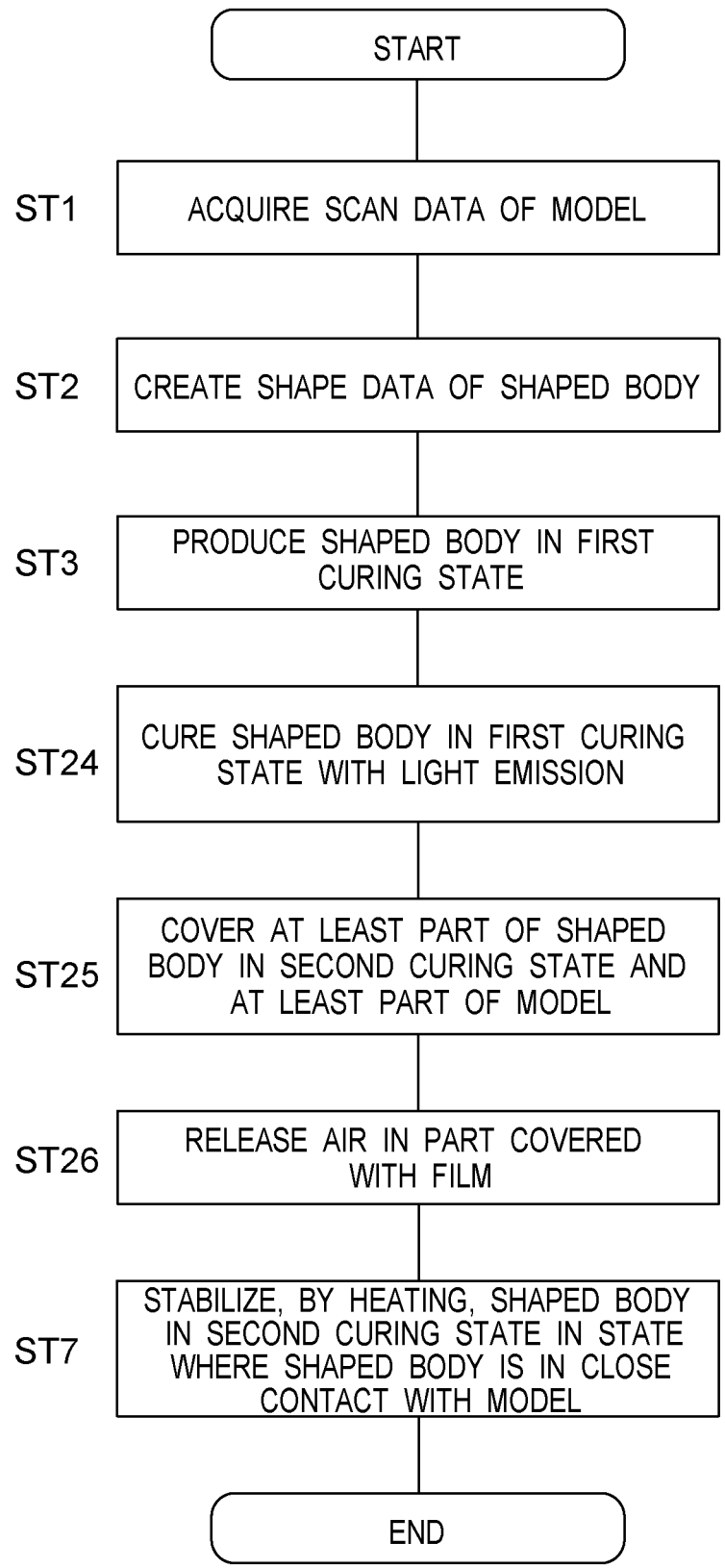
FIG. 19 is a flowchart illustrating an example of a production method for a shaped body of the third embodiment according to the present invention.

FIG. 19 is a flowchart illustrating an example of a production method for a shaped body 3 of the third embodiment according to the present invention. Note that Steps ST1 to ST3 and ST7 of the production method in the third embodiment illustrated in FIG. 19 are similar to Steps ST1 to ST3 and ST7 of the production method in the second embodiment illustrated in FIG. 17, and therefore description thereof is omitted. In addition, in the production method in the third embodiment, Steps ST24 to ST26 are performed instead of Steps ST4 to ST6 of the manufacturing method in the second embodiment.

As illustrated in FIG. 19, the shaped body 5 in the semi-cured state, that is, the shaped body 5 in the first curing state, is obtained by performing Steps ST1 to ST3.

Step ST24 is a first curing process (light emission process) of emitting light on the shaped body 5 in the first curing state to cure the shaped body 5 in the first curing state, thereby obtaining a shaped body in the second curing state. In Step ST24, the light emission apparatus 14 emits light on the shaped body 5 in the first curing state that is not covered with the film 6. Light emitted from the light emission apparatus 14 cures the shaped body 5 in the first curing state, and is, for example, ultraviolet light. Thus, a shaped body in the second curing state is obtained by curing the shaped body 5 in the first curing state.

Step ST25 is a covering process of attaching the shaped body in the second curing state to the model 2 and covering at least a part of the shaped body in the second curing state and at least a part of the model 2 with the film 6. In Step ST25, the vacuum packaging apparatus 13 covers at least a part of the shaped body in the second curing state and at least a part of the model 2 with the film 6.

Step ST26 is an air release process of releasing air in the part covered with the film 6 to deform the film 6 and bring the shaped body in the second curing state into close contact with the model 2. In Step ST26, the air releaser 15 of the vacuum packaging apparatus 13 releases the air in the part covered with the film 6. Thus, the inside of the film 6 is subjected to negative pressure to deform the film 6, and the shaped body in the second curing state is pressed against the model 2 by the film 6. As a result, the shaped body in the second curing state is in close contact with the model 2.

Note that, in Step ST25, an example has been described in which the vacuum packaging apparatus 13 covers the shaped body in the second curing state and the model 2 with the film 6, but the present invention is not limited thereto. For example, the shaped body in the second curing state and the model 2 may be covered with the film 6 by an apparatus separate from the vacuum packaging apparatus 13. Alternatively, the shaped body in the second curing state and the model 2 may be covered with the film 6 by any method or any apparatus.

Similarly to the second embodiment, Step ST7 is the second curing process of curing the shaped body in the second curing state by heating the shaped body in a state where the shaped body in the second curing state is in close contact with the model 2. The second curing process is a heating process (permanent stabilization process) of heating the shaped body in the second curing state. In Step ST7, the heating apparatus 17 heats the shaped body in the second curing state, in a state where the shaped body is in close contact with the model 2. The heating by the heating apparatus 17 stabilizes the shaped body in the second curing state. Thus, the shaped body in the second curing state is further cured, by which the shaped body 3 in the third curing state is completed. The third curing state is a state where a degree of curing is great as compared to the second curing state.

As described above, with the production method for the shaped body 3 according to the third embodiment, a shaped body 3 in a permanently stable state can be manufactured by performing Steps ST1 to ST7 illustrated in FIG. 19.

[Effects]

According to the third embodiment according to the present invention, the following effects can be obtained.

In the production apparatus 10B of the manufacturing apparatus 1B of the prosthetic apparatus 4, the light emission apparatus 14 emits light on the shaped body 5 in the first curing state without covering the shaped body 5 in the first curing state with film 6 to cure the shaped body 5 in the first curing state, thereby obtaining a shaped body in the second curing state. The second curing state is a state where a degree of curing is great as compared to the first curing state. The vacuum packaging apparatus 13 releases air in the part covered with the film 6 to deform the film 6 and bring the shaped body in the second curing state into close contact with the model 2. With such a configuration also, the shaped body 3 can be brought into a permanently stable state, and temporal change of the shaped body 3 can be reduced. As a result, because the shaped body 3 is in the permanently stable state, even if the shaped body 3 removed from the model 2 and stored for a certain period of time is used, it is possible to improve conformity of the prosthetic apparatus 4 of a metal cast denture base to an inside of an oral cavity of a patient, prosthetic apparatus 4 being produced by the casting apparatus 20.

In the third embodiment, the production method for the shaped body 3 in the manufacturing method for the prosthetic apparatus 4 includes an acquisition process ST1, a shape data creating process ST2, a shaped body production process ST3, a light emission process ST24, a covering process. ST25, an air release process ST26, and a heating process ST7. The acquisition process ST1 acquires scan data of the model 2 that is a reproduction of at least a part of the inside of the oral cavity of the patient. The shape data creating process ST2 prepares shape data of a shaped body for dental purpose on the basis of the scan data. The shaped body production process ST3 produces the shaped body 5 in the first curing state on the basis of the shape data. The light emission process ST24 emits light on the shaped body 5 in the first curing state to cure the shaped body 5 in the first curing state, thereby obtaining a shaped body in the second curing state. The covering process ST25 attaches the shaped body in the second curing state to the model 2 and covers at least a part of the shaped body in the second curing state and at least a part of the model 2 with the film 6. The air release process ST26 releases air in the part covered with the film 6 to deform the film 6 and bring the shaped body in the second curing state into close contact with the model 2. The heating process ST7 obtains the shaped body 3 in the third curing state by heating the shaped body in the second curing state in a state where the shaped body is in close contact with the model 2. With such a configuration also, the shaped body 3 can be brought into a permanently stable state, and temporal change of the shaped body 3 can be reduced. As a result, because the shaped body 3 is in the permanently stable state, even if the shaped body 3 removed from the model 2 and stored for a certain period of time is used, it is possible to improve conformity of the prosthetic apparatus 4 of a metal cast denture base to an inside of an oral cavity of a patient, prosthetic apparatus 4 being produced by the casting apparatus 20.

Note that, in the third embodiment, an example has been described in which the shape data creating apparatus 11, the optical shaping apparatus 12, the vacuum packaging apparatus 13, the light emission apparatus 14, and the heating apparatus 17 are separate apparatuses in the production apparatus 10B, but the present invention is not limited thereto. A plurality of apparatuses may be integrally formed as one apparatus. For example, the optical shaping apparatus 12 and the light emission apparatus 14 may be integrally formed as one apparatus.

Although Step ST24 is referred to as a first curing process or a light emission process in the third embodiment, Steps ST3 and ST24 may be collectively referred to as a shaped body production process. That is, the shaped body production process may include producing the shaped body 5 in the first curing state on the basis of the shape data (Step ST3), and producing the shaped body in the second curing state cured more than in the first curing state by emitting light on the shaped body 5 in the first curing state (Step ST24).

EXAMPLES

A manufacturing apparatus for and a manufacturing method for the prosthetic apparatus 4 will be further described on the basis of examples, but the present invention is not limited to the following examples. Note that, in the examples, the shaped body 3 in the permanently stable state have been evaluated, the shaped body 3 being produced by the production apparatuses 10A, 10B for and a production method for the shaped body 3 in the permanently stable state.

Hereinafter, conditions of the examples will be described.

CONDITIONS OF EXAMPLES

<Optical Shaping Apparatus>
As the optical shaping apparatus 12, D30 of the DLP method (manufactured by Rapid Shape) was used.
<Material Forming Shaped Body>
Cast (manufactured by NextDent, material: acrylate resin) and Base (manufactured by NextDent, material: acrylate resin) for the DLP method were used.

<Film>
Hiryu N-5NP, which is a standard bag with magic cut (manufactured by Asahi Kasei Pax, material: nylon, polyethylene) was used.
<Light Emission Apparatus>
LC-3DPrint Box (manufactured by NextDent) was used.
<Permanent Stabilization Apparatus (Heating Apparatus)>
PHH-101 (manufactured by ESPEC) was used.

Evaluation samples for examples 23 to 46 and comparative examples 5 to 7 were prepared by the following procedure. Examples 47 to 49 are based on the first embodiment.

[Production Method for Conformity Evaluation Samples]

By using a production apparatus 10, a shaped body 3 in a permanently stable state was produced as a conformity evaluation sample. Specifically, shape data of the shaped body 3 for dental purpose was created according to the model 2 by the shape data creating apparatus 11. On the basis of the produced shape data, the shaped body 5 in the semi-cured state was produced by the optical shaping apparatus 12 according to an instruction manual of each material or a condition initially set. After completion of the shaping, the shaped body 5 in the semi-cured state was subjected to ultrasonic cleaning in ethanol for five minutes, and a support was removed.

In the examples 23 to 34 in the second embodiment, the shaped body 5 in the semi-cured state was attached to the model 2. Thereafter, the shaped body 5 in the semi-cured state and the model 2 were covered with the film 6, and air in the part covered with the film 6 was released by the vacuum packaging apparatus 13 to bring the shaped body 5 in the semi-cured state and the model 2 into close contact with each other. Thereafter, in a state where the shaped body 5 in the semi-cured state and the model 2 were in close contact with each other, the shaped body 5 was irradiated with light (post-cured) by the light emission apparatus 14 for 15 minutes, heated from room temperature by the heating apparatus 17, and then slowly cooled at room temperature after the heating temperature was maintained for 20 minutes.

In the examples 35 to 46 of the third embodiment, the shaped body 5 in the semi-cured state was irradiated with light (post-cured) by the light emission apparatus 14 for 15 minutes. Subsequently, the shaped body in the final cured state and the model 2 were covered with the film 6, and air in the part covered with the film 6 was released by the vacuum packaging apparatus 13 to bring the shaped body in the final cured state and the model 2 into close contact with each other. Thereafter, the shaped body in a final cured state and the model 2 in close contact with each other were heated from room temperature by the heating apparatus 17, and then slowly cooled at room temperature after the heating temperature was maintained for 20 minutes.

[Conformity Evaluation Method]

For conformity evaluation, the model 2 for a metal cast denture base illustrated in FIG. 2 was used to design a shaped body 3 for dental purpose. In addition, a shaped body 3A illustrated in FIG. 14 was designed by using a model 2D for a three-unit bridge illustrated in FIG. 13. In addition, a shaped body 3B illustrated in FIG. 11 was designed by using a model 2B having a resin base (complete denture base) illustrated in FIG. 15.

A comprehensive conformity evaluation will be described. With respect to the shaped body 3 that is for a metal cast denture base and in a permanently stable state, the shaped body 3 in the permanently stable state was attached to the model 2 illustrated in FIG. 3, and gaps at a major connector, a clasp, and a rest were measured. As a measurement method, DAIFREE (manufactured by DAIKIN INDUSTRIES) was applied to the model 2, measurement points were chemically polymerized by using resin cement (ResiCem (manufactured by SHOFU INC.)), and thickness of the resin cement was measured. The measurement was performed 10 minutes and 24 hours after the slow cooling was completed and the film was removed. Note that the measurement was performed twice, and an average value thereof was used.

It is clinically acceptable if all of the major connector, clasp, and rest are 500 μm or less, and it is clinically optimal if all of the major connector, clasp, and rest are 100 μm or less.

In addition, with respect to the shaped body 3A for a three-unit bridge, when the shaped body 3A is attached to the model 2D illustrated in FIG. 13, and conformity of a margin part of the shaped body 3A is evaluated, the shaped body 3A of 100 μm or less is clinically acceptable, and the shaped body 3A of 50 μm or less is optimal.

In addition, with respect to the shaped body 3B for a resin base, the shaped body 3B was attached to the model 2B illustrated in FIG. 15, and gaps between the shaped body 3B and the model 2B were measured. FINE CHECKER (manufactured by SHOFU INC.) was used to measure the gaps of a complete denture, and a greatest value among measurement values of a central portion was measured. The gaps are clinically acceptable to be 500 μm or less, and more preferably 100 μm or less.

Evaluation results are illustrated in Tables 10 to 19 below. Results of the second embodiment are illustrated in Tables 10 to 12. Results of the third embodiment are illustrated in Tables 13 to 15. Results of the first embodiment are illustrated in Tables 16 to 17. Results of the comparative examples 5 to 7 are illustrated in Tables 18 to 19.

TABLE 10

(Second embodiment)

| | | Example 23 | Example 24 | Example 25 | Example 26 |
|---|---|---|---|---|---|
| Type of optical shaping apparatus | | D30 | D30 | D30 | D30 |
| Material of shaped body | | Cast | Cast | Cast | Cast |
| Use of vacuum packaging apparatus | | Yes | Yes | Yes | Yes |
| Vacuum degree (%) | | 70 | 70 | 70 | 70 |
| Use of permanent stabilization apparatus | | Yes | Yes | Yes | Yes |
| Heating temperature (° C.) | | 50 | 80 | 100 | 130 |
| Model for conformity evaluation | | Metal base | Metal base | Metal base | Metal base |
| Gap at major connector (μm) | 10 minutes later | 70 | 70 | 70 | 70 |
| | 24 hours later | 80 | 75 | 75 | 80 |
| Gap at clasp (μm) | 10 minutes later | 75 | 75 | 75 | 75 |
| | 24 hours later | 90 | 75 | 75 | 85 |
| Gap at rest (μm) | 10 minutes later | 65 | 65 | 65 | 65 |
| | 24 hours later | 80 | 65 | 65 | 70 |

TABLE 11

(Second embodiment)

| | | Example 27 | Example 28 | Example 29 | Example 30 |
|---|---|---|---|---|---|
| Type of optical shaping apparatus | | D30 | D30 | D30 | D30 |
| Material of shaped body | | Cast | Cast | Cast | Cast |
| Use of vacuum packaging apparatus | | Yes | Yes | Yes | Yes |
| Vacuum degree (%) | | 70 | 70 | 70 | 70 |
| Use of permanent stabilization apparatus | | Yes | Yes | Yes | Yes |
| Heating temperature (° C.) | | 50 | 80 | 100 | 130 |
| Model for conformity evaluation | | Three-unit bridge | Three-unit bridge | Three-unit bridge | Three-unit bridge |
| Gap at margin (μm) | 10 minutes later | 45 | 45 | 45 | 45 |
| | 24 hours later | 55 | 45 | 45 | 50 |

TABLE 12

(Second embodiment)

| | | Example 31 | Example 32 | Example 33 | Example 34 |
|---|---|---|---|---|---|
| Type of optical shaping apparatus | | D30 | D30 | D30 | D30 |
| Material of shaped body | | Base | Base | Base | Base |
| Use of vacuum packaging apparatus | | Yes | Yes | Yes | Yes |
| Vacuum degree (%) | | 70 | 70 | 70 | 70 |
| Use of permanent stabilization apparatus | | Yes | Yes | Yes | Yes |
| Heating temperature (° C.) | | 50 | 80 | 100 | 130 |
| Model for conformity evaluation | | Resin base | Resin base | Resin base | Resin base |
| Gap at central portion of palate (μm) | 10 minutes later | 90 | 90 | 90 | 90 |
| | 24 hours later | 100 | 95 | 90 | 100 |

TABLE 13

(Third embodiment)

| | Example 35 | Example 36 | Example 37 | Example 38 |
|---|---|---|---|---|
| Type of optical shaping apparatus | D30 | D30 | D30 | D30 |
| Material of shaped body | Cast | Cast | Cast | Cast |
| Use of vacuum packaging apparatus | Yes | Yes | Yes | Yes |
| Vacuum degree (%) | 70 | 70 | 70 | 70 |
| Use of permanent stabilization apparatus | Yes | Yes | Yes | Yes |
| Heating temperature | 50 | 80 | 100 | 130 |

TABLE 13-continued (Third embodiment)

|  |  | Example 35 | Example 36 | Example 37 | Example 38 |
|---|---|---|---|---|---|
| (° C.) |  |  |  |  |  |
| Model for conformity evaluation |  | Metal base | Metal base | Metal base | Metal base |
| Gap at major connector (μm) | 10 minutes later | 75 | 75 | 75 | 75 |
|  | 24 hours later | 95 | 75 | 75 | 85 |
| Gap at clasp (μm) | 10 minutes later | 75 | 75 | 75 | 75 |
|  | 24 hours later | 90 | 80 | 75 | 85 |
| Gap at rest (μm) | 10 minutes later | 70 | 70 | 70 | 70 |
|  | 24 hours later | 80 | 70 | 70 | 75 |

TABLE 14

(Third embodiment)

|  |  | Example 39 | Example 40 | Example 41 | Example 42 |
|---|---|---|---|---|---|
| Type of optical shaping apparatus |  | D30 | D30 | D30 | D30 |
| Material of shaped body |  | Cast | Cast | Cast | Cast |
| Use of vacuum packaging apparatus |  | Yes | Yes | Yes | Yes |
| Vacuum degree (%) |  | 70 | 70 | 70 | 70 |
| Use of permanent stabilization apparatus |  | Yes | Yes | Yes | Yes |
| Heating temperature (° C.) |  | 50 | 80 | 100 | 130 |
| Model for conformity evaluation |  | Three-unit bridge | Three-unit bridge | Three-unit bridge | Three-unit bridge |
| Gap at margin (μm) | 10 minutes later | 50 | 50 | 50 | 50 |
|  | 24 hours later | 60 | 50 | 50 | 55 |

TABLE 15

(Third embodiment)

|  |  | Example 43 | Example 44 | Example 45 | Example 46 |
|---|---|---|---|---|---|
| Type of optical shaping apparatus |  | D30 | D30 | D30 | D30 |
| Material of shaped body |  | Base | Base | Base | Base |
| Use of vacuum packaging apparatus |  | Yes | Yes | Yes | Yes |
| Vacuum degree (%) |  | 70 | 70 | 70 | 70 |
| Use of permanent stabilization apparatus |  | Yes | Yes | Yes | Yes |
| Heating temperature (° C.) |  | 50 | 80 | 100 | 130 |
| Model for conformity evaluation |  | Resin base | Resin base | Resin base | Resin base |
| Gap at central portion of palate (μm) | 10 minutes later | 95 | 95 | 95 | 95 |
|  | 24 hours later | 105 | 95 | 95 | 100 |

TABLE 16

|  |  | Example 47 |
|---|---|---|
| Type of optical shaping apparatus |  | D30 |
| Material of shaped body |  | Cast |
| Use of vacuum packaging apparatus |  | Yes |
| Vacuum degree (%) |  | 70 |
| Use of permanent stabilization apparatus |  | No |
| Heating temperature (° C.) |  | — |
| Model for conformity evaluation |  | Metal base |
| Gap at major connector (μm) | 10 minutes later | 70 |
|  | 24 hours later | 125 |
| Gap at clasp (μm) | 10 minutes later | 75 |
|  | 24 hours later | 110 |
| Gap at rest (μm) | 10 minutes later | 65 |
|  | 24 hours later | 105 |

TABLE 17

|  |  | Example 48 | Example 49 |
|---|---|---|---|
| Type of optical shaping apparatus |  | D30 | D30 |
| Material of shaped body |  | Cast | Base |
| Use of vacuum packaging apparatus |  | Yes | Yes |
| Vacuum degree (%) |  | 70 | 70 |
| Use of permanent stabilization apparatus |  | No | No |
| Heating temperature (° C.) |  | — | — |
| Model for conformity evaluation |  | Three-unit bridge | Resin base |
| Gap at margin (μm) | 10 minutes later | 45 | — |
|  | 24 hours later | 85 | — |
| Gap at central portion of palate (μm) | 10 minutes later | — | 90 |
|  | 24 hours later | — | 130 |

TABLE 18

|  | Comparative Example 5 |
|---|---|
| Type of optical shaping apparatus | D30 |
| Material of shaped body | Cast |
| Use of vacuum packaging apparatus | No |
| Vacuum degree (%) | — |
| Use of permanent stabilization apparatus | No |

TABLE 18-continued

|  |  | Comparative Example 5 |
|---|---|---|
| Heating temperature (° C.) |  | — |
| Model for conformity evaluation |  | Metal base |
| Gap at major connector (μm) | 10 minutes later | 600 |
|  | 24 hours later | 680 |
| Gap at clasp (μm) | 10 minutes later | 750 |
|  | 24 hours later | 820 |
| Gap at rest (μm) | 10 minutes later | 650 |
|  | 24 hours later | 730 |

TABLE 19

|  |  | Comparative Example 6 | Comparative Example 7 |
|---|---|---|---|
| Type of optical shaping apparatus |  | D30 | D30 |
| Material of shaped body |  | Cast | Base |
| Use of vacuum packaging apparatus |  | No | No |
| Vacuum degree (%) |  | — | — |
| Use of permanent stabilization apparatus |  | No | No |
| Heating temperature (° C.) |  | — | — |
| Model for conformity evaluation |  | Three-unit bridge | Resin base |
| Gap at margin (μm) | 10 minutes later | 200 | — |
|  | 24 hours later | 275 | — |
| Gap at central portion of palate (μm) | 10 minutes later | — | 600 |
|  | 24 hours later | — | 685 |

The examples 47, 48, and 49 are the same as the examples 5, 20, and 22 of the first embodiment, respectively.

First, attention is paid to the examples 23 to 26, 35 to 38, 47 and the comparative example 5 that are regarding the model 2 for a metal cast denture base and the shaped body 3 in a permanently stable state. Note that, in the examples 23 to 26 and 35 to 38, the vacuum packaging apparatus 13 is used to adjust a vacuum degree, and the heating apparatus 17 is used to adjust heating temperature. Meanwhile, in the example 47, the heating apparatus 17 is not used. In addition, in the comparative example 5, the vacuum packaging apparatus 13 and the heating apparatus 17 are not used.

As illustrated in Tables 10, 13, 16, and 18, gaps did not substantially change at any of the major connector, the clasp, and the rest even after 24 hours as compared to after 10 minutes in the examples 23 to 26 and 35 to 38, whereas the gaps changed by 35 μm or more at any of the major connector, the clasp, and the rest after 24 hours in the example 47 and the comparative example 5.

As described above, in the examples 23 to 26 and 35 to 38, the gaps were smaller after 24 hours as compared to the example 47 and the comparative example 5. In addition, the gaps remained 100 μm or less also after 24 hours in the examples 23 to 26 and 35 to 38, which is clinically optimal.

Next, attention is paid to the examples 27 to 30, 39 to 42, and 48 and the comparative example 6 that are regarding the model 2D for a three-unit bridge and the shaped body 3A.

Note that, in the examples 27 to 30 and 39 to 42, the vacuum packaging apparatus 13 is used to adjust a vacuum degree, and the heating apparatus 17 is used to adjust heating temperature. Meanwhile, in the example 48, the heating apparatus 17 is not used. In addition, in the comparative example 6, the vacuum packaging apparatus 13 and the heating apparatus 17 are not used.

As illustrated in Tables 11, 14, 17, and 19, a gap at a margin did not substantially change even after 24 hours as compared to after 10 minutes in the examples 27 to 30 and 39 to 42, whereas a gap changed by 40 μm or more after 24 hours in the example 48 and the comparative example 6.

Next, attention is paid to the examples 31 to 34, 43 to 46, and 49 and the comparative example 7 that are regarding the model 2B for a resin base and the shaped body 3B. Note that, in the examples 31 to 34 and 43 to 46, the vacuum packaging apparatus 13 is used to adjust a vacuum degree, and the heating apparatus 17 is used to adjust heating temperature. Meanwhile, in the example 49, the heating apparatus 17 is not used. In addition, in the comparative example 7, the vacuum packaging apparatus 13 and the heating apparatus 17 are not used.

As illustrated in Tables 12, 15, 17, and 19, gaps at a central portion of a palate did not substantially change even after 24 hours as compared to after 10 minutes in the examples 31 to 34 and 43 to 46, whereas the gaps changed by 40 μm or more after 24 hours in the example 49 and the comparative example 7.

As described above, in the examples 23 to 46, the gaps between the model and the shaped body after 24 hours can be reduced as compared to the examples 47 to 49 and the comparative examples 5 to 7.

Fourth Embodiment

The manufacturing apparatus for and manufacturing method for a prosthetic apparatus of a fourth embodiment according to the present invention will be described.

In the fourth embodiment, points different from the first to third embodiments will be mainly described. In the fourth embodiment, configurations the same as or equivalent to configurations of the first to third embodiments will be described with the same reference characters. In addition, in the fourth embodiment, description overlapping with the first to third embodiments will be omitted.

In the fourth embodiment, a mode in which the first to third embodiments are generalized will be described.

Figure 20:
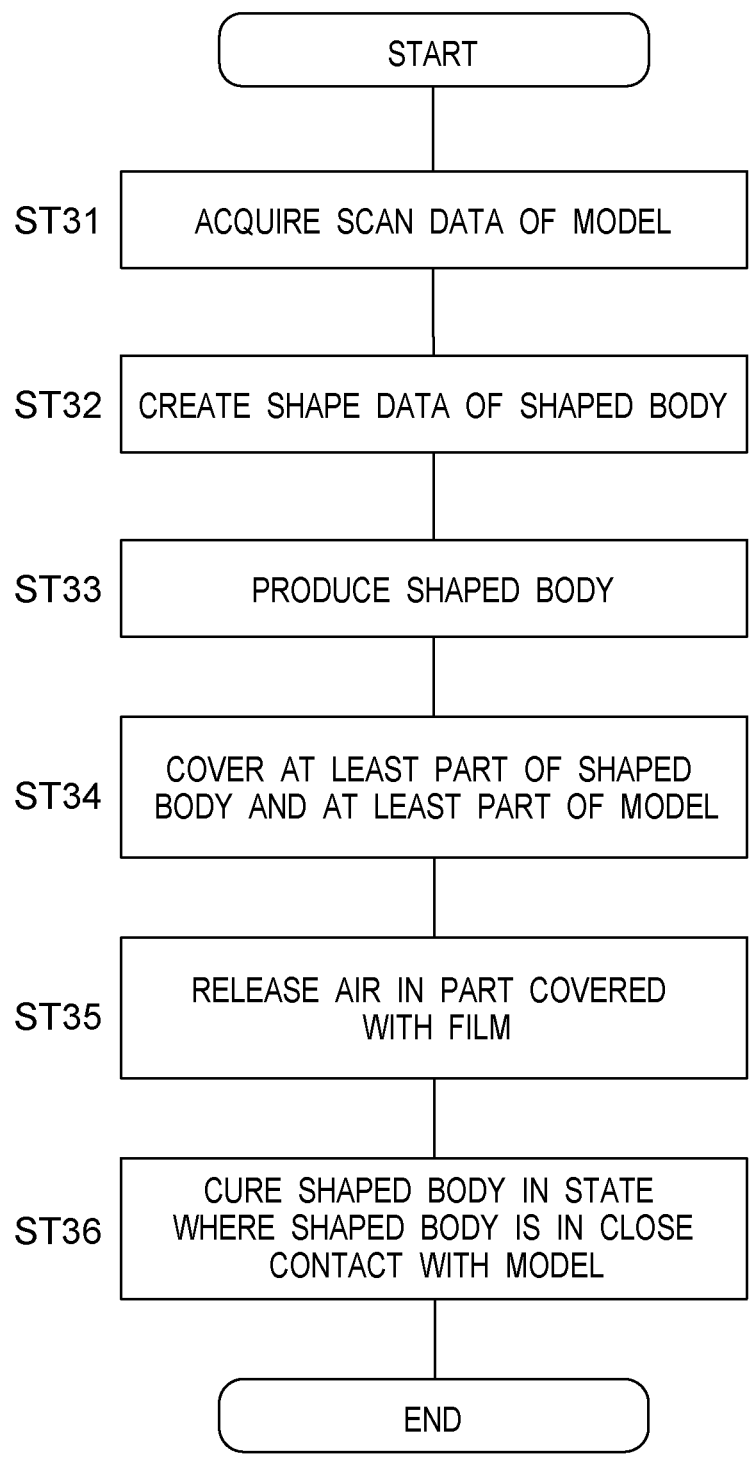
FIG. 20 is a flowchart illustrating an example of a production method for a shaped body of a fourth embodiment according to the present invention.

FIG. 20 is a flowchart illustrating an example of a production method for a shaped body 3 of the fourth embodiment according to the present invention. As illustrated in FIG. 20, a production method for a shaped body 3 of the fourth embodiment includes Steps ST31 to ST36.

Step ST31 is an acquisition process of acquiring scan data of a model that is a reproduction of at least a part of an inside of an oral cavity of a patient. Step ST31 is similar to Step ST1 in the first to third embodiments, and therefore detailed description thereof is omitted.

Step ST32 is a shape data creating process of creating shape data of a shaped body for dental purpose on the basis of the scan data. Step ST32 is similar to Step ST2 in the first to third embodiments, and therefore detailed description thereof is omitted.

Step ST33 is a shaped body production process of producing a shaped body on the basis of the shape data. Step ST33 includes production of a shaped body 5 in a first curing state on the basis of the shape data by an optical shaping apparatus 12. The shaped body 5 in the first curing state is a shaped body in a semi-cured state produced by the optical shaping apparatus 12, and is a shaped body cured to such extent as to be deformed when force is applied. Note that the production of the shaped body 5 in the first curing state is similar to Step ST3 in the first to third embodiments.

Step ST33 may further include production of the shaped body in the second curing state cured more than in the first curing state by emitting light on the shaped body 5 in the first curing state with the light emission apparatus 14. The production of a shaped body in the second curing state is similar to Step ST24 in the third embodiment.

Step ST34 is a covering process of attaching the shaped body to the model 2 and covering at least a part of the shaped body and at least a part of the model 2 with the film 6. In the covering process, the shaped body in the first curing state may be covered with the film 6, or the shaped body in the second curing state may be covered with the film 6. Step ST34 is similar to Step ST4 in the first and second embodiments or Step ST25 in the third embodiment, and therefore detailed description thereof is omitted.

Step ST35 is an air release process of deforming the film 6 by releasing air in the part covered with the film 6 to bring the shaped body into close contact with the model. Step ST35 is similar to Step ST5 in the first and second embodiments or Step ST26 in the third embodiment, and therefore detailed description thereof is omitted.

Step ST36 is a curing process of curing the shaped body, in a state where the shaped body is in close contact with the model 2. The curing process includes at least either of a light emission process of emitting light on the shaped body in a state where the shaped body is in close contact with the model 2, or a heating process of heating the shaped body in a state where the shaped body is in close contact with the model 2.

For example, in a case where the shaped body in the first curing state is in close contact with the model 2 in Step ST36, either one or both of the light emission process and the heating process may be performed. In a case where the shaped body in the second curing state is in close contact with the model 2 in Step ST36, a heating process may be performed.

[Effects]

According to the fourth embodiment according to the present invention, the following effects can be obtained.

The manufacturing method for the prosthetic apparatus 4 includes an acquisition process ST31, a shape data creating process ST32, a shaped body production process ST33, a covering process ST34, an air release process ST35, and a curing process ST36. The acquisition process ST31 acquires scan data of a model that is a reproduction of at least a part of the inside of the oral cavity of the patient. The shape data creating process ST32 creates shape data of a shaped body for dental purpose on the basis of the scan data. The shaped body production process ST33 produces a shaped body on the basis of the shape data. The covering process ST34 attaches the shaped body to the model 2 and covers at least a part of the shaped body and at least a part of the model 2 with the film 6. The air release process ST35 releases air in the part covered with the film 6 to deform the film 6 and bring the shaped body into close contact with the model 2. The curing process ST36 cures the shaped body in a state where the shaped body is in close contact with the model 2.

With such a configuration, the shaped body is cured in close contact with the model 2, and therefore, warpage and deformation due to shrinkage that occurs in the curing can be reduced. Thus, conformity of the shaped body 3 to the model 2 can be improved. As a result, conformity of the prosthetic apparatus 4 to the inside of the oral cavity of the patient can be improved.

Fifth Embodiment

A covering apparatus of a fifth embodiment according to the present invention will be described.

In the fifth embodiment, points different from the first to fourth embodiments will be mainly described. In the fifth embodiment, configurations the same as or equivalent to configurations of the first to fourth embodiments will be described with the same reference characters. In addition, in the fifth embodiment, description overlapping with the first to fourth embodiments will be omitted.

In the fifth embodiment, a vacuum packaging apparatus 13 will be described as an example of a covering apparatus used in the first to fourth embodiments.

Figure 21:
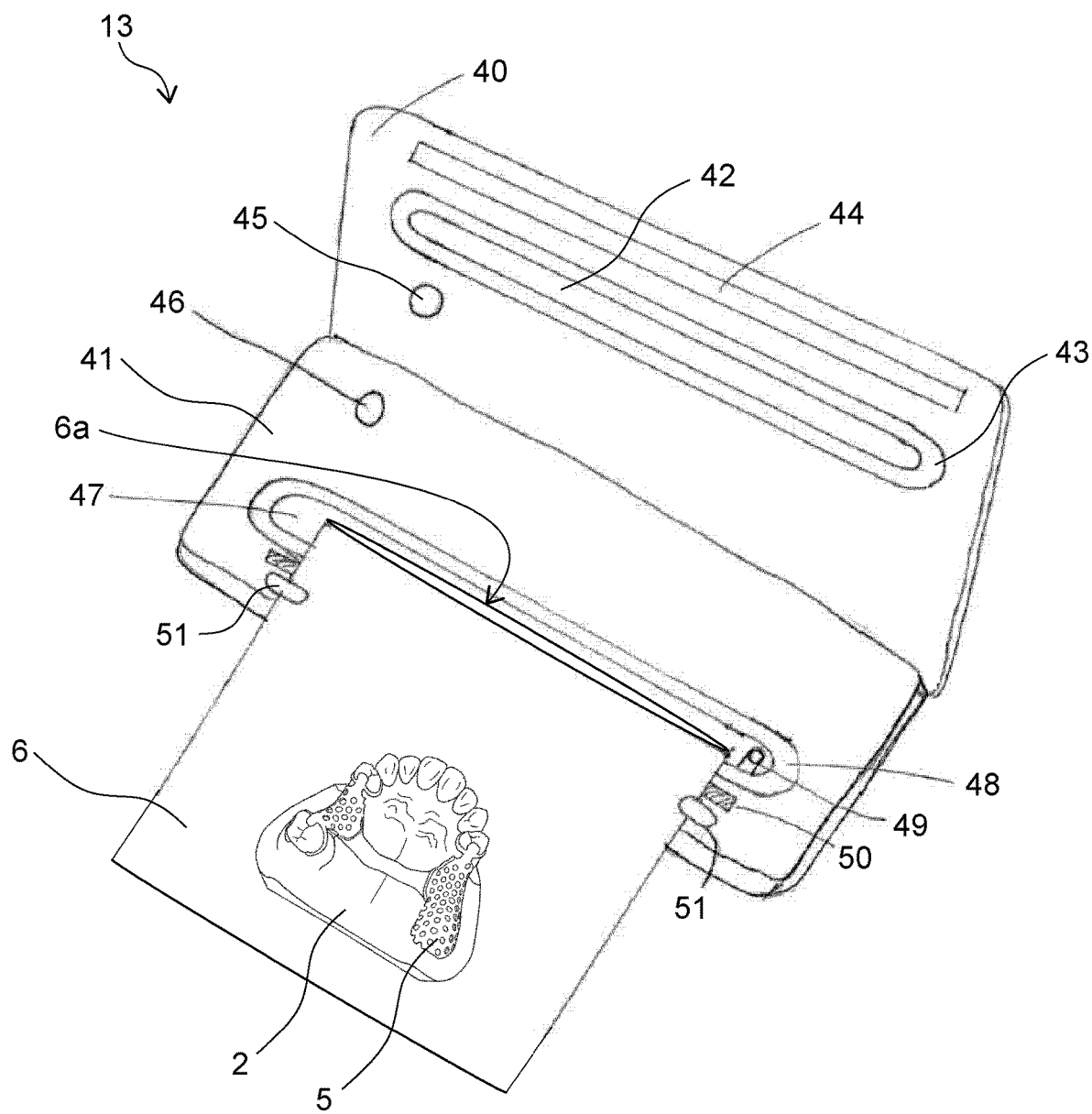
FIG. 21 is a perspective view illustrating an example of a covering apparatus of a fifth embodiment according to the present invention.
Figure 22:
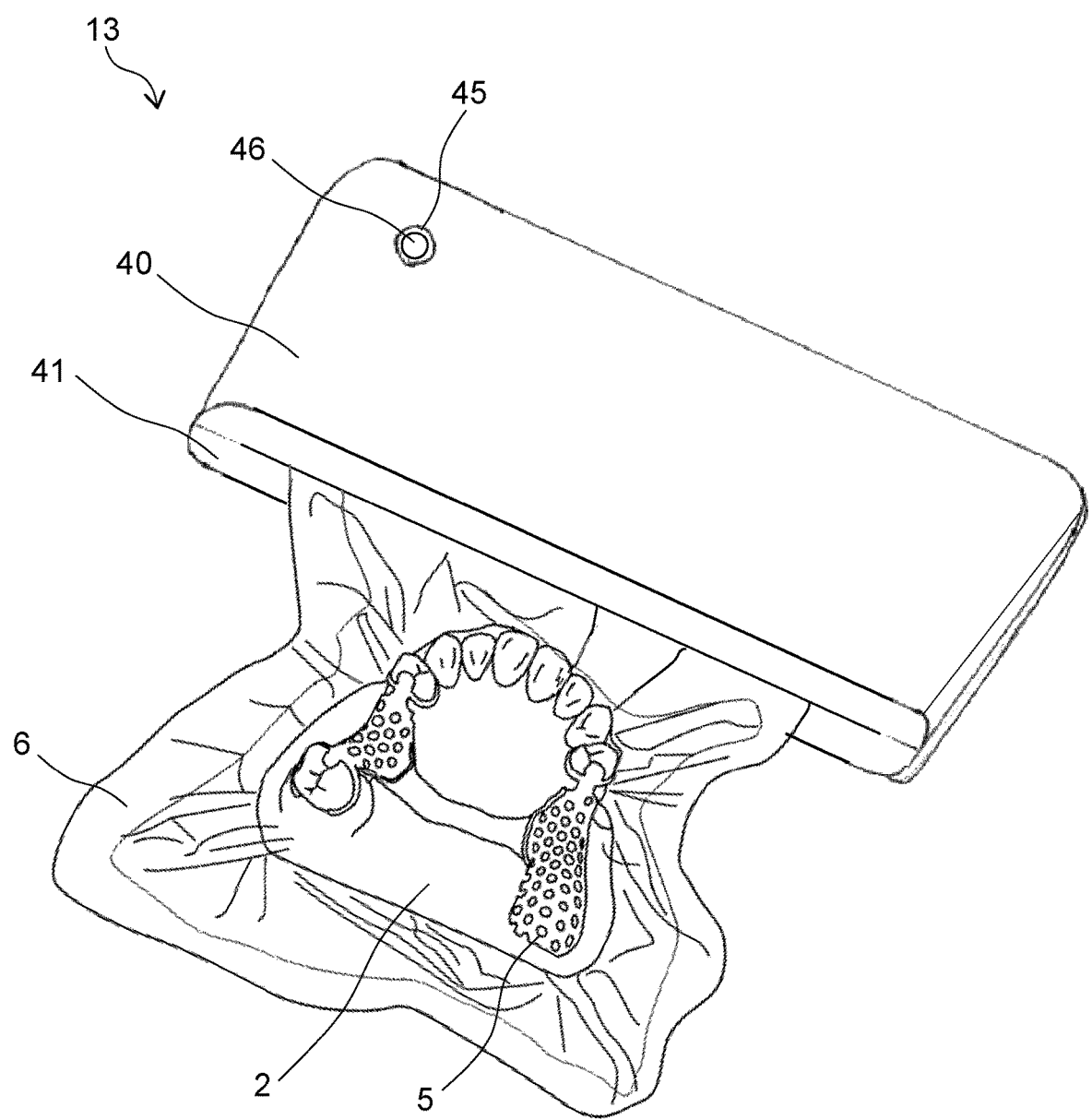
FIG. 22 is another perspective view illustrating an example of the covering apparatus of the fifth embodiment according to the present invention.

FIG. 21 is a perspective view illustrating an example of the vacuum packaging apparatus 13 of the fifth embodiment according to the present invention. FIG. 22 is another perspective view illustrating an example of the vacuum packaging apparatus 13 of the fifth embodiment according to the present invention. FIG. 21 illustrates a state before film 6 including the model 2 to which the shaped body 5 is attached is attached to the vacuum packaging apparatus 13. FIG. 22 illustrates a state where the film 6 is attached to the vacuum packaging apparatus 13 and air in the film 6 is released.

As illustrated in FIGS. 21 and 22, the vacuum packaging apparatus 13 includes a cover unit 40 and a main body unit 41. The cover unit 40 and the main body unit 41 are formed in a plate shape having a longitudinal direction. In addition, one end of the cover unit 40 in a shorter direction and one end of the main body unit 41 in a shorter direction are connected by a hinge. The cover unit 40 is rotatable with respect to the main body, unit 41 about the hinge. Thus, the vacuum packaging apparatus 13 can achieve a state where the cover unit 40 and the main body unit 41 are in contact with each other and closed, and a state where the cover unit 40 and the main body unit 41 are separated from each other and opened. That is, the cover unit 40 can be opened and closed by moving the cover unit 40 with respect to the main body unit 41.

The cover unit 40 is provided with a first deaeration groove 42 for deaeration. The first deaeration groove 42 extends in the longitudinal direction of the cover unit 40. A pad 43 for sealing is disposed around the first deaeration groove 42. The pad 43 is disposed over an entire circumference of the first deaeration groove 42.

The cover unit 40 includes a first sealing heater 44. The first sealing heater 44 deforms and seals the film 6 with heat. The first sealing heater 44 extends in the longitudinal direction of the cover unit 40 and is disposed adjacent to the first deaeration groove 42. The first sealing heater 44 functions as a sealing unit.

The cover unit 40 is provided with a hole 45 into which a switch 46 of the main body unit 41 to be described later is inserted. When the cover unit 40 is closed, the switch 46 is inserted into the hole.

The main body unit 41 includes the switch 46 that controls the operation of the vacuum packaging apparatus 13. For example, the switch 46 can control start and end of air releasing.

The main body unit 41 is provided with a second deaeration groove 47 for deaeration. The second deaeration groove 47 extends in the longitudinal direction of the main body unit 41. A pad 48 for sealing is disposed around the second deaeration groove 47. The pad 48 is disposed over an entire circumference of the second deaeration groove 47. When the cover unit 40 is closed, the first deaeration groove 42 and the second deaeration groove 47 communicate with each other, and at the same time, the pads 43 and 48 seal the first deaeration groove 42 and the second deaeration groove 47 between the cover unit 40 and the main body unit 41. Thus, a closed space formed by the first deaeration groove 42 and the second deaeration groove 47 is formed.

The second deaeration groove 47 is provided with a deaeration port 49. Thus, the deaeration port 49 deaerates air in the closed space formed by the first deaeration groove 42 and the second deaeration groove 47.

The main body unit 41 includes a second sealing heater 50. The second sealing heater 50 deforms and seals film 6 with heat. The second sealing heater 50 extends in the longitudinal direction of the main body unit 41 and is disposed adjacent to the second deaeration groove 47. The second sealing heater 50 functions as a sealing unit.

When the cover unit 40 is closed, the film 6 is sandwiched between the first sealing heater 44 of the cover unit 40 and the second sealing heater 50 of the main body unit 41. Thus, after the air inside the film 6 is released, an opening 6a of the film 6 is closed by heat while the opening 6a of the film 6 is being sealed.

The main body unit 41 has a clip 51 that fixes the film 6. In the fifth embodiment, the main body unit 41 has two clips 51. The clips 51 fix the film 6 by sandwiching the film 6. Specifically, the clips 51 sandwich the film 6 such that one end of the film 6 provided with the opening 6a is disposed on the first deaeration groove 42 and the second deaeration groove 47.

Figure 23:
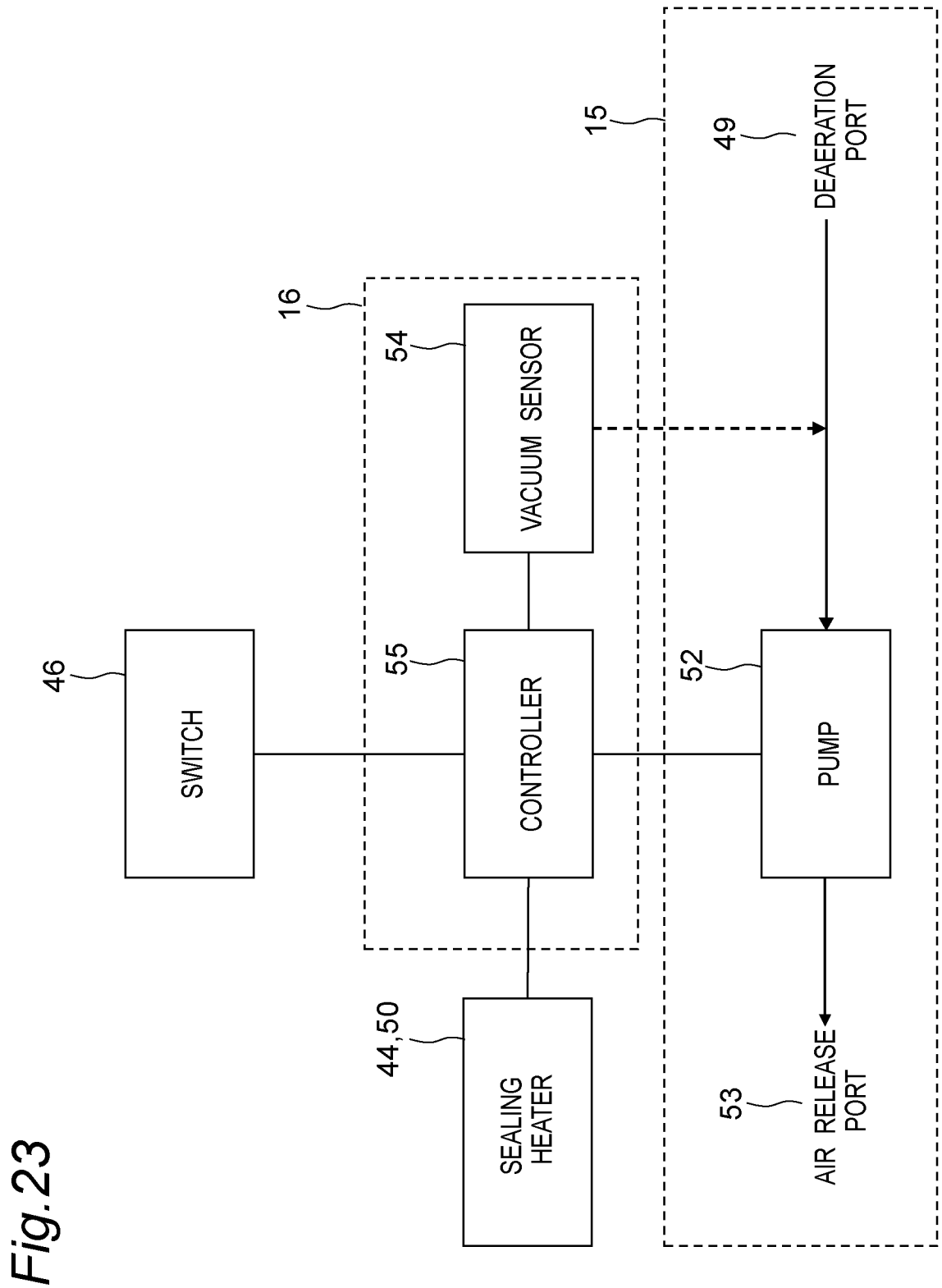
FIG. 23 is a block diagram illustrating an example of an internal configuration of the covering apparatus of the fifth embodiment according to the present invention.

FIG. 23 is a block diagram illustrating an example of an internal configuration of the vacuum packaging apparatus 13 of the fifth embodiment according to the present invention. As illustrated in FIG. 23, the vacuum packaging apparatus 13 includes an air releaser 15 that releases air and an adjuster 16 that adjusts a vacuum degree.

The air releaser 15 includes a pump 52. The pump 52 is connected to the deaeration port 49 and an air release port 53 via a pipe. The air release port 53 is provided outside the main body unit 41, for example. The pump 52 sucks air from the deaeration port 49, and the pump 52 that releases air from the air release port 53 releases air in the closed space formed by the first deaeration groove 42 and the second deaeration groove 47 from the deaeration port 49. Because one end of the film 6 provided with the opening 6a is disposed in the space, the air in the film 6 is released.

The adjuster 16 includes a vacuum sensor 54 and a controller 55.

The vacuum sensor 54 detects a vacuum degree in the film 6. For example, the vacuum sensor 54 is disposed on a pipe connecting the pump 52 and the deaeration port 49.

The controller 55 controls the pump 52 on the basis of a vacuum degree detected by the vacuum sensor 54. Specifically, the controller 55 controls the pump 52 to achieve a desired vacuum degree. The controller 55 preferably adjusts a vacuum degree of a part covered with the film 6 to 40% or more and 95% or less.

In addition, the controller 55 controls the sealing heaters 44 and 50. Specifically, the controller 55 generates heat by the sealing heaters 44 and 50 after reaching a desired vacuum degree. Thus, the opening 6a of the film 6 can be closed.

In addition, the controller 55 controls operation of the vacuum packaging apparatus 13 by turning on/off the switch 46.

[Effects]

According to the fifth embodiment according to the present invention, the following effects can be obtained.

A covering apparatus 13 is an apparatus used for manufacturing a prosthetic apparatus 4, and includes the air releaser 15 that releases air in the film 6 that covers at least a part of the shaped body and at least a part of the model 2. The air releaser 15 release air in the part covered with the film 6 to deform the film 6 and bring the shaped body into close contact with the model 2. With such a configuration, with such a configuration, the shaped body can be brought into close contact with and fixed to the model 2. Thus, it is possible to reduce chances of the shaped body partially separating from the model 2. As a result, conformity of the shaped body 3 to the model 2 can be improved, and therefore conformity of the prosthetic apparatus 4 to an inside of an oral cavity of a patient can be improved.

Note that, in the fifth embodiment, a vacuum packaging apparatus has been described as an example of the covering apparatus 13, but the covering apparatus 13 is not limited thereto. The covering apparatus 13 may be an apparatus that can release air in the film 6 and bring the shaped body into close contact with the model 2.

In the fifth embodiment, an example in which the covering apparatus 13 includes the vacuum sensor 54 has been described, but the present invention is not limited thereto. The vacuum sensor 54 is not an essential configuration.

Sixth Embodiment

A manufacturing apparatus for and manufacturing method for a prosthetic apparatus of a sixth embodiment according to the present invention will be described.

In the sixth embodiment, points different from the first embodiment will be mainly described. In the sixth embodiment, configurations the same as or equivalent to configurations of the first embodiment will be described with the same reference characters. In addition, in the sixth embodiment, description overlapping with the first embodiment will be omitted.

Figure 24:
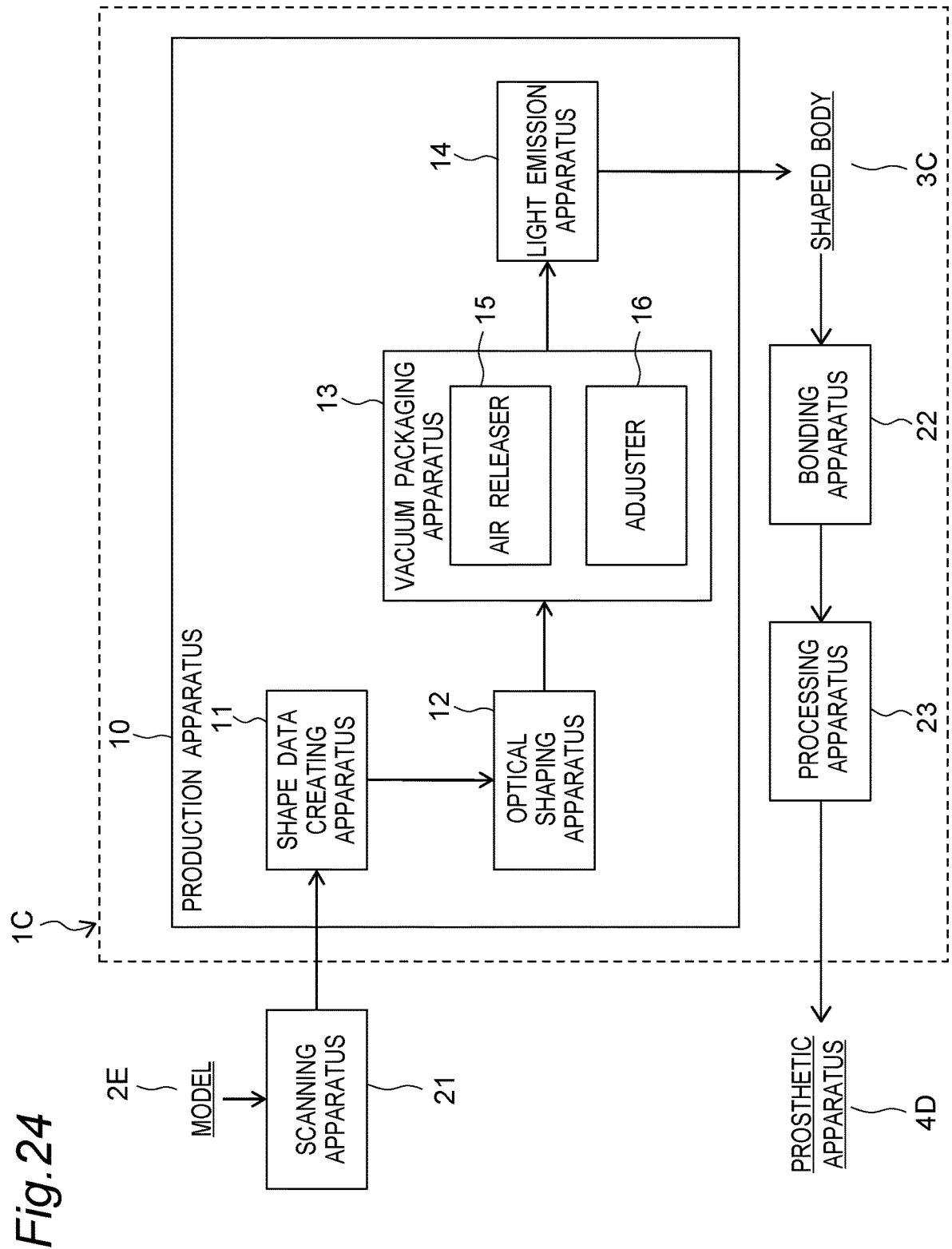
FIG. 24 is a block diagram illustrating an example of a manufacturing apparatus for a prosthetic apparatus of a sixth embodiment according to the present invention.
Figure 25:
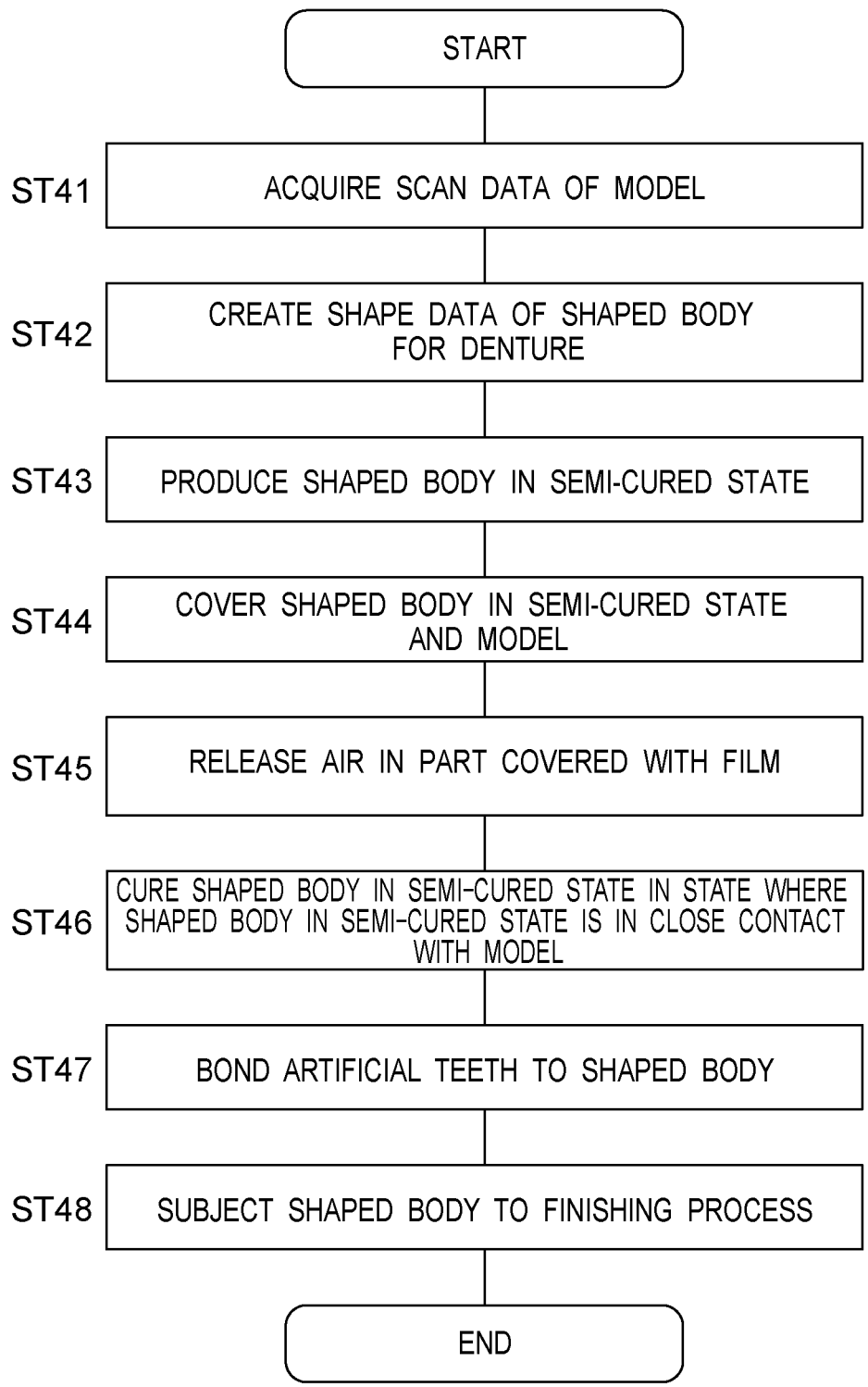
FIG. 25 is a flowchart illustrating an example of a manufacturing method for the prosthetic apparatus of the sixth embodiment according to the present invention.

FIG. 24 is a block diagram illustrating an example of a manufacturing apparatus 10 for a prosthetic apparatus 4D of the sixth embodiment according to the present invention. FIG. 25 is a flowchart illustrating an example of a manufacturing method for the prosthetic apparatus 4D of the sixth embodiment according to the present invention.

In the sixth embodiment, an example of manufacturing the prosthetic apparatus 4D of a denture by producing a shaped body 3C of a denture base and bonding artificial teeth to the produced shaped body 3C will be described.

The sixth embodiment is different from the first embodiment in that the manufacturing apparatus 10 includes a bonding apparatus 22 and a processing apparatus 23. In addition, the sixth embodiment is different from the first embodiment in that the manufacturing method includes a bonding process ST47 and a processing process ST48.

The manufacturing apparatus 10 manufactures a denture as the prosthetic apparatus 4D. The denture is, for example, a denture base such as a resin base to which artificial teeth are bonded (refer to FIG. 30). In the manufacturing apparatus 10, the shaped body 3C of a denture base is produced (refer to FIG. 28), and prefabricated artificial teeth 8 are bonded to the shaped body 3C as the denture base (refer to FIG. 29). Thus, a denture is manufactured.

As illustrated in FIG. 24, the manufacturing apparatus includes the bonding apparatus 22 and the processing apparatus 23.

The bonding apparatus 22 is an apparatus that bonds an artificial tooth to the denture base which is the shaped body 3C produced by a production apparatus 10. For example, the bonding apparatus 22 may be a dispenser that applies a bonding material for bonding the artificial tooth and the shaped body 3C. Alternatively, the bonding apparatus 22 may be a brush for applying a bonding material. Note that the bonding apparatus 22 is not limited to the dispenser and the brush. The bonding apparatus 22 may be an apparatus capable of applying a bonding material. The bonding material is not particularly limited, and curable resin, such as photopolymerizable resin that is a material used for a 3D printer or powder-liquid type autopolymerizing resin, can be used.

The processing apparatus 23 is an apparatus that processes the shaped body 3C to which the artificial teeth are bonded. For example, the processing apparatus 23 performs a finishing process by cutting the shaped body 3C to which the artificial teeth are bonded. Thus, the prosthetic apparatus 4D of a denture is completed.

Next, an example of a manufacturing method for the prosthetic apparatus 4D will be described by using FIG. 25. Note that Steps ST41 to ST46 illustrated in FIG. 25 are similar to Steps ST1 to ST6 illustrated in FIG. 6 of the first embodiment, and therefore detailed description thereof is omitted.

Figure 26:
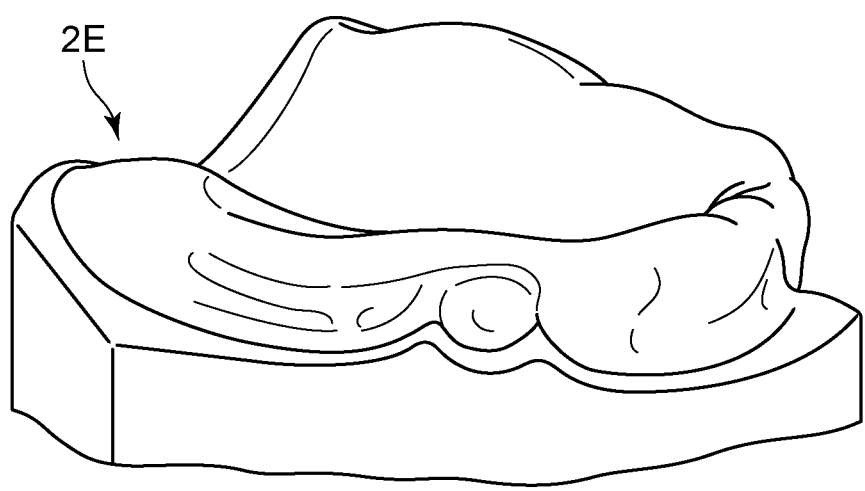
FIG. 26 is a schematic diagram illustrating an example of a model.

As illustrated in FIG. 25, Step ST41 is an acquisition process of acquiring scan data of a model that is a reproduction of at least a part of an inside of an oral cavity of a patient. FIG. 26 is a schematic diagram illustrating an example of a model 2E. The model 2E illustrated in FIG. 26 is a model that is a reproduction of an inside of an oral cavity of an edentulous upper jaw. In Step ST41, scan data of the model 2E is acquired by a scanning apparatus 21.

Step ST42 is a shape data creating process of creating shape data of a shaped body for a denture on the basis of the scan data. Specifically, in Step ST42, a shape data creating apparatus 11 creates shape data of the denture base. The shape data may include shape data of an artificial tooth in addition to shape data of a denture base. As the shape data of the artificial tooth, for example, data of a prefabricated artificial tooth may be adopted. The prefabricated artificial tooth is a ready-made artificial tooth of which shape is previously determined.

Figure 27:
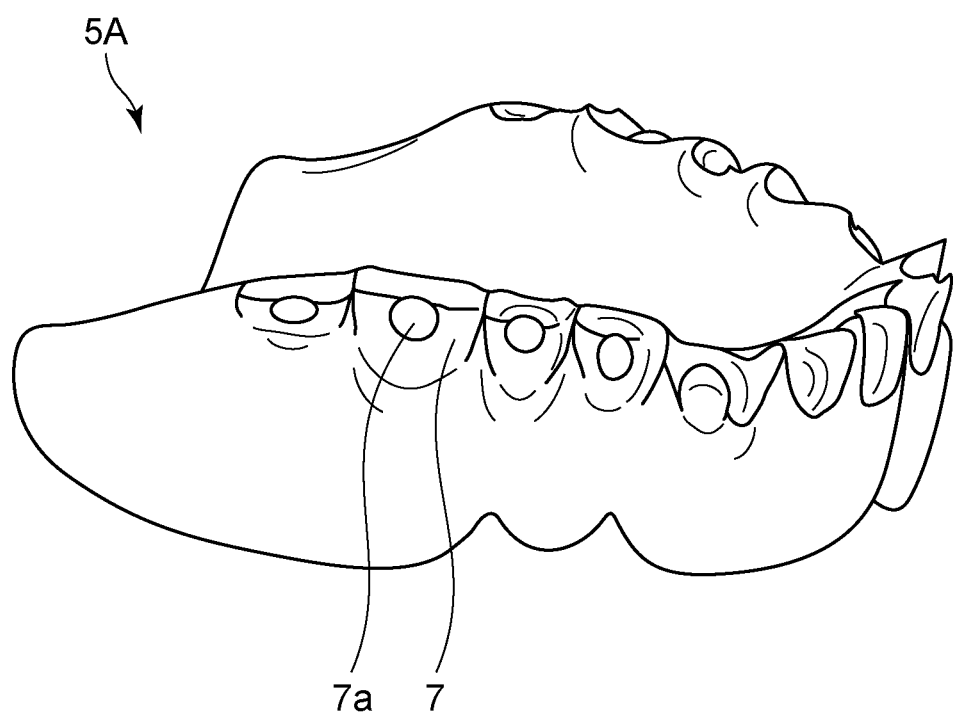
FIG. 27 is a schematic diagram illustrating an example of a shaped body in a semi-cured state.

Step ST43 is a shaped body production process of producing the shaped body in the semi-cured state on the basis of the shape data. In Step ST43, the optical shaping apparatus 12 produces a shaped body in a first curing state, that is, a shaped body in a first curing state in a semi-cured state, on the basis of the shape data of the denture base, the data being prepared in Step ST42. FIG. 27 is a schematic diagram illustrating an example of a shaped body 5A in a semi-cured state. The example illustrated in FIG. 27 illustrates the shaped body 5A of a denture base to which ready-made artificial teeth are bonded. As illustrated in FIG. 27, the shaped body 5A in the semi-cured state has a shape of the denture base to be attached to the model 2E. A plurality of recesses 7 on which a plurality of artificial teeth is to be disposed is formed in the shaped body 5A. The plurality of recesses 7 has shapes corresponding to respective shapes of the plurality of artificial teeth. Specifically, the plurality of recesses 7 is recessed according to a shape of foundations of the plurality of artificial teeth. In addition, each of the recesses 7 is formed with a projection 7a for positioning, which is to be inserted into a positioning hole provided in each of the foundations of the artificial teeth.

Figure 28:
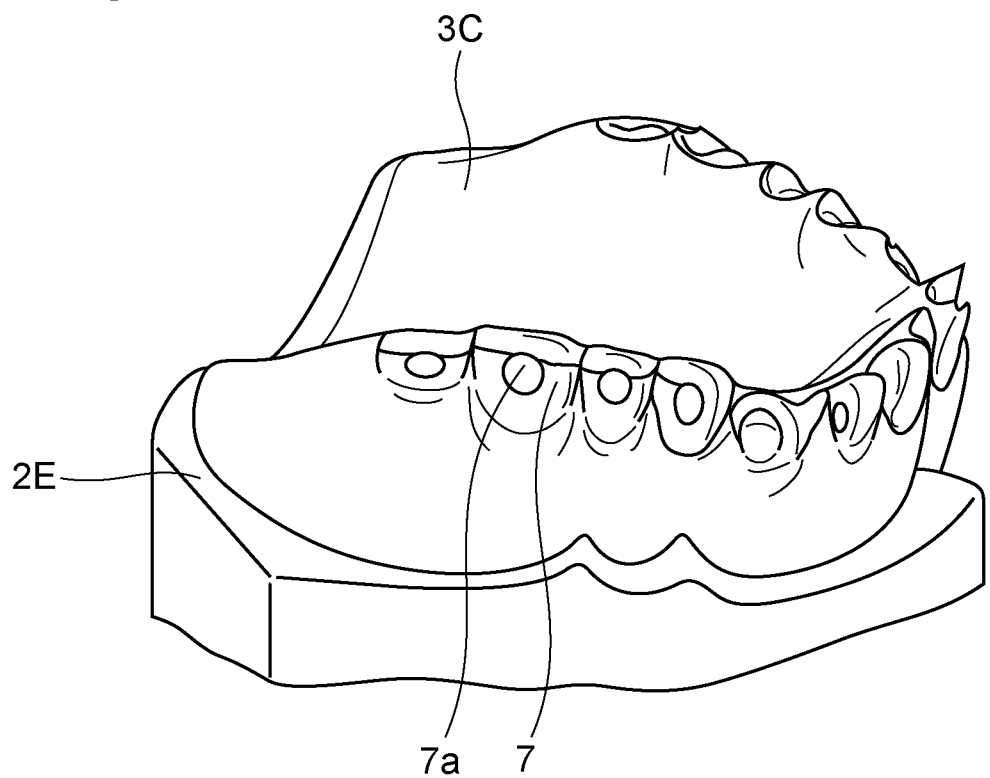
FIG. 28 is a schematic diagram illustrating an example of a state where the shaped body in the semi-cured state is attached to the model.

Step ST44 is a covering process of attaching the shaped body 5A to the model 2E and covering the shaped body 5A and of the model 2E with the film 6. FIG. 28 is a schematic diagram illustrating an example of a state where the shaped body 5A in the semi-cured state is attached to the model 2E. As illustrated in FIG. 28, in Step ST44, in a state where the shaped body 5A shaped in Step ST43 is attached to the model 2E, the vacuum packaging apparatus 13 covers the shaped body 5A and the model 2E with the film 6.

Step ST45 is an air release process of releasing air in the part covered with the film 6 to deform the film 6 and bring the shaped body 5A into close contact with the model 2E.

Step ST45 may include an adjustment process of adjusting a vacuum degree of the part covered with the film 6. For example, in the adjustment process, a vacuum degree of the part covered with the film 6 is adjusted to 40% or more and 99.9% or less by an adjuster 16 of the vacuum packaging apparatus 13. Preferably, in the adjustment process, a vacuum degree of the part covered with the film 6 is adjusted to 50% or more and 99.9% or less. More preferably, in the adjustment process, a vacuum degree of the part covered with the film 6 is adjusted to 60% or more and 99.9% or less.

In Step ST45, after the air in the part covered with the film 6 is released, the sealing unit of the vacuum packaging apparatus 13 seals the film 6. Thus, the shaped body 5A and the model 2E remain in close contact with each other.

Step ST46 is a curing process (light emission process) of curing the shaped body 5A by emitting light on the shaped body 5A in a state where the shaped body 5A is in close contact with the model 2E. In Step ST46, the light emission apparatus 14 emits light on the shaped body 5A in the semi-cured state, in a state where the shaped body 5 is in close contact with the model 2E. Thus, the shaped body 5A in the semi-cured state is cured. As a result, a shaped body 3C in a final cured state is produced. That is, the shaped body 3C in the second curing state obtained by further curing the shaped body 5A in the first curing state is produced.

Figure 29:
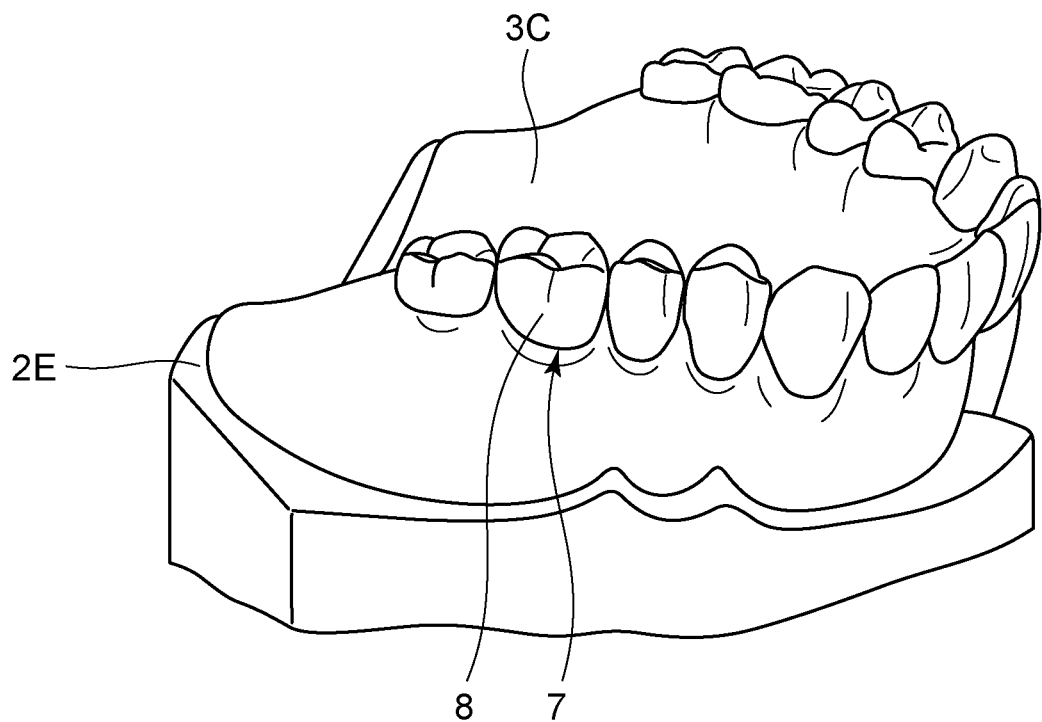
FIG. 29 is a schematic diagram illustrating an example of a state where artificial teeth are bonded to a shaped body of a denture base.

Step ST47 is a bonding process of bonding artificial teeth to the shaped body 3C. FIG. 29 is a schematic diagram illustrating an example of a state where a plurality of artificial teeth 8 is bonded to the shaped body 3C of a denture base. Note that, in the example illustrated in FIG. 29, the artificial teeth 8 are prefabricated artificial teeth. As illustrated in FIG. 29, in Step ST47, the bonding apparatus 22 bonds the plurality of artificial teeth 8 to the shaped body 3C. Specifically, the bonding apparatus 22 applies the bonding material to the plurality of recesses 7 provided on the shaped body 3C, and disposes the plurality of artificial teeth 8 on the plurality of recesses 7. By the bonding material being hardened, the shaped body 3C to which the artificial teeth are bonded is produced.

Figure 30:
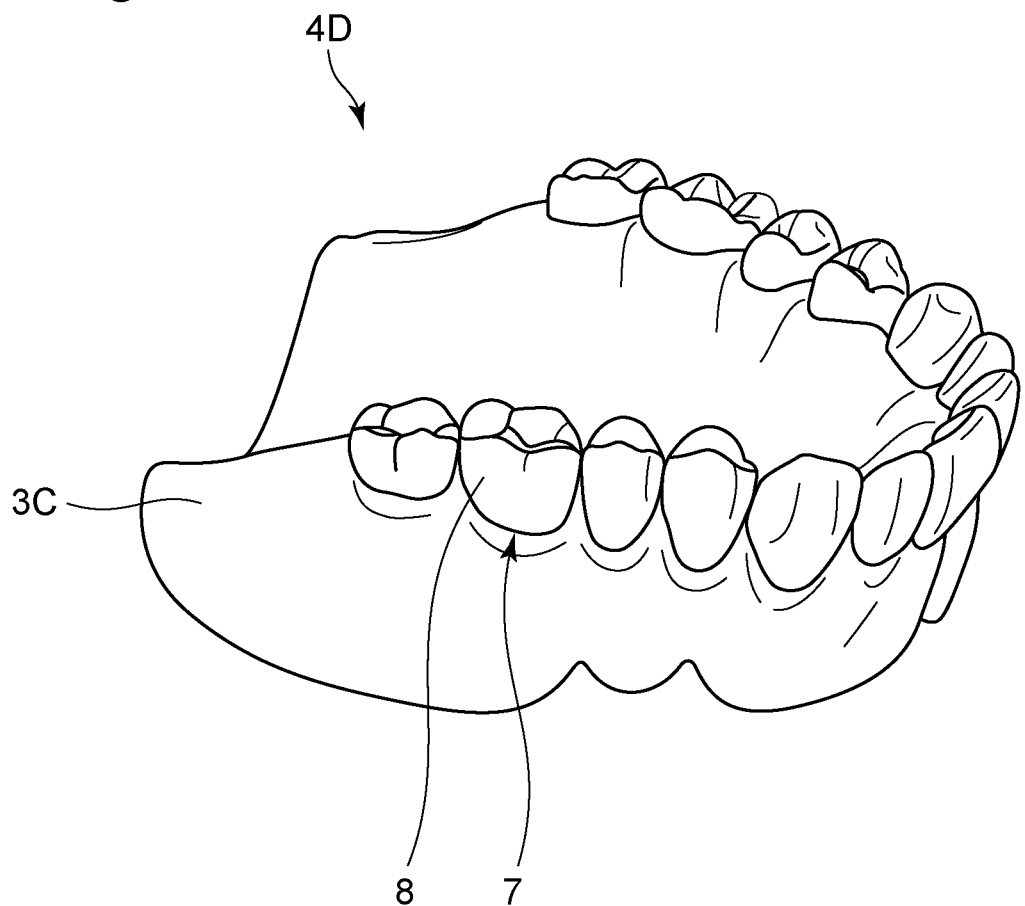
FIG. 30 is a schematic diagram illustrating an example of a denture.

In Step ST48, the shaped body 3C to which the artificial teeth are bonded is subjected to a finishing process. In Step ST48, the processing apparatus 23 performs a process such as cutting the shaped body 3C produced in Step ST47. Thus, the prosthetic apparatus 4D of a denture is completed. FIG. 30 is a schematic diagram illustrating an example of the prosthetic apparatus 4D of a denture. As illustrated in FIG. 30, after the finishing process, the prosthetic apparatus 4D is removed from the model 2E, by which the prosthetic apparatus 4D of a denture is completed.

As described above, in the manufacturing method for the prosthetic apparatus 4D of a denture, the prosthetic apparatus 4D of a denture can be manufactured by performing Steps ST41 to ST48.

[Effects]

According to the sixth embodiment according to the present invention, the following effects can be obtained.

In the manufacturing apparatus 10 for and manufacturing method for the prosthetic apparatus 4D, the prosthetic apparatus 4D of a denture can be manufactured by producing the shaped body 3C of a denture base and bonding the artificial teeth 8 to the produced shaped body 3C. In addition, according to the manufacturing apparatus 10 and the manufacturing method, an amount of residual monomer can be reduced, and conformity of the prosthetic apparatus 4D of a denture can be improved.

Specifically, because the shaped body 5A of a denture base in the semi-cured state is cured to the shaped body 3C in the final cured state in a state where the shaped body 5A is in close contact with the model 2E, warpage and deformation due to shrinkage that occurs in the curing can be reduced.

In an air release process ST45, air in the film 6 is released by the vacuum packaging apparatus 13 in a state where the shaped body 5A and the model 2E are covered with the film 6. Thus, polymerization is performed in a state where oxygen as a polymerization inhibitor is removed together with air, the polymerization is promoted, and an amount of residual monomer can be reduced.

Note that, in the sixth embodiment, an example has been described in which the manufacturing apparatus 10 and the manufacturing method manufacture a maxillary denture as the prosthetic apparatus 4D, but the present invention is not limited thereto. For example, the manufacturing apparatus 10 and the manufacturing method may manufacture a mandibular denture as the prosthetic apparatus 4D.

In the sixth embodiment, an example has been described in which the artificial teeth 8 are prefabricated artificial teeth which are ready-made artificial teeth, but the artificial teeth 8 are not limited thereto. The artificial teeth 8 may not be ready-made artificial teeth, but shaped artificial teeth. For example, the artificial teeth 8 may be shaped artificial teeth shaped by the shape data creating apparatus 11 and the optical shaping apparatus 12. Alternatively, the shaped artificial teeth may be shaped by an apparatus different from a production apparatus 100.

For example, the shape data creating apparatus 11 may create shape data of the shaped artificial teeth. For example, the shape data creating apparatus 11 may create shape data of artificial teeth having a shape suitable for the inside of the oral cavity of the patient. The optical shaping apparatus 12 may shape the shaped artificial teeth on the basis of the shape data of the artificial teeth created by the shape data creating apparatus 11. Thus, a finishing process for the artificial teeth by the processing apparatus 23 can be omitted.

The manufacturing method for the prosthetic apparatus 4D may include a step of producing shaped artificial teeth. With such a configuration, a denture base and the artificial teeth can be produced, and therefore, the prosthetic apparatus 4D of a denture can be easily manufactured.

In the sixth embodiment, an example has been described in which the plurality of artificial teeth 8 is separated from each other, but the artificial teeth 8 are not limited thereto. A plurality of artificial teeth may be connected to one another. For example, in a case of shaping a plurality of artificial teeth, it is preferable to shape connected artificial teeth obtained by connecting a plurality of artificial teeth to one another.

Figure 31:
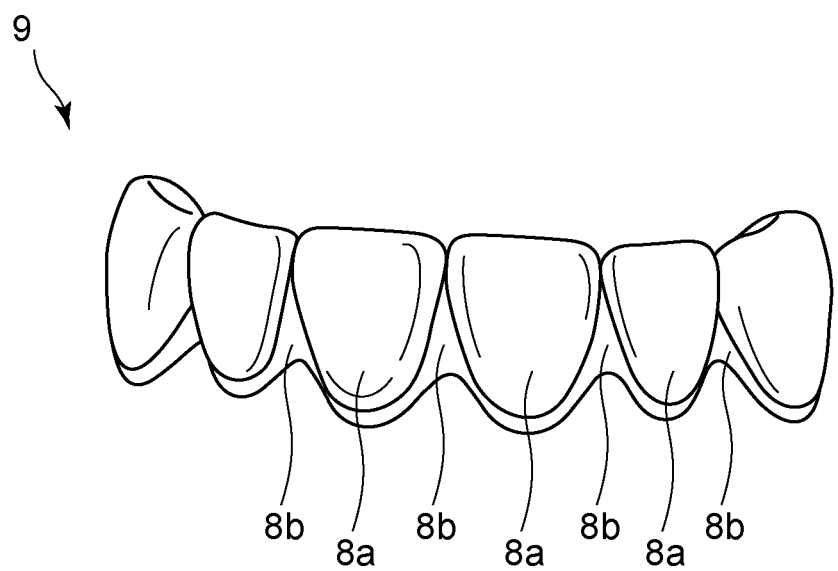
FIG. 31 is a schematic diagram illustrating an example of connected artificial teeth.

FIG. 31 is a schematic diagram illustrating an example of connected artificial teeth 9 in which a plurality of shaped artificial teeth 8a is connected to one another. FIG. 31 illustrates the connected artificial teeth 9 in which six teeth, which are front teeth, are connected to one another. The front teeth include central incisors, lateral incisors, and canines. As illustrated in FIG. 31, the plurality of shaped artificial teeth 8a may be connected to one another by connection parts 8b. A connection part 8b is formed between two adjacent shaped artificial teeth 8a. The connection parts 8b are shaped together when the plurality of shaped artificial teeth 8a is shaped. For this reason, the plurality of shaped artificial teeth 8a and the connection parts 8b are integrally formed. In addition, the connection parts 8b define arrangement of the plurality of shaped artificial teeth 8a. In the example illustrated in FIG. 31, the plurality of shaped artificial teeth 8a is connected in a state of being arranged in an arch shape by the connection parts 8b. By using such connected artificial teeth 9, the plurality of shaped artificial teeth 8a can be easily disposed and bonded to the shaped body 3C of a denture base.

In the sixth embodiment, an example has been described in which a projection 7a is provided on each of the plurality of recesses 7 of the shaped body 3C, but the present invention is not limited thereto. A projection 7a may not be provided on a recess 7 of the shaped body 3C.

In the sixth embodiment, an example has been described in which the plurality of recesses 7 of the shaped body 3C includes shapes corresponding to shapes of the foundations of the plurality of prefabricated artificial teeth 8, but the present invention is not limited thereto. The plurality of recesses 7 may be changed according to the shapes of the plurality of artificial teeth to be disposed. For example, the plurality of recesses 7 may include shapes corresponding to the shapes of the foundations of the plurality of shaped artificial teeth 8a. Alternatively, the plurality of recesses 7 may include shapes corresponding to the shapes of the foundations of the connected artificial teeth 9 in which the plurality of shaped artificial teeth 8a is connected.

Figure 32:
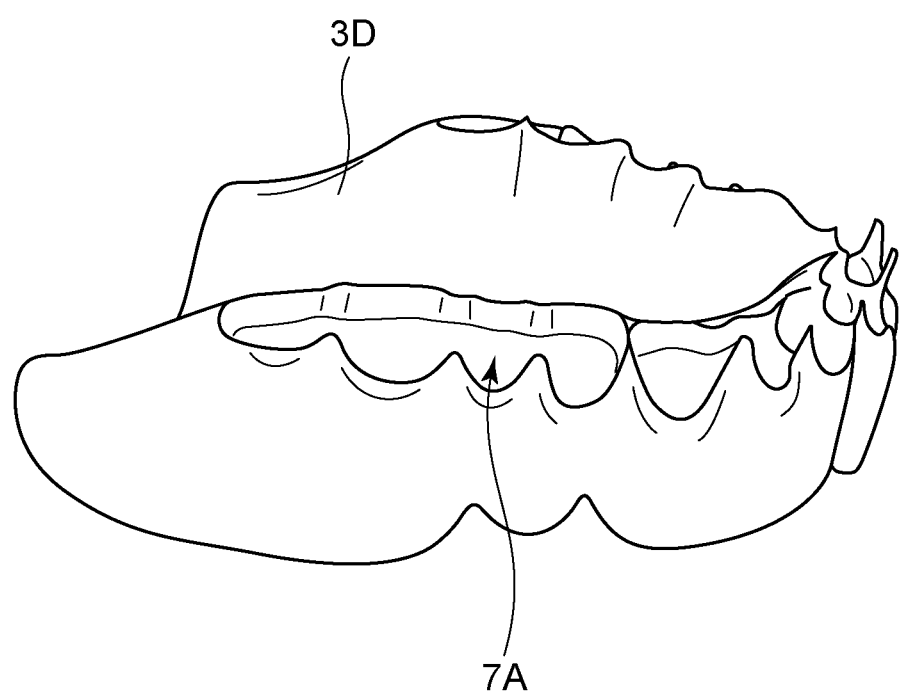
FIG. 32 is a schematic diagram illustrating another example of a shaped body of a denture base.

FIG. 32 is a schematic diagram illustrating another example of the shaped body of a denture base. FIG. 32 illustrates a shaped body 3D of a denture base to which the connected artificial teeth 9 are to be bonded. As illustrated in FIG. 32, in the shaped body 3D, recesses 7A on which the connected artificial teeth 9 are to be disposed have a shape corresponding to shapes of foundations of the connected artificial teeth 9. Specifically, the recesses 7A are recessed according to shapes of foundations of the plurality of shaped artificial teeth 8a and of connection parts 9b. As described above, the shaped body 3D of a denture base may include recesses 7A corresponding to the connected artificial teeth 9.

In the sixth embodiment, an example in which the manufacturing apparatus 10 includes the processing apparatus 23 has been described, but the present invention is not limited thereto. The manufacturing apparatus 10 may not include the processing apparatus 23. In addition, an example has been described in which the manufacturing method for the prosthetic apparatus 4D includes Step ST48 as a finishing process, but the manufacturing method is not limited thereto. The manufacturing method for the prosthetic apparatus 4D may not include Step ST48. That is, Step ST48 is not an essential configuration.

In the sixth embodiment, an example has been described in which the bonding apparatus 22 is an apparatus different from the production apparatus 10, but the bonding apparatus 22 is not limited thereto. The bonding apparatus 22 may be included in the production apparatus 10. In addition, an example has been described in which Step ST47 as a bonding process is performed after producing the shaped body 3C, but the present invention is not limited thereto.

Figure 33:
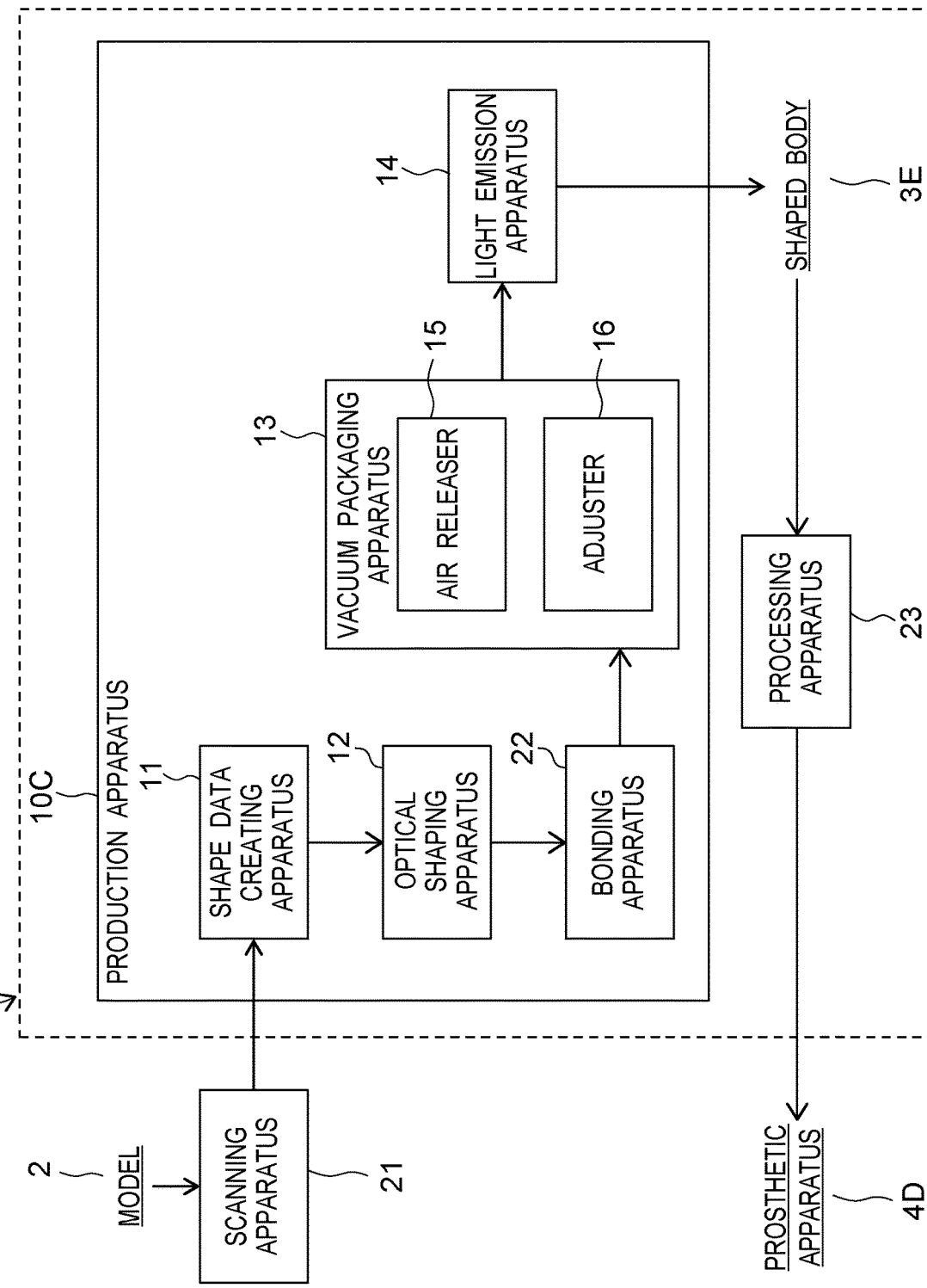
FIG. 33 is a block diagram illustrating another example of the manufacturing apparatus for the prosthetic apparatus of the sixth embodiment according to the present invention.

FIG. 33 is a block diagram illustrating another example of a manufacturing apparatus 1D for a prosthetic apparatus 4D of the sixth embodiment according to the present invention. As illustrated in FIG. 33, in the manufacturing apparatus 1D, the production apparatus 10C may include the bonding apparatus 22. In addition, in the manufacturing apparatus 1D, the bonding apparatus 22 may bond a plurality of artificial teeth to a shaped body in a semi-cured state produced by the optical shaping apparatus 12.

Figure 34:
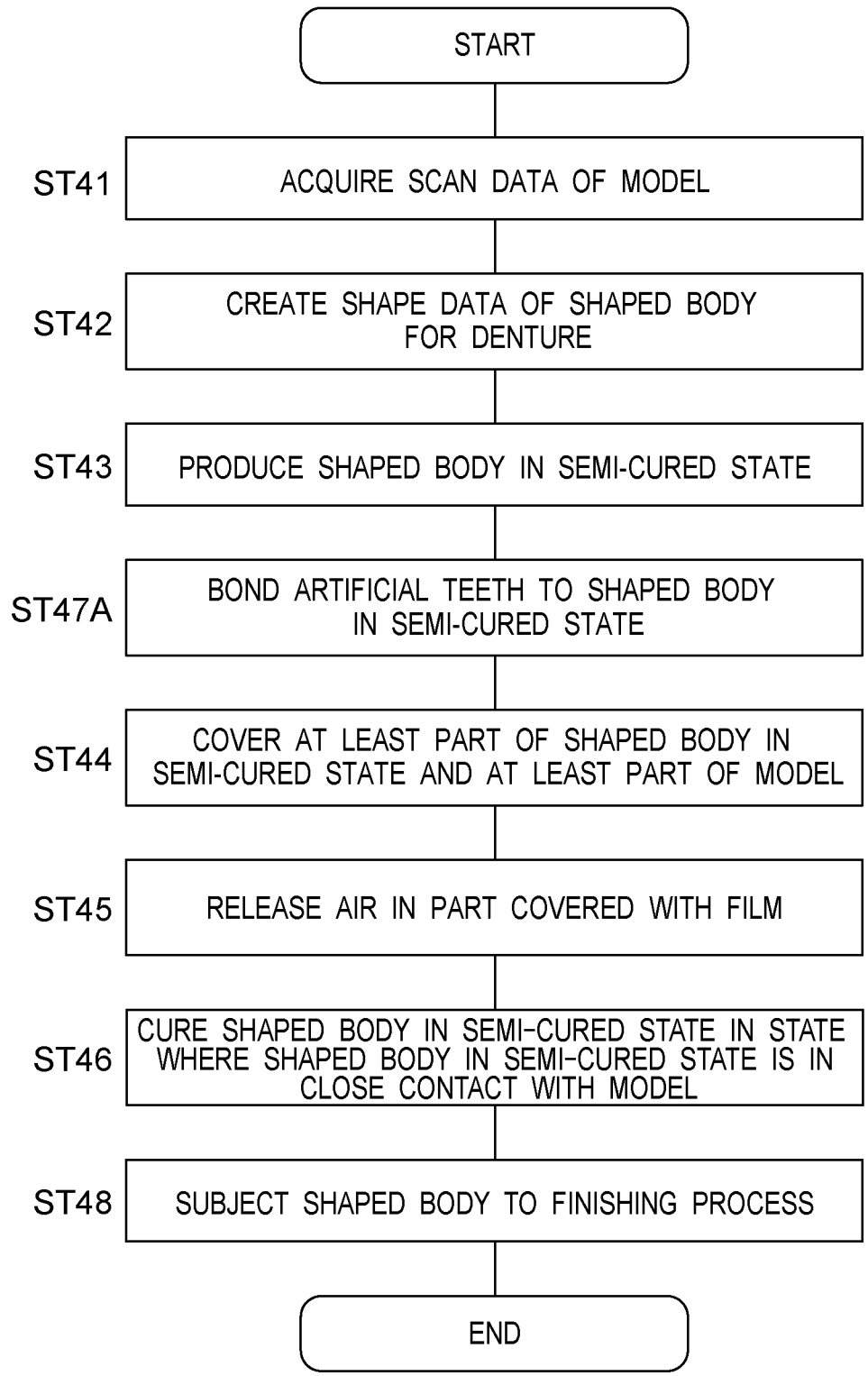
FIG. 34 is a flowchart illustrating another example of a manufacturing method for the prosthetic apparatus of the sixth embodiment according to the present invention.

FIG. 34 is a flowchart illustrating another example of a manufacturing method for the prosthetic apparatus of the sixth embodiment according to the present invention. Steps ST41 to ST46 and ST48 illustrated in FIG. 34 are similar to Steps ST41 to ST46 and ST48 illustrated in FIG. 25. As illustrated in FIG. 34, Step ST47A, which is a bonding process of bonding artificial teeth, may be performed after Step ST43 and before Step ST44.

Figure 35:
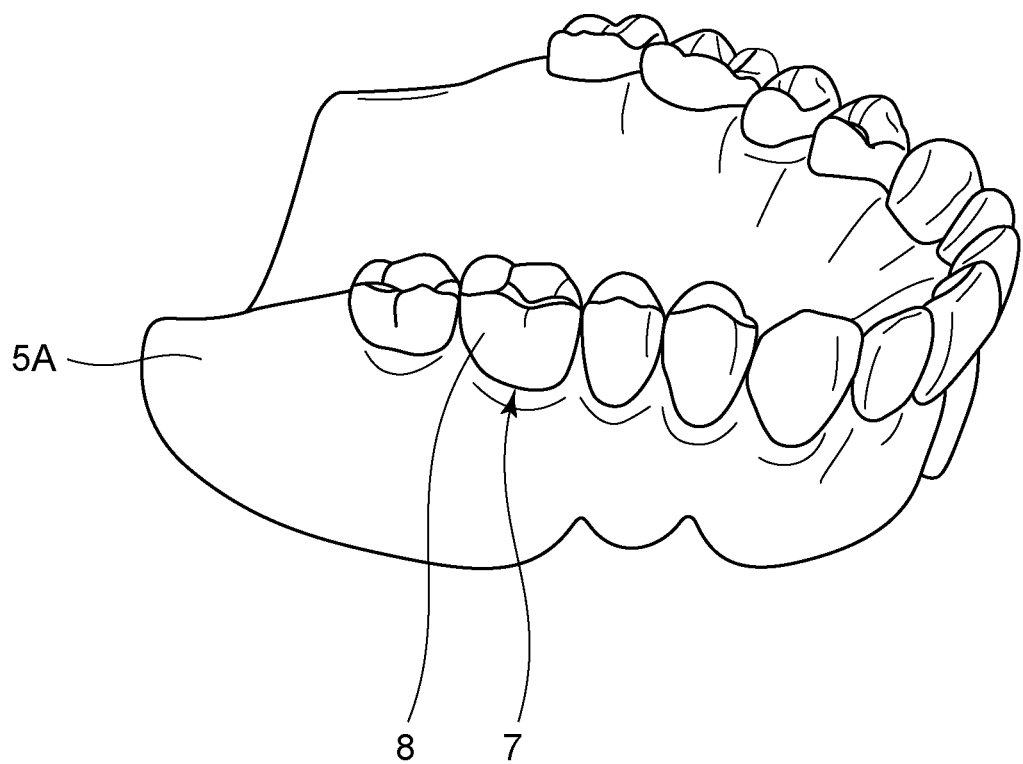
FIG. 35 is a schematic diagram illustrating an example of a state where artificial teeth are bonded to a shaped body in a semi-cured state.

FIG. 35 is a schematic diagram illustrating an example of a state where artificial teeth are bonded to the shaped body 5A in the semi-cured state. As illustrated in FIG. 35, in Step ST47A, a plurality of artificial teeth 8 may be bonded to the shaped body 5A in the semi-cured state produced in Step ST43. As described above, in the example illustrated in FIG. 35, the plurality of artificial teeth 8 are bonded to the shaped body 5A in the semi-cured state, and therefore, the shaped body 3D finally produced by the production apparatus 10C is a denture such as a resin base denture. The shaped body 3D of a denture is subjected to a finishing process by the processing apparatus 23. Thus, the prosthetic apparatus 4D of a denture is completed. With such a configuration also, an amount of residual monomer can be reduced, and conformity of the prosthetic apparatus 4D of a denture can be improved.

In the sixth embodiment, an example has been described in which the prosthetic apparatus 4D of a denture is manufactured by using the manufacturing method in the first embodiment, but the present invention is not limited thereto. The prosthetic apparatus 4D of a denture may be manufactured by using any one of the manufacturing methods in the first to fourth embodiments.

EXAMPLES

The manufacturing apparatus 1C for and a manufacturing method for the prosthetic apparatus 4D will be further described on the basis of examples, but the present invention is not limited to the following examples.

Hereinafter, conditions of the examples will be described.
[Conditions of Examples]
<Optical Shaping Apparatus>
As the optical shaping apparatus 12, D30 of the DLP method (manufactured by Rapid Shape) was used.
<Material Forming Shaped Body>
Base (manufactured by NextDent, material: acrylate resin) was used as a material that forms a shaped body for a denture base.
<Artificial Teeth>
As artificial teeth, prefabricated artificial teeth 8, which are ready-made artificial teeth, and shaped artificial teeth 8a shaped by an optical shaping apparatus were used. Used as the prefabricated artificial teeth 8 are Veracia SA ANTERIOR (shade: A3, shape: ST5) and Veracia SA POSTERIOR (shade: A3, shape: S30) that are manufactured by SHOFU INC. Used as the shaped artificial teeth 8a are shaped artificial teeth shaped into shapes of Veracia SA manufactured by SHOFU INC., by using C&B (manufactured by NextDent, material: acrylate resin) that is a C&B material for an optical shaping apparatus.
<Bonding Material>
PROVINICE (shade: 3S) manufactured by SHOFU INC. was used as a bonding material for bonding the artificial teeth and the shaped body of a denture base.
<Film>
Hiryu N-5NP, which is a standard bag with magic cut (manufactured by Asahi Kasei Pax, material: nylon, polyethylene) was used.
<Light Emission Apparatus>
LC-3DPrint Box (manufactured by NextDent) was used.
<Ultrasonic Cleaning Apparatus>
SUC-70 (manufactured by SHOFU INC.) was used.

Evaluation samples for examples 50 to 58 and comparative examples 8 to 10 were prepared by the following procedure.
[Production of Conformity Evaluation Samples]

Example 50

In the example 50, by using the production apparatus 100 of the sixth embodiment, the shaped body 3C having a shape of a denture base was produced as a conformity evaluation sample. In the example 51, the shaped body 3C was produced by performing Steps ST41 to ST46 illustrated in FIG. 25.

Specifically, shape data of a shaped body for a denture is prepared according to the model 2E by the shape data creating apparatus 11. On the basis of the created shape data, the shaped body 5A in the semi-cured state illustrated in FIG. 27 was shaped by the optical shaping apparatus 12 on the basis of an instruction manual of each material or a condition initially set. The shaped body 5A in the semi-cured state was subjected to ultrasonic cleaning in Isopropyl alcohol. The ultrasonic cleaning was performed for five minutes for each of primary cleaning and secondary cleaning.

Next, a support was removed, and the shaped body 5A in the semi-cured state was attached to the model 2E as illustrated in FIG. 28. The shaped body 5A in the semi-cured state and the model 2E were covered with the film 6, and air in the part covered with the film 6 was released by the vacuum packaging apparatus 13 to bring the shaped body 5A in the semi-cured state and the model 2E into close contact with each other. The shaped body 5A in the semi-cured state was subjected to light emission (post-curing) by the light emission apparatus 14 for 15 minutes, in a state where the shaped body 5A and the model 2E were in close contact with each other. The shaped body 3C subjected to the light emission was removed from the film 6, and a back surface (mucosal surface) of the shaped body 3C was subjected to light emission for another 15 minutes to produce the shaped body 3C of a denture base.

Example 51

In the example 51, a denture to which prefabricated artificial teeth 8 were bonded was produced by performing Steps ST41 to ST48 illustrated in FIG. 25. In the example 51, a shaped body 3C of a denture base for prefabricated artificial teeth 8 was manufactured as similar to the example 50, and prefabricated artificial teeth were bonded to the produced shaped body 3C to produce a denture. Specifically, powder-liquid mixture PROVINICE manufactured by SHOFU INC. was applied as a bonding material to the plurality of recesses 7 of the produced shaped body 3C. Subsequently, Veracia SA manufactured by SHOFU INC. as ready-made artificial teeth was pressed against the plurality of recesses 7 and cured at room temperature to produce a denture to which the prefabricated artificial teeth 8 was bonded.

Example 52

In the example 52, a denture to which shaped artificial teeth 8a were bonded was produced by performing Steps ST41 to ST48 illustrated in FIG. 25. In the example 52, a shaped body 3D of a denture base for shaped artificial teeth 8a was produced as similar to the example 50, and artificial teeth for shaping were bonded to the produced shaped body 3D to produce a denture. Specifically, a 3D printer liquid "Base (manufactured by NextDent)" was applied to the plurality of recesses 7A of the produced shaped body 3D. Subsequently, the shaped artificial teeth 8a were pressed against the plurality of recesses 7A and subjected to light emission for five minutes to produce a denture to which the shaped artificial teeth 8a were bonded.

Example 53

In the example 53, a denture to which the prefabricated artificial teeth 8 were bonded was produced in a similar method to the example 51, except that shaping was performed with an overcure value, which was initially set for the optical shaping apparatus 12, being changed from 100% to 80%, and the shaped body 5A in the semi-cured state illustrated in FIG. 27 was shaped. Note that the overcure value is a setting value for D30 (manufactured by Rapid Shape). Polymerization time can be changed by changing the overcure value. The greater the overcure value, the longer the polymerization time. The smaller the overcure value, the shorter the polymerization time. In the example 53, the polymerization time was shortened as compared to the example 51 by changing the overcure value from 100% to 80%.

Example 54

In the example 54, a denture to which the prefabricated artificial teeth 8 were bonded was produced as similar to the example 53, except that shaping was performed with an overcure value, which was initially set for the optical shaping apparatus 12, being changed from 100% to 120%. In the example 54, the polymerization time was elongated as compared to the example 51 by changing the overcure value from 100% to 120%.

Example 55

In the example 55, a denture to which the prefabricated artificial teeth 8 were bonded was produced in a similar method to the example 51, except that a vacuum degree of the vacuum packaging apparatus 13 was set to 50%.

Example 56

In the example 56, a denture to which the prefabricated artificial teeth 8 were bonded was produced in a similar method to the example 55, except that a vacuum degree of the vacuum packaging apparatus 13 was set to 80%.

Example 57

In the example 57, a denture to which the prefabricated artificial teeth 8 were bonded was produced in a similar method to the example 55, except that a vacuum degree of the vacuum packaging apparatus 13 was set to 99.9%.

Example 58

In the example 58, a denture to which prefabricated artificial teeth 8 were bonded was produced by performing Steps ST41 to ST48 illustrated in FIG. 34. Specifically, shape data of a shaped body for a denture was created according to the model 2E by the shape data creating apparatus 11. On the basis of the created shape data, the shaped body 5A in the semi-cured state illustrated in FIG. 27 was shaped by the optical shaping apparatus 12 on the basis of an instruction manual of each material or a condition initially set. The shaped body 5A in the semi-cured state was subjected to ultrasonic cleaning in Isopropyl alcohol. The ultrasonic cleaning was performed for five minutes for each of primary cleaning and secondary cleaning. Powder-liquid mixture PROVINICE manufactured by SHOFU INC. was applied as a bonding material to the plurality of recesses 7 of the shaped body 5A in the semi-cured state. Subsequently, Veracia SA manufactured by SHOFU INC. as ready-made artificial teeth was pressed against the plurality of recesses 7 and cured at room temperature to produce the shaped body 5A in the semi-cured state to which the prefabricated artificial teeth 8 illustrated in FIG. 35 was bonded.

Next, the shaped body 5A in the semi-cured state to which the prefabricated artificial teeth 8 were bonded was attached to the model 2E. The shaped body 5A in the semi-cured state and the model 2E were covered with the film 6, and air in the part covered with the film 6 was released by the vacuum packaging apparatus 13 to bring the shaped body 5A in the semi-cured state and the model 2E into close contact with each other. The shaped body 5A in the semi-cured state was subjected to light emission (post-curing) by the light emission apparatus 14 for 15 minutes, in a state where the shaped body 5A and the model 2E were in close contact with each other. The shaped body 3E subjected to the light emission was removed from the film 6, and a back surface (mucosal surface) of the shaped body 3E was subjected to light emission for another 15 minutes to produce the shaped body 3E of a denture base.

Comparative Example 8

In the comparative example 8, a denture to which the prefabricated artificial teeth 8 were bonded was produced as similar to the example 51, except that the vacuum packaging apparatus 13 was not used. The comparative example 8 is different from the example 51 in that the shaped body 5A in the semi-cured state, which is attached to the model 2E and not covered by the film 6, was subjected to light emission (post-curing) by the light emission apparatus 14 for 15 minutes.

Comparative Example 9

In the comparative example 9, a denture to which the prefabricated artificial teeth 8 were bonded was produced as similar to the example 58, except that the vacuum packaging apparatus 13 was not used. The comparative example 9 is different from the example 58 in that the shaped body 5A in the semi-cured state to which the prefabricated artificial teeth 8 were bonded, which is attached to the model 2E and not covered by the film 6, was subjected to light emission (post-curing) by the light emission apparatus 14 for 15 minutes.

Comparative Example 10

In the comparative example 10, a denture to which the shaped artificial teeth 8a were bonded was produced as similar to the example 52, except that the vacuum packaging apparatus 13 was not used. The comparative example 10 is different from the example 52 in that the shaped body 5A in the semi-cured state, which is attached to the model 2E and not covered by the film 6, was subjected to light emission (post-curing) by the light emission apparatus 14 for 15 minutes.

[Production of Polymerization Rate Evaluation Sample in Semi-Cured State]

A round base of p 15 mm×1 mm was shaped by using the optical shaping apparatus 12. The shaped body in the semi-cured state was subjected to ultrasonic cleaning in Isopropyl alcohol. The ultrasonic cleaning was performed for five minutes for each of primary cleaning and secondary cleaning. A support was removed, and this was used for polymerization rate evaluation of a shaped body in a semi-cured state.

[Production of Polymerization Rate Evaluation Samples in Final Cured State and Residual Monomer Extraction Ratio Evaluation Samples]

Polymerization rate evaluation samples in a final cured state and residual monomer extraction ratio evaluation samples had the same shape, and were produced by the following method.

(Forms of Examples)

A sample for which polymerization rate evaluation in a semi-cured state was completed was used as is. A round base sample for which polymerization rate evaluation in a semi-cured state was completed was placed on a plaster adjusted to dimensions of 40 mm×40 mm×10 mm. The plaster and the round base were covered with the film 6, and air in a part covered with the film 6 was released by the vacuum packaging apparatus 13 to bring the plaster and the round into close contact with each other. Thereafter, the plaster and the round base remaining in close contact with each other were subjected to light emission (post-curing) by the light emission apparatus 14 for 15 minutes. After the shaped body subjected to light emission was removed from the film 6, a back surface of the round base (surface not directly irradiated with light) was subjected to light emission for another 15 minutes, and this was used as a sample for polymerization rate evaluation of a shaped body in a final cured state or as a residual monomer extraction ratio evaluation sample.

(Forms of Comparative Examples)

A sample for which polymerization rate evaluation in a semi-cured state was completed was used as is. A round base sample for which polymerization rate evaluation in a semi-cured state was completed was placed on a plaster adjusted to dimensions of 40 mm×40 mm×10 mm. Light emission (post-curing) was performed by the light emission apparatus 14 for 15 minutes. Thereafter, a back surface of the round base (surface not directly irradiated with light) was subjected to light emission for another 15 minutes, and this was used as a sample for polymerization rate evaluation of a shaped body in a final cured state or as a residual monomer extraction ratio evaluation sample.

[Conformity Evaluation Method]

Each of the dentures and denture bases produced in the examples 50 to 58 and the comparative examples 8 to 10 was attached to the model 2E illustrated in FIG. 26, and gaps between the denture and denture base and the model 2E were measured. FINE CHECKER (manufactured by SHOFU INC.) was used to measure the gaps of a complete denture, and a greatest value among measurement values of a central portion was measured. The gaps are clinically acceptable to be 500 µm or less, and more preferably 200 µm or less.

[Polymerization Rate Evaluation Method]

By using Fourier Transform Infrared Spectrometer FT-IR 6300 (manufactured by JASCO Corporation), peak intensity attributed to C=C at around 6150 cm$^{-1}$ was measured for resin material of a shaped body before shaping, a shaped body 5A in a semi-cured state, and shaped bodies 3C and 3D in a final cured state. A polymerization rate was calculated from a ratio of peak intensity between a shaped body and resin liquid material. The polymerization rate was calculated by the following mathematical formula.

$$\text{polymerization rate (\%)} = (1 - (PS1/PS2)) \times 100$$

Here, PS1 represents peak intensity of the shaped body, and PS2 represents peak intensity of the resin liquid material.

[Residual Monomer Extraction Ratio Evaluation Method]

A shaped body and a glass container were weighed in advance. One shaped body was placed in the glass container, acetone was added to the glass container so as to be 10 mL per 1 g of the shaped body, and then the glass container was shaken at a rate of 100 rpm by using a shaker at room temperature for 24 hours. After completion of the shaking, the shaped body was removed from the glass container, and liquid remaining in the glass container was used as extraction liquid. The extraction liquid in the glass container was dried in a dryer at 70° C. for 24 hours, and then allowed to cool to room temperature. Total weight of the dried extraction liquid and the glass container is defined as dry weight, and weight of the glass container is defined as tare weight. An extraction amount was calculated from difference between the dry weight and the tare weight, and an extraction rate was calculated with the following mathematical formula.

$$\text{Extraction rate (\%)} = (Mg1/Mg2) \times 100$$

Here, Mg1 represents an extraction amount (g), and Mg2 represents weight of a shaped body (g).

Evaluation results are illustrated in Tables 20 to 22 below.

TABLE 20

|  | Example 50 | Example 51 | Example 52 | Example 53 | Example 54 |
|---|---|---|---|---|---|
| Type of optical shaping apparatus | D30 | D30 | D30 | D30 | D30 |
| Material of shaped body | Base | Base | Base | Base | Base |
| Use of vacuum packaging apparatus | Yes | Yes | Yes | Yes | Yes |
| Vacuum degree | 65 | 65 | 65 | 65 | 65 |
| Shape at | Denture | Denture | Denture | Denture | Denture |

TABLE 20-continued

|  | Example 50 | Example 51 | Example 52 | Example 53 | Example 54 |
| --- | --- | --- | --- | --- | --- |
| measurement | base |  |  |  |  |
| Artificial teeth | — | Prefabricated artificial teeth | Shaped artificial teeth | Prefabricated artificial teeth | Prefabricated artificial teeth |
| Bonding order | — | After post-curing | After post-curing | After post-curing | After post-curing |
| Polymerization rate of shaped body in semi-cured state (%) | 72 | 75 | 73 | 67 | 80 |
| Polymerization rate of shaped body in final cured state (%) | 95 | 96 | 94 | 95 | 95 |
| Extraction rate of shaped body in final cured state (%) | 0.014 | 0.016 | 0.016 | 0.013 | 0.015 |
| Gap at central portion of palate (μm) | 120 | 120 | 130 | 100 | 130 |

TABLE 21

|  | Example 55 | Example 56 | Example 57 | Example 58 |
| --- | --- | --- | --- | --- |
| Type of optical shaping apparatus | D30 | D30 | D30 | D30 |
| Material of shaped body | Base | Base | Base | Base |
| Use of vacuum packaging apparatus | Yes | Yes | Yes | Yes |
| Vacuum degree | 50 | 80 | 99.9 | 65 |
| Shape at measurement | Denture | Denture | Denture | Denture |
| Artificial teeth | Prefabricated artificial teeth | Prefabricated artificial teeth | Prefabricated artificial teeth | Prefabricated artificial teeth |
| Bonding order | After post-curing | After post-curing | After post-curing | After shaping |
| Polymerization rate of shaped body in semi-cured state (%) | 75 | 75 | 75 | 75 |
| Polymerization rate of shaped body in final cured state (%) | 93 | 96 | 97 | 96 |
| Extraction rate of shaped body in final cured state (%) | 0.02 | 0.011 | 0.009 | 0.015 |
| Gap at central portion of palate (μm) | 180 | 100 | 90 | 120 |

TABLE 22

|  | Comparative Example 8 | Comparative Example 9 | Comparative Example 10 |
| --- | --- | --- | --- |
| Type of optical shaping apparatus | D30 | D30 | D30 |
| Material of shaped body | Base | Base | Base |
| Polymerization rate of shaped body in semi-cured state (%) | 75 | 75 | 75 |
| Use of vacuum packaging apparatus | No | No | No |
| Vacuum degree | — | — | — |
| Shape at measurement | Denture | Denture | Denture |
| Artificial teeth | Prefabricated artificial teeth | Prefabricated artificial teeth | Shaped artificial teeth |
| Bonding order | After post-curing | After shaping | After post-curing |
| Polymerization rate of shaped body in semi-cured state (%) | 75 | 75 | 75 |
| Polymerization rate of shaped body in final cured state (%) | 90 | 91 | 89 |
| Extraction rate of shaped body in final cured state (%) | 0.079 | 0.094 | 0.086 |
| Gap at central portion of palate (μm) | 540 | 580 | 570 |

Only presence or absence of use of a vacuum apparatus is different between the example 51 and the comparative example 8, between the example 58 and the comparative example 9, and between the example 52 and the comparative example 10. In all of the examples 51, 58, and 52 using the vacuum apparatus, a gap at a central portion of a palate falls within a clinically more preferable range, whereas the comparative examples 1, 2, and 3 exceed a clinically acceptable range.

Attention is paid to the examples 50, 51, and 52, and comparisons are made on a bonding process of artificial teeth. In all of the example 50 for a denture base before artificial teeth are bonded, the example 51 for a denture to which prefabricated artificial teeth are bonded, and the example 52 for a denture to which shaped artificial teeth are bonded, a gap at the central portion of the palate is almost the same and falls within a clinically more preferable range.

Attention is paid to the examples 51 and 58, and comparisons are made on an order of processes of bonding artificial teeth. In both the example 51 in which the artificial teeth were bonded after post-curing of the denture base, and the example 58 in which the artificial teeth were bonded to the denture base before post-curing and then subjected to the post-curing, a gap at the central portion of the palate is almost the same and falls within a clinically more preferable range.

Although polymerization rate of a shaped object in a semi-cured state is 67% in the example 53, 75% in the example 51, and 80% in the example 54, a gap at the central portion of the palate is almost the same and falls within a clinically more preferable range regardless of the polymerization rate of the shaped object in a semi-cured state.

Attention is paid to the examples 51, 55, 56, and 57, and comparisons are made on a vacuum degree. All of the example 55 in which a vacuum degree is 50%, the example 51 in which a vacuum degree is 65%, the example 55 in which a vacuum degree is 80%, and the example 57 in which a vacuum degree is 99.9% are clinically more preferable. Alternatively, although the degrees of vacuum fall within a clinically acceptable range, a gap at the central portion of the palate is smaller with a higher vacuum degree, which is more preferable. Note that when a vacuum degree was less than 40%, an amount of air released from the film 6 was small, and it was difficult to bring the shaped body 5A in a semi-cured state into close contact with the model 2E.

Attention is paid to the examples 50 to 58 and the comparative examples 8 to 10, and comparisons are made on a polymerization rate of shaped bodies in a final cured state. The polymerization rates of the shaped bodies in a final cured state in the examples 50 to 58 are 94% to 97%, and the polymerization rates of the shaped bodies in a final cured state in the comparative examples 8 to 10 are 89% to 91%. In the examples 50 to 58, the polymerization rates are improved as compared to the comparative examples 8 to 10.

Attention is paid to the examples 50 to 58 and the comparative examples 8 to 10, and comparisons are made on an extraction rate of shaped bodies in a final cured state. The extraction rates in the examples 50 to 58 are 0.009% to 0.020%, and the extraction rates in the comparative examples 8 to 10 are 0.079% to 0.094%. In the examples 50 to 58, the extraction rates are reduced to ¼ or less as compared to the comparative examples 8 to 10.

As described above, in the examples 50 to 58, conformity to the model is favorable and an amount of residual monomer can be reduced to ¼ or less as compared to the comparative examples 8 to 10.

Seventh Embodiment

A manufacturing apparatus for and manufacturing method for a prosthetic apparatus of a seventh embodiment according to the present invention will be described.

In the seventh embodiment, points different from the sixth embodiment will be mainly described. In the seventh embodiment, configurations the same as or equivalent to configurations of the sixth embodiment will be described with the same reference characters. In addition, in the sixth embodiment, description overlapping with the sixth embodiment will be omitted.

Figure 36:
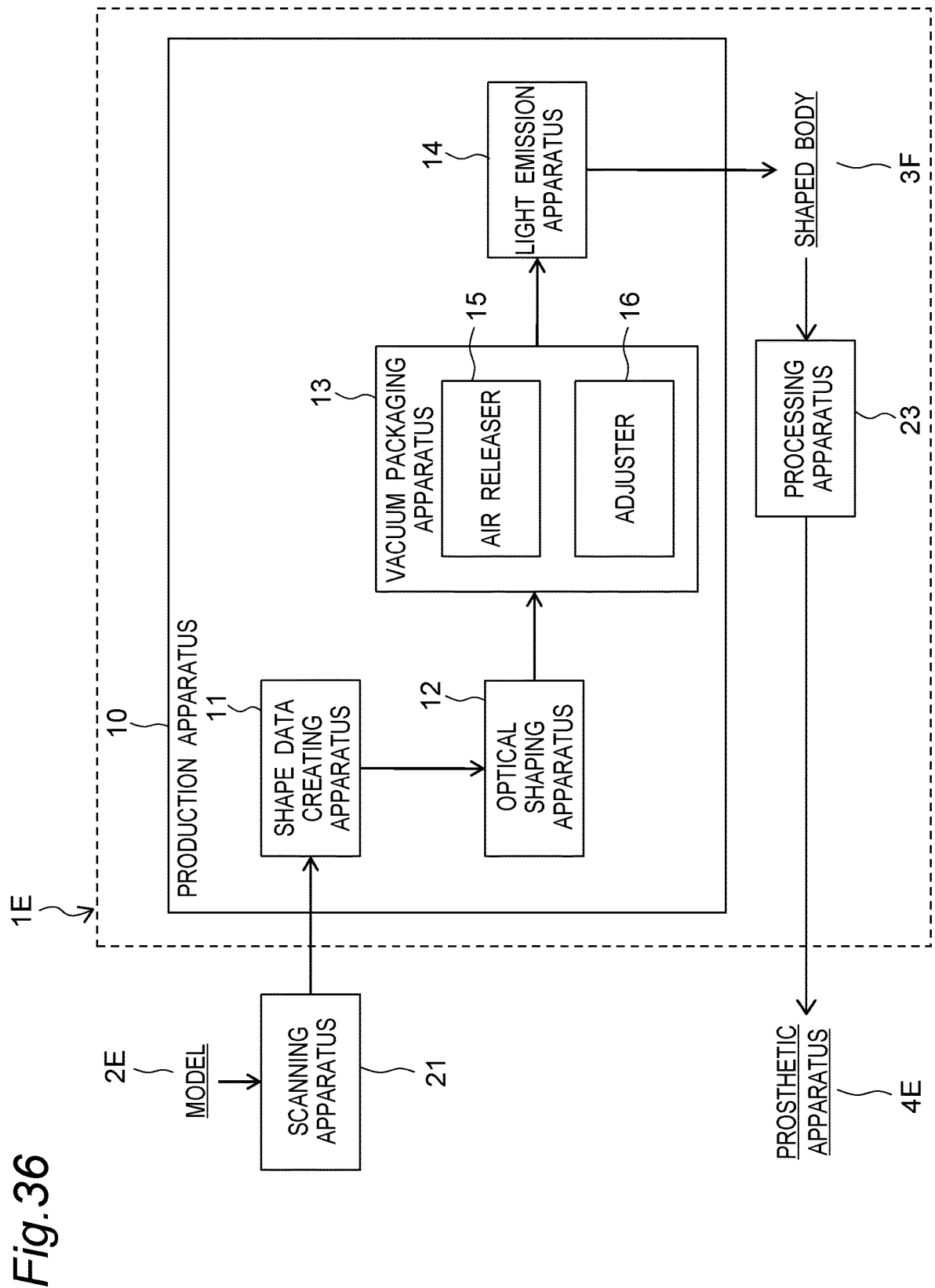
FIG. 36 is a block diagram illustrating another example of a manufacturing apparatus for the prosthetic apparatus of a seventh embodiment according to the present invention.
Figure 37:
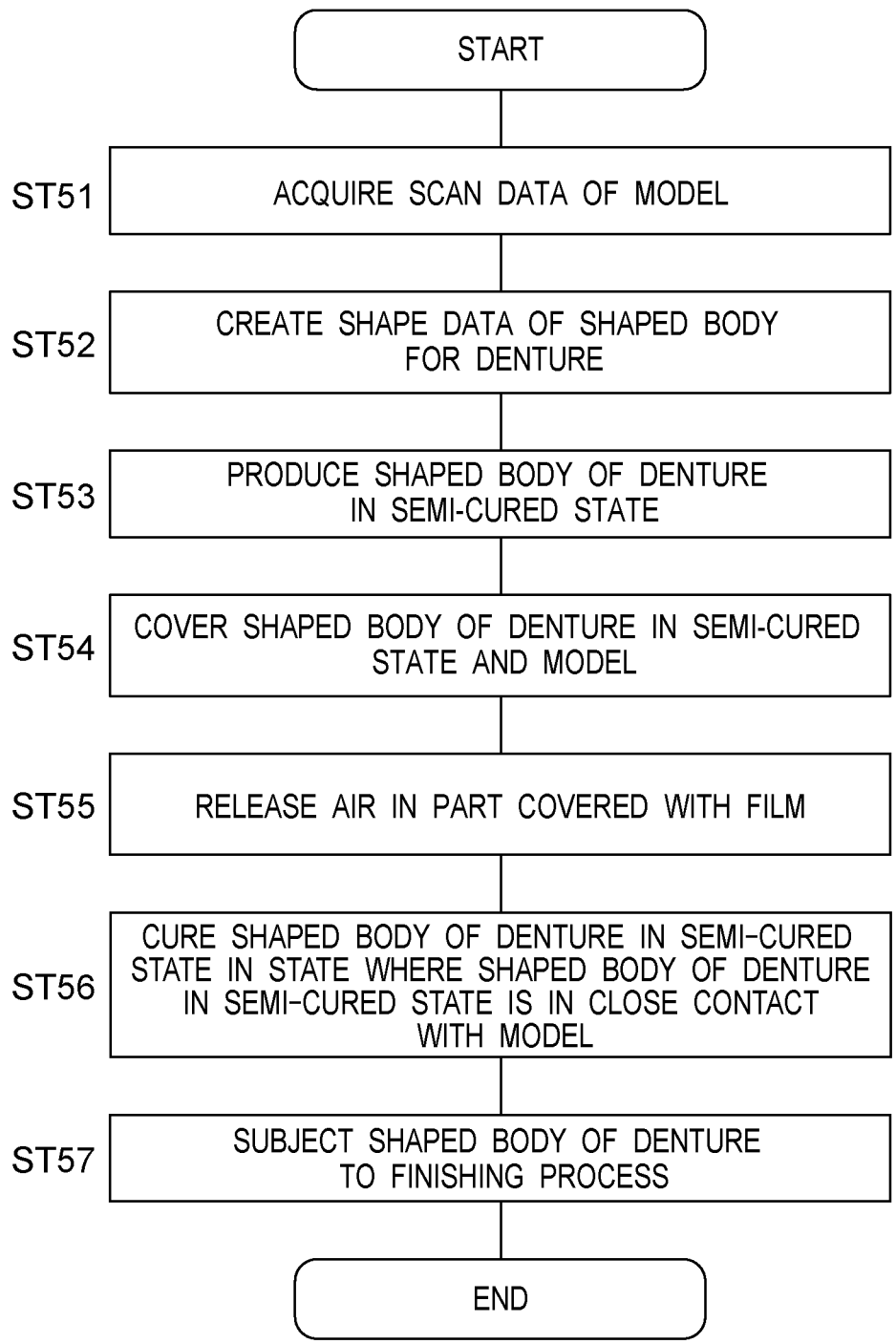
FIG. 37 is a flowchart illustrating another example of a manufacturing method for the prosthetic apparatus of the seventh embodiment according to the present invention.

FIG. 36 is a block diagram illustrating an example of a manufacturing apparatus 1E for a prosthetic apparatus 4E of the seventh embodiment according to the present invention. FIG. 37 is a flowchart illustrating an example of a manufacturing method for the prosthetic apparatus 4E of the seventh embodiment according to the present invention.

In the seventh embodiment, an example of manufacturing the prosthetic apparatus 4E of a denture in which artificial teeth and a denture base are integrally formed will be described.

The seventh embodiment is different from the first embodiment in that the manufacturing apparatus 1E does not include a bonding apparatus 22 for bonding artificial teeth, and a shaped body 3F of a denture is produced by producing and curing a shaped body of a denture in a semi-cured state. In addition, the seventh embodiment is different from the first embodiment in that the manufacturing method does not include the bonding process of bonding the artificial teeth, and the shaped body production process ST53 produces a shaped body of a denture in a semi-cured state.

In the manufacturing apparatus 1E, a shape data creating apparatus 11 generates shape data of a denture in which artificial teeth and a denture base are integrally formed. The optical shaping apparatus 12 shapes a shaped body of a denture in a semi-cured state on the basis of the shape data prepared by the shape data creating apparatus 11.

Figure 38:
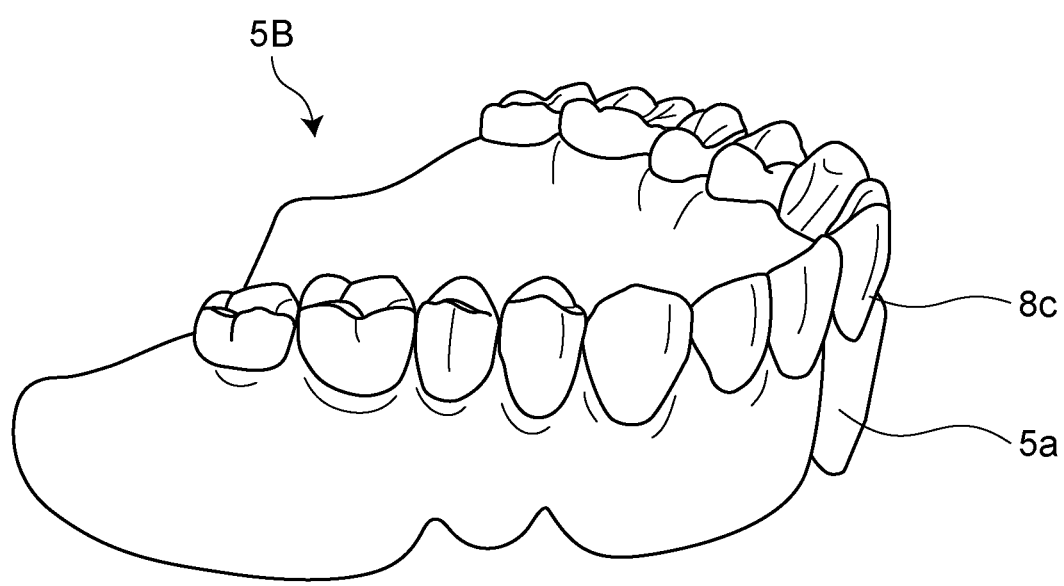
FIG. 38 is a schematic diagram illustrating an example of a shaped body of a denture in a semi-cured state.

FIG. 38 is a schematic diagram illustrating an example of a shaped body 5B of a denture in a semi-cured state. As illustrated in FIG. 38, the shaped body 5B is a shaped body of a denture in which a shaped body 5a of a denture base and a shaped body 8c of artificial teeth are integrally formed.

Next, an example of a manufacturing method for the prosthetic apparatus 4E will be described by using FIG. 37. Note that Steps ST51 to ST57 illustrated in FIG. 37 are similar to Steps ST41 to ST46 and ST48 illustrated in FIG. 25 of the sixth embodiment, except that the shaped body 5B of a denture in the semi-cured state is produced, and therefore detailed description thereof is omitted.

As illustrated in FIG. 37, Step ST51 is an acquisition process of acquiring scan data of a model that is a reproduction of at least a part of an inside of an oral cavity of a patient.

Step ST52 is a shape data creating process of preparing shape data of a shaped body of a denture on the basis of the scan data. Specifically, in Step ST52, the shape data creating apparatus 11 creates shape data of a denture in which a denture base and artificial teeth are integrated.

Step ST53 is a shaped body production process of producing the shaped body 5B of a denture in the semi-cured state on the basis of the shape data. In Step ST53, the optical shaping apparatus 12 produces the shaped body 5B of a denture in the semi-cured state illustrated in FIG. 38 on the basis of the shape data of the denture, the data being prepared in Step ST52.

Step ST54 is a covering process of attaching the shaped body 5B to a model 2E and covering the shaped body 5B and of the model 2E with film 6.

Step ST55 is an air release process of releasing air in the part covered with the film 6 to deform the film 6 and bring the shaped body 5B into close contact with the model 2E. Step ST55 may include an adjustment process of adjusting a vacuum degree of the part covered with the film 6. For example, in the adjustment process, a vacuum degree of the part covered with the film 6 is adjusted to 40% or more and 99.9% or less by an adjuster 16 of the vacuum packaging apparatus 13. Preferably, in the adjustment process, a vacuum degree of the part covered with the film 6 is adjusted to 50% or more and 99.9% or less. More preferably, in the adjustment process, a vacuum degree of the part covered with the film 6 is adjusted to 60% or more and 99.9% or less.

Step ST56 is a curing process (light emission process) of curing the shaped body 5B by emitting light on the shaped body 5B in a state where the shaped body 5B is in close contact with the model 2E. In Step ST56, the light emission apparatus 14 emits light on the shaped body 5B of a denture in the semi-cured state, in a state where the shaped body 5B is in close contact with the model 2E. Thus, the shaped body 5B of a denture in the semi-cured state is cured. As a result, the shaped body 3F of a denture in a final cured state is produced.

In Step ST57, the shaped body 3F is subjected to a finishing process. Thus, the prosthetic apparatus 4E of a denture is completed.

As described above, in the manufacturing method for the prosthetic apparatus 4E of a denture, the prosthetic apparatus 4E of a denture can be manufactured by performing Steps ST51 to ST57.

[Effects]

According to the seventh embodiment according to the present invention, the following effects can be obtained.

In the manufacturing apparatus 1E for and manufacturing method for the prosthetic apparatus 4E, the prosthetic apparatus 4E of a denture is manufactured by producing the shaped body 3F of a denture in which a denture base and artificial teeth are integrated. Thus, in the seventh embodiment, the bonding apparatus 22 and bonding process can be omitted as compared to the sixth embodiment.

EXAMPLES

The manufacturing apparatus 1E for and a manufacturing method for the prosthetic apparatus 4E will be further described on the basis of examples, but the present invention is not limited to the following examples.

Hereinafter, conditions of the examples will be described. Note that description of apparatuses and conditions similar to apparatuses and conditions in the examples 50 to 58 will be omitted.

Example 59

In the example 59, by using the manufacturing apparatus 1E of the seventh embodiment, the prosthetic apparatus 4E of a denture in which artificial teeth and a denture base are integrated was produced as a conformity evaluation sample. Specifically, shape data of a shaped body of a denture was created according to the model 2E by the shape data creating apparatus 11. On the basis of the created shape data, the shaped body 5B of a denture in the semi-cured state illustrated in FIG. 38 of a semi-cured state was shaped by the optical shaping apparatus 12 according to an instruction manual of each material or a condition initially set. The shaped body 5B in the semi-cured state was subjected to ultrasonic cleaning in Isopropyl alcohol. The ultrasonic cleaning was performed for five minutes for each of primary cleaning and secondary cleaning.

Next, a support was removed, and the shaped body 5B in the semi-cured state was attached to the model 2E. The shaped body in the semi-cured state and the model 2E were covered with the film 6, and air in the part covered with the film 6 was released by the vacuum packaging apparatus 13 to bring the shaped body 5B in the semi-cured state and the model 2E into close contact with each other. The shaped body 5B in the semi-cured state was subjected to light emission (post-curing) by the light emission apparatus 14 for 15 minutes, in a state where the shaped body 5B and the model 2E were in close contact with each other. The shaped body 3F subjected to the light emission was removed from the film 6, and a back surface (mucosal surface) of the shaped body 3F was subjected to light emission for another 15 minutes to produce the denture.

Evaluation results are illustrated in Table 23 below.

TABLE 23

|  | Example 59 |
| --- | --- |
| Type of optical shaping apparatus | D30 |
| Material of shaped body | Base |
| Use of vacuum packaging apparatus | Yes |
| Vacuum degree | 65 |
| Shape at measurement | Denture |
| Artificial teeth | — |
| Bonding order | — |
| Polymerization rate of shaped body in semi-cured state (%) | 74 |
| Polymerization rate of shaped body in final cured state (%) | 96 |
| Extraction rate of shaped body in final cured state (%) | 0.015 |
| Gap at central portion of palate (μm) | 130 |

In the example 59, a gap at a central portion of a palate is 130 μm, which falls within a clinically more preferable range. Accordingly, in the example 59 also, conformity to the model is improved, as similar to the examples 50 to 58.

The polymerization rate of the shaped body in a final cured state in the example 59 is 96%, and the polymerization rates of the shaped bodies in a final cured state in the comparative examples 8 to 10 are 89% to 91%. Accordingly, in the example 59 also, the polymerization rate is improved, as similar to the examples 50 to 58.

The extraction rate of the shaped body in a final cured state in the example 59 is 0.015%. Accordingly, in the example 59, the extraction rate is reduced, as similar to the examples 50 to 58.

As described above, in the example 59 also, as similar to the examples 50 to 58, it is possible to have excellent conformity with the model and to reduce the amount of residual monomer.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

The present invention is useful, for example, in a field of manufacturing a prosthetic apparatus with improved conformity.

DESCRIPTION OF REFERENCE CHARACTERS 1, 1A, 1B, 1C, 1D, 1E Manufacturing apparatus
2, 2A, 2B, 2C, 2D, 2E Model 3, 3A, 3B, 3C, 3D, 3E, 3F Shaped body
4, 4A, 4B, 4C, 4D, 4E Prosthetic apparatus
5, 5A, 5B Shaped body in semi-cured state
5a Shaped body of denture base
6 Film
7, 7A Recess
7a Projection
8 Prefabricated artificial tooth
8a Shaped artificial tooth
8b Connection part
8c Shaped body of artificial teeth
9 Connected artificial teeth
10, 10A, 10B, 10C production apparatus
11 Shape data creating apparatus
12 Optical shaping apparatus
13 Vacuum packaging apparatus (covering apparatus)
14 Light emission apparatus
15 Air releaser
16 Adjuster
17 Permanent stabilization apparatus (heating apparatus)
20 Casting apparatus
21 Scanning apparatus
21 Bonding apparatus
23 Processing apparatus
30 Ring
31 Investment material
32 Mold
33 Molten metal
34 Cast metal
40 Cover unit
41 Main body unit
42 First deaeration groove
43 Pad
44 First sealing heater
45 Hole
46 Switch
47 Second deaeration groove
48 Pad
49 Deaeration port
50 Second sealing heater
51 Clip
52 Pump
53 Air release port
54 Vacuum sensor
55 Controller

The invention claimed is:

1. A stereolithographic additive manufacturing method for a dental prosthetic apparatus, comprising:
  acquiring scan data of a prosthetic base model that is a reproduction of at least a part of an inside of an oral cavity of a patient;
  creating dental prosthetic shape data of a shaped body on a basis of the scan data;
  producing a shaped body on a basis of the shape data, the shaped body comprising resin;
  covering the shaped body and the prosthetic base model with a vacuum bag, the shaped body being attached to the prosthetic base model;
  vacuuming air out of the vacuum bag; and
  curing the shaped body in the vacuum bag using at least one of light and heat.

2. The stereolithographic additive manufacturing method for a dental prosthetic apparatus according to claim 1, wherein the curing of the shaped body includes:
  emitting light on the shaped body in the vacuum bag; and
  after emitting light, heating the shaped body in the vacuum bag.

3. The stereolithographic additive manufacturing method for a dental prosthetic apparatus according to claim 1, wherein the curing of the shaped body includes heating the shaped body is to a temperature in a range of 50° C. or more and to 130° C. or less.

4. The stereolithographic additive manufacturing method for a dental prosthetic apparatus according to claim 1, wherein the vacuuming the air includes adjusting a vacuum degree of the part covered with the vacuum bag to a range of 40% or more to 99.9% or less.

5. The stereolithographic additive manufacturing method for a dental prosthetic apparatus according to claim 1, wherein a polymerization rate of the shaped body produced in the producing the shaped body is in a range of 50% or more to 98% or less.

6. The stereolithographic additive manufacturing method for a dental prosthetic apparatus according to claim 1, wherein:
  an elongation percentage of the vacuum bag is in a range of 50% or more to 500% or less, and
  the vacuum bag transmits light having a wavelength in a range of 100 nm or more to 780 nm or less.

7. The stereolithographic additive manufacturing method for a dental prosthetic apparatus according to claim 1, wherein the producing of the shaped body includes producing the shaped body with an optical shaping apparatus using a digital light processing method.

8. The stereolithographic additive manufacturing method for a dental prosthetic apparatus according to claim 1, wherein the shaped body is one of a crown, a bridge, a resin base denture, or an orthodontic splint.

9. The stereolithographic additive manufacturing method for a dental prosthetic apparatus according to claim 1, further comprising:
  producing a mold for prosthetic apparatus manufacturing, by using the cured shaped body as a casting pattern;
  introducing molten metal into the mold;
  removing a cast metal by breaking the mold; and
  finishing the cast metal into a prosthetic apparatus by adjusting the cast metal with an abrasive material and a polishing material.

10. The stereolithographic additive manufacturing method for a dental prosthetic apparatus according to claim 1, further comprising bonding an artificial tooth to the shaped body.

11. A stereolithographic additive manufacturing method for a dental prosthetic apparatus, comprising:
  producing a dental prosthetic shaped body comprising resin using a stereolithographic printer;
  covering the dental prosthetic shaped body and a model with a vacuum bag, the model being a reproduction of at least a part of an inside of an oral cavity of a patient and the dental prosthetic shaped body attached to the model;
  vacuuming air out of the vacuum bag; and
  curing the dental prosthetic shaped body in the vacuum bag using at least one of light and heat.

12. The stereolithographic additive manufacturing method for a dental prosthetic apparatus according to claim 1, further comprising, after producing the shaped body and before the curing of the shaped body in the vacuum bag, preliminarily curing the shaped body using light without covering the shaped body with the vacuum bag, wherein the curing of the shaped body in the vacuum bag uses heat.

13. The stereolithographic additive manufacturing method for a dental prosthetic apparatus according to claim 11, wherein the curing the dental prosthetic shaped body includes:
emitting light on the dental prosthetic shaped body in the vacuum bag; and
after emitting light, heating the dental prosthetic shaped body in the vacuum bag.

14. The stereolithographic additive manufacturing method for a dental prosthetic apparatus according to claim 11, further comprising, after producing the dental prosthetic shaped body and before curing the dental prosthetic shaped body in the vacuum bag, preliminarily curing the dental prosthetic shaped body using a light emission apparatus without covering the shaped body with the vacuum bag,
wherein the curing the shaped body in the vacuum bag uses heat.

15. The stereolithographic additive manufacturing method for a dental prosthetic apparatus according to claim 11, wherein the curing of the dental prosthetic shaped body in the vacuum bag includes heating the dental prosthetic shaped body to a temperature in a range of 50° C. or more to 130° C. or less.

16. The stereolithographic additive manufacturing method for a dental prosthetic apparatus according to claim 11, wherein the vacuuming air out of the vacuum bag includes adjusting a vacuum degree of the part covered with the vacuum bag to a range of 40% or more to 99.9% or less.

17. The stereolithographic additive manufacturing method for a dental prosthetic apparatus according to claim 11, wherein a polymerization rate of the dental prosthetic shaped body produced in the producing of the dental prosthetic shaped body is in a range of 50% or more to 98% or less.

18. The stereolithographic additive manufacturing method for a dental prosthetic apparatus according to claim 11, wherein:
an elongation percentage of the vacuum bag is in a range of 50% or more to 500% or less, and
the vacuum bag transmits light having a wavelength in a range of 100 nm or more to 780 nm or less.

19. The stereolithographic additive manufacturing method for a dental prosthetic apparatus according to claim 11, wherein the producing of the dental prosthetic shaped body includes producing the dental prosthetic shaped body with the stereolithographic printer using a digital light processing method.

20. The stereolithographic additive manufacturing method for a dental prosthetic apparatus according to claim 11, wherein the dental prosthetic shaped body is one of a crown, a bridge, a resin base denture, or an orthodontic splint.

* * * * *